(12) United States Patent
Fakhouri et al.

(10) Patent No.: US 11,439,198 B2
(45) Date of Patent: Sep. 13, 2022

(54) TWO PART SOLE STRUCTURES AND USES THEREOF

(71) Applicant: NIKE, Inc., Beaverton, OR (US)

(72) Inventors: Sami M. Fakhouri, Portland, OR (US); Askim Senyurt, Portland, OR (US)

(73) Assignee: NIKE, INC., Beaverton, OR (US)

( * ) Notice: Subject to any disclaimer, the term of this patent is extended or adjusted under 35 U.S.C. 154(b) by 638 days.

(21) Appl. No.: 16/430,149

(22) Filed: Jun. 3, 2019

(65) Prior Publication Data
US 2019/0365028 A1    Dec. 5, 2019

Related U.S. Application Data

(60) Provisional application No. 62/680,348, filed on Jun. 4, 2018.

(51) Int. Cl.
*A43B 13/12* (2006.01)
*A43B 13/04* (2006.01)
(Continued)

(52) U.S. Cl.
CPC ............ *A43B 13/125* (2013.01); *A43B 13/04* (2013.01); *A43B 13/16* (2013.01); *A43B 13/32* (2013.01);
(Continued)

(58) Field of Classification Search
CPC ...... C08L 53/02; C08L 53/00; C08L 23/0815; C08L 23/0853; C08L 23/16;
(Continued)

(56) References Cited

U.S. PATENT DOCUMENTS

| 4,910,886 A | 3/1990 | Sullivan et al. |
| 6,207,754 B1 | 3/2001 | Yu |

(Continued)

FOREIGN PATENT DOCUMENTS

| BR | PI0701866 A2 | 12/2008 |
| CN | 1813025 A | 8/2006 |

(Continued)

OTHER PUBLICATIONS

International Preliminary Report on Patentability for PCT/US2019/035258 dated Jul. 13, 2020.
(Continued)

*Primary Examiner* — Frances Tischler
(74) *Attorney, Agent, or Firm* — Thomas | Horstemeyer, LLP

(57) ABSTRACT

Two part sole structures are provided having a first foam component containing a polyolefin resin with a polyurethane resin component adhered to a surface of the first foam component. For example, in some aspects, a sole structure or a portion thereof is provided having a first sole component containing a foam composition and a second sole component adhered to a surface of the first sole component, where the second sole component includes a polyurethane resin. The second sole component is in some aspects printed or extruded onto the surface of the foam. In particular, midsoles including the foams and having an outsole component on the ground facing portion are provided for use in an article of footwear. Methods of making the sole structures are provided, as well as methods of making an article of footwear including one of the sole structures.

19 Claims, 3 Drawing Sheets

(51) Int. Cl.
*A43B 13/16* (2006.01)
*A43B 13/32* (2006.01)
*C08L 53/02* (2006.01)
*C08J 9/00* (2006.01)
*C08G 18/32* (2006.01)
*C08G 18/34* (2006.01)
*C09J 175/04* (2006.01)
*C08L 23/08* (2006.01)
*B32B 7/12* (2006.01)
*B32B 5/20* (2006.01)
*B32B 5/18* (2006.01)
*B32B 37/12* (2006.01)
*B32B 37/15* (2006.01)
*B32B 37/02* (2006.01)
*B32B 5/32* (2006.01)

(52) U.S. Cl.
CPC .......... *B32B 5/18* (2013.01); *B32B 5/20* (2013.01); *B32B 5/32* (2013.01); *B32B 7/12* (2013.01); *B32B 37/02* (2013.01); *B32B 37/12* (2013.01); *B32B 37/153* (2013.01); *C08G 18/3225* (2013.01); *C08G 18/341* (2013.01); *C08G 18/343* (2013.01); *C08J 9/0061* (2013.01); *C08L 23/0815* (2013.01); *C08L 53/02* (2013.01); *C09J 175/04* (2013.01); B32B 2266/025 (2013.01); B32B 2266/0278 (2013.01); C08L 2205/02 (2013.01); C09J 2203/362 (2020.08); C09J 2475/00 (2013.01); C09J 2475/003 (2013.01)

(58) Field of Classification Search
CPC ....... C08L 2205/02; C08L 75/04; C08K 3/22; C08K 5/09; C08K 5/14; A43B 13/04; A43B 13/12; A43B 13/125; A43B 13/16; A43B 13/32; A43B 1/14; B32B 2266/025; B32B 2266/0278; B32B 37/02; B32B 37/12; B32B 37/153; B32B 5/18; B32B 5/20; B32B 5/32; B32B 7/12; C08G 18/3225; C08G 18/341; C08G 18/343; C08J 2323/08; C08J 2353/00; C08J 2353/02; C08J 2423/08; C08J 2453/00; C08J 2453/02; C08J 9/0061; C09J 175/04; C09J 2203/362; C09J 2475/00; C09J 2475/003
See application file for complete search history.

(56) References Cited

U.S. PATENT DOCUMENTS

| | | | |
|---|---|---|---|
| 6,225,366 | B1 | 5/2001 | Raetzsch et al. |
| 6,303,723 | B1 | 10/2001 | Sen et al. |
| 6,391,438 | B1 | 5/2002 | Ramesh et al. |
| 6,555,214 | B1 | 4/2003 | Yates |
| 6,599,597 | B1 | 7/2003 | Bonk et al. |
| RE38,993 | E | 2/2006 | Reedy |
| 7,083,849 | B1 | 8/2006 | Albrecht et al. |
| 7,506,459 | B2 | 3/2009 | Grisoni et al. |
| 7,784,197 | B2 | 8/2010 | Crane et al. |
| 7,810,252 | B2 | 10/2010 | Stone et al. |
| 7,883,769 | B2 | 2/2011 | Seth et al. |
| 7,941,944 | B2 | 5/2011 | Cagliari |
| 8,008,363 | B2 | 8/2011 | Mori et al. |
| 8,333,903 | B2 | 12/2012 | Rolland et al. |
| 8,813,392 | B2 | 8/2014 | Maron et al. |
| 9,080,051 | B2 | 7/2015 | Peterson et al. |
| 9,260,578 | B2 | 2/2016 | Su et al. |
| 2004/0092666 | A1 | 5/2004 | Kitano et al. |
| 2005/0187355 | A1 | 8/2005 | Tasaka et al. |
| 2005/0275127 | A1 | 12/2005 | Shih |
| 2006/0154998 | A1 | 7/2006 | Shiba et al. |
| 2006/0211819 | A1 | 9/2006 | Hoenig et al. |
| 2006/0213600 | A1 | 9/2006 | Wu et al. |
| 2006/0249417 | A1 | 11/2006 | Jones |
| 2007/0129454 | A1 | 6/2007 | Su et al. |
| 2007/0289162 | A1 | 12/2007 | Liu et al. |
| 2008/0075914 | A1 | 3/2008 | Cheng |
| 2008/0229623 | A1 | 9/2008 | Ferretti |
| 2008/0271340 | A1 | 11/2008 | Grisoni et al. |
| 2008/0289289 | A1 | 11/2008 | Wiercinski et al. |
| 2009/0247656 | A1 | 10/2009 | Jacob et al. |
| 2010/0099784 | A1 | 4/2010 | Su et al. |
| 2010/0126042 | A1 | 5/2010 | Wyon |
| 2011/0178195 | A1 | 7/2011 | Cheng |
| 2011/0277351 | A1 | 11/2011 | Scoledes |
| 2012/0317845 | A1 | 12/2012 | Vattes |
| 2013/0055594 | A1 | 3/2013 | Hochart |
| 2013/0101826 | A1 | 4/2013 | Haug et al. |
| 2014/0013625 | A1 | 1/2014 | Grott et al. |
| 2014/0068965 | A1 | 3/2014 | Vattes et al. |
| 2014/0196306 | A1 | 7/2014 | Gill |
| 2014/0331519 | A1 | 11/2014 | Campbell et al. |
| 2015/0143723 | A1 | 5/2015 | Tateishi et al. |
| 2015/0181975 | A1 | 7/2015 | Otsuka et al. |
| 2015/0196085 | A1 | 7/2015 | Westmoreland et al. |
| 2015/0225526 | A1 | 8/2015 | Tu et al. |
| 2015/0257473 | A1 | 9/2015 | Liu et al. |
| 2017/0119094 | A1 | 5/2017 | Vontorcik, Jr. et al. |
| 2017/0215522 | A1 | 8/2017 | Tateishi et al. |
| 2017/0267846 | A1 | 9/2017 | Baghdadi |
| 2018/0022024 | A1 | 1/2018 | Saito et al. |

FOREIGN PATENT DOCUMENTS

| | | |
|---|---|---|
| CN | 101904591 A | 12/2010 |
| CN | 102031010 A | 4/2011 |
| CN | 102171281 A | 8/2011 |
| CN | 102532677 A | 7/2012 |
| CN | 103192573 A | 7/2013 |
| CN | 103205026 A | 7/2013 |
| CN | 104403192 A | 3/2015 |
| CN | 104448529 A | 3/2015 |
| CN | 104910507 A | 9/2015 |
| CN | 104927182 A | 9/2015 |
| CN | 106117766 A | 11/2016 |
| CN | 107108833 | 8/2017 |
| CN | 107501713 A | 12/2017 |
| EP | 1457540 A1 | 9/2004 |
| EP | 1880625 A1 | 1/2008 |
| EP | 2508922 A1 | 10/2012 |
| EP | 2695537 A2 | 2/2014 |
| EP | 2818062 A1 | 12/2014 |
| EP | 2873339 A1 | 5/2015 |
| EP | 3111794 A1 | 1/2017 |
| EP | 3202276 A1 | 8/2017 |
| EP | 3244240 A1 | 11/2017 |
| FR | 2993757 A1 | 1/2014 |
| GB | 2411617 A | 9/2005 |
| JP | H11253201 A | 9/1999 |
| JP | 2003073494 A | 3/2003 |
| JP | 2007195944 A | 8/2007 |
| JP | 2008109152 A | 5/2008 |
| JP | 2012159589 A | 8/2012 |
| JP | 2013028654 | 2/2013 |
| JP | 5719980 B1 | 5/2015 |
| KR | 20060016112 A | 2/2006 |
| KR | 101472929 B1 | 12/2014 |
| RU | 109377 U1 | 10/2011 |
| TW | I257850 B | 7/2006 |
| TW | 200628089 A | 8/2006 |
| TW | M297647 U | 9/2006 |
| WO | 2002014423 | 2/2002 |
| WO | 03095657 A2 | 11/2003 |
| WO | 2005000958 | 1/2005 |
| WO | 2006099631 A1 | 9/2006 |
| WO | 2006102154 A2 | 9/2006 |
| WO | 2008083451 A1 | 7/2008 |
| WO | 2008152414 A1 | 12/2008 |
| WO | 2012065333 A2 | 5/2012 |

(56) References Cited

FOREIGN PATENT DOCUMENTS

| WO | 2012092019 A1 | 7/2012 |
|---|---|---|
| WO | 2013090174 A1 | 6/2013 |
| WO | 2013150231 A1 | 10/2013 |
| WO | 2017115840 A1 | 7/2017 |
| WO | 2017160870 A1 | 9/2017 |
| WO | 2017160874 A1 | 9/2017 |
| WO | 2017160876 A1 | 9/2017 |
| WO | 2018005295 A1 | 1/2018 |
| WO | 20180005295 A1 | 1/2018 |

OTHER PUBLICATIONS

Written Opinion of the International Searching Authority for PCT/US2017/022356 dated Jul. 18, 2017.
Written Opinion of the International Searching Authority for PCT/US2017/022359 dated Jul. 18, 2017.
Damani, A. G. "Polyblends of polystyrene and high impact polystyrene with styrene ethylene butylene styrene thermoplastic elastomer" University of Massachusetts Lowell, ProQuest Dissertations Publishing; MAI 35/04, p. 1058, Aug. 1997.
Data Sheet for Tuftec H1051. Asahi Kasei. 2017.
Data Sheet for Tuftec H1052. Asahi Kasei. 2017.
Data Sheet for Tuftec H1062. Asahi Kasei. 2017.
Data Sheet for Tuftec H1221. Asahi Kasei. 2017.
Hiroyuki, M.A.E. "Relationship of mechanical properties between neat PP/SEBS blends and syntactic pp/sebs foams with polymer microballoons" Publisher: Society of Materials Science Japan; v 57, n 12, p. 1253-1260, Dec. 2008.
Hydrogenated Styrenic Block Copolymer Offers Benefits for PSAs. ASI Adhesives and sealants, Mar. 20, 2003.
International Preliminary Report on Patentability dated Jun. 18, 2018 , for PCT/US2017/022350.
International Search Report and Written Opinion for PCT/US2017/022350 dated Jul. 18, 2017.
International Search Report for PCT/US/2019/064267 dated Feb. 18, 2020.
John 0. Akindoyo, M. D. H. Beg, Suriati Ghazal!, M. R. Islam, Nitthiyah Jeyaratnama and A. R. Yuvarajc: "Polyurethane types, synthesis and applications a review", RSC Advances, vol. 6, Nov. 24, 2016 (Nov. 24, 2016), pp. 114453-114482, XP002794407, DOI: 10.1039/C6RA14525F.
Karsli, G.; Aytac, A."A study on compatibility of SEBS/EVA blends prepared by different techniques" Publisher: Huthig Verlag GmbH; v 64, n 7-8, p. 15-18, Jul.-Aug. 2011.
Kemaloglu, S. et al. "Thermally conductive boron nitride/SEBS/EVA ternary composites: Processing and characterization" Publisher: John Wiley and Sons Inc.;Polymer Composites, v 31, n 8, p. 1398-1408, Aug. 2010.
Kuraray. "Septon Hybar Thermoplastic Elastomers Technical Information." 2017.
Larkin, J. B. "Block Copolymer Thermoplastic Rubbers: Their Properties and End Use Applications" SPE, p. 26-37, 1976; Conference: SPE Bicenten Reg Tech Conf, Plast in the Mid-Ohio Val, Nov. 30, 1976-Dec. 1, 1976.
Lippa, N. "Mechanical ageing protocol selection affects macroscopic performance and molecular level properties of ethylene vinyl acetate (EVA) running shoe midsole foam" Publisher: Elsevier Ltd; Conference: 2014 10th Conference of the International Sports Engineering Association;Procedia Engineering, v 72, p. 285-291, Jul. 2014.

Liu, C.; Lin, J. "Preparation of Super Light Foamed EVA" China Plastics, 2004, Issue 2, pp. 60-64.
Maiti, M. "Microcellular foam from ethylene vinyl acetate/polybutadiene rubber (EVA/BR) based thermoplastic elastomers for footwear applications" Industrial and Engineering Chemistry Research, v 51, n 32, p. 10607-10612, Aug. 15, 2012.
Phinyocheep, P. et al. "Influence of compatibilizers on mechanical properties, crystallization, and morphology of polypropylene/scrap rubber dust blends" Journal of Applied Polymer Science, v 86, n 1, p. 148-159, Oct. 3, 2002.
Schroeder, P. et al. "Gear lever in hand: Two component concept for private cars" Kunststoffe Plast Europe, v 92, n 3, p. 41-42+122-123, Mar. 2002 (Language: German.
Sharudin, R. W. B et al. "Preparation of microcellular thermoplastic elastomer foams from polystyrene-b-ethylene-butylene-b-polystyrene (SEBS) and their blends with polystyrene" Publisher: John Wiley and Sons Inc. Elastomers; Journal of Applied Polymer Science, v 128, n 4, p. 2245-2254, May 15, 2013.
Ulug, E. et al. "Effects of HIPS on the mechanical, thermal and morphological properties of SEBS and SIS type elastomers". 11th International Conference on the Mechanical Behavior of Materials; Procedia Engineering, v 10, p. 3092-3097, 2011.
Wang, Y. et al. "SEBS modified reclaimed rubber microcellular foaming material as the sole of the shoe" Publisher: Chengdu University of Science and Technology; Gaofenzi Cailiao Kexue Yu Gongcheng/Polymeric Materials Science and Engineering, v 26, n 12, p. 148-151, Dec. 2010 (Language: Chinese).
Written Opinion of the International Preliminary Examining Authority for PCT/US2017/022350 dated Jan. 23, 2018.
Written Opinion of the International Preliminary Examining Authority for PCT/US2017/022359 dated Jan. 25, 2018.
Written Opinion of the International Preliminary Examining Authority for PCT/US2017/022350 dated Jun. 18, 2018.
Yin, H. et al. "EVA/SEBS blends foaming technology" Publisher: Chengdu University of Science and Technology; Gaofenzi Cailiao Kexue Yu Gongcheng/Polymeric Materials Science and Engineering, v 25, n 8, p. 90-93, Aug. 2009 (Language: Chinese).
Characterization of Ethylene Vinyl Acetate Copolymers by Dielectric Analysis, TA Instruments, https://www.tainstruments.com/pdf/.
International Search Report and Written Opinion for PCT/US2017/022356 dated Jul. 18, 2017.
International Search Report and Written Opinion for PCT/US2019/035258 dated Oct. 8, 2019.
International Search Report for PCT/US2017/022359 dated Jul. 18, 2017.
Tafmer, Alpha olefin copolymer, DF series, Mitsubishi Chem., 2010.
Written Opinion of the International Preliminary Examining Authority for PCT/US2017/022356 dated Jan. 29, 2018.
Written Opinion of the International Preliminary Examining Authority for PCT/US2019/035258 dated Jul. 13, 2020.
Written Opinion of the International Preliminary Examining Authority for PCT/US2019/035258 dated Apr. 30, 2020.
International Reporton Patentability for PCT/US2017/022356 dated Jun. 14, 2018.
Written Opinion of the International Preliminary Examining Authority for PCT/US2017/022356 dated Jun. 14, 2018.
International Search Report dated Jul. 18, 2017, for PCT/US2017/022359.
International Preliminary Report on Patentability for PCT/US2017/022359 dated Jun. 14, 2018.

TWO PART SOLE STRUCTURES AND USES THEREOF

CROSS-REFERENCE TO RELATED APPLICATIONS

This application claims priority to, and the benefit of, U.S. provisional application entitled "TWO PART SOLE STRUCTURES AND USES THEREOF" having Ser. No. 62/680,348, filed Jun. 4, 2018, the contents of which are incorporated by reference in their entirety.

TECHNICAL FIELD

The present disclosure generally relates to materials, and in particular to materials for the footwear and related industries and uses thereof.

BACKGROUND

Footwear design involves a variety of factors from the aesthetic aspects, to the comfort and feel, to the performance and durability. While footwear design and fashion may be rapidly changing, the demand for increasing performance in the athletic footwear market is unchanging. To balance these demands, footwear designers employ a variety of materials and designs for the various components that make up an article of footwear.

BRIEF DESCRIPTION OF THE DRAWINGS

Further aspects of the present disclosure will be readily appreciated upon review of the detailed description, described below, when taken in conjunction with the accompanying drawings.

DETAILED DESCRIPTION

Figure 1:
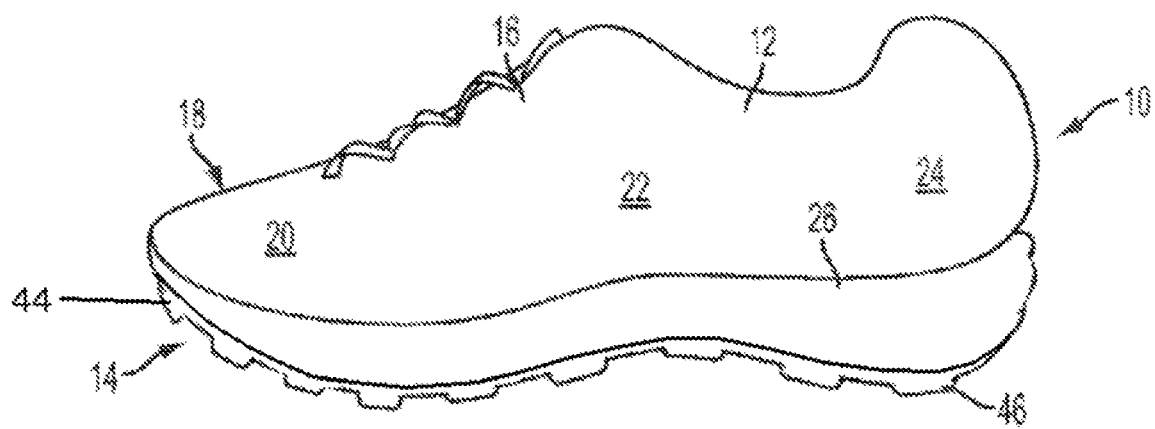
FIG. 1 is an elevation view of an article of footwear with a sole component according to an aspect of the invention.

New designs and materials for the footwear industry are needed. In particular, there remains a need for improved foam compositions, for example that can be used in the footwear industry to provide improved cushion and energy return when used in a midsole or other component for an article of footwear.

In various aspects, sole structures and portions thereof are provided having a first component having exceptionally high energy return and a second component adhered to a surface of the first sole component, wherein the second component provides one or more improved properties such as grip, hardness, or durability. In particular, various higher energy return foam compositions can also exhibit exceptional softness that, at least in some aspects, may not be ideal as a ground facing component of a sole structure. Therefore, in some aspects, the second component is adhered to a surface of the first component where the surface is a ground facing surface when the sole structure is a component of an article of footwear. In a number of aspects, the first sole component includes a polyolefin resin composition, and the second sole component is adhered to a surface of the first sole component, wherein the second sole component comprises a polyurethane resin.

In some aspects, this disclosure provides a sole structure or a portion thereof containing (i) a first sole component containing a foam composition described herein, and (ii) a second sole component adhered to a surface of the first sole component, wherein the second sole component contains a polyurethane resin. Applicants have found that the polyurethane resin component can impart certain beneficial properties such as grip, hardness, and durability to the sole structure while still maintaining exceptional high energy return imparted by the first sole component. In some aspects, the foam composition of the first component is made by a process comprising injection molding and crosslinking a pre-foam composition described herein. For clarity, compositions that have not been foamed will, in some instances be referred to as "pre-foam" compositions.

Before the present disclosure is described in greater detail, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Articles of Footwear and Sole Components

In various aspects, articles of footwear are provided. In particular, articles of footwear are provided including one or more components made entirely or partially from a foam mentioned above and described in more detail below. The foams and components made therefrom can have a range of desirable properties for footwear, including softness, durability, and an exceptionally high energy return. The articles of footwear can, in principal, include any article of footwear. In various aspects, the article of footwear can include a shoe, a boot, or a sandal.

The most common articles of footwear are shoes. Shoes can include athletic shoes such as baseball shoes, basketball shoes, soccer shoes, football shoes, running shoes, cross-trainer shoes, cheerleading shoes, golf shoes, and the like. The shoes can, in some aspects, be cleated. An exemplary article of footwear 10 is shown in FIG. 1. While an athletic shoe is exemplified in FIG. 1, it will be readily understood that some of the terminology employed will also apply to other articles of footwear or to other styles of shoe. Footwear 10 includes an upper 12 and a sole structure 14 secured to upper 12. Sole structure 14 can be secured to upper 12 by adhesive or any other suitable means. As used herein, the sole structure 14 can be a multi-component assembly formed of a plurality of monolithic components, where at least one of the monolithic components is formed entirely of the foam material as described herein and a second component is a polyurethane resin adhered to a surface of the foam material. Footwear 10 has a medial, or inner, side 16 and a lateral, or outer, side 18.

The upper, in some aspects, is unformed until the point that it is attached to the sole component. In some aspects, the upper is a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel sock or a strobel board attached to the upper, typically via a strobel stitch.

Sole structure 14, which is generally disposed between the foot of the wearer and the ground, provides attenuation of ground reaction forces (i.e., imparting cushioning), traction, and may control foot motions, such as pronation. As with conventional articles of footwear, sole structure 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of a foam material described herein. Articles of footwear described herein can include an insole or sockliner formed entirely or partially of a foam material described herein.

For purposes of general reference, footwear 10 can be divided into three general portions: a forefoot portion 20, a midfoot portion 22, and a heel portion 24. Portions 20, 22, and 24 are not intended to demarcate precise areas of footwear 10. Rather, portions 20, 22, and 24 are intended to represent general areas of footwear 10 that provide a frame of reference during the following discussion.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear is shown in FIG. 1 to be disposed substantially horizontally, as it would be positioned on a horizontal surface when worn by a wearer. However, it is to be appreciated that footwear 10 need not be limited to such an orientation. Thus, in FIG. 1, rearwardly is toward heel portion 24, that is, to the right as seen in FIG. 1. Naturally, forwardly is toward forefoot portion 20, that is, to the left as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Figure 2:
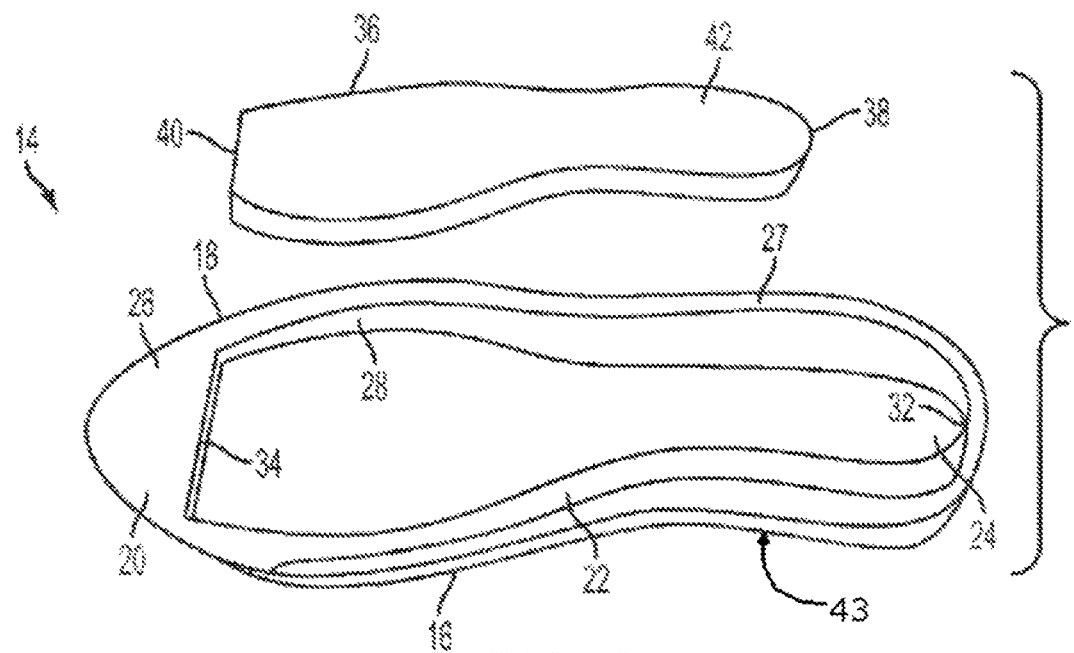
FIG. 2 is an exploded view of the sole component of the article of footwear of FIG. 1.

As can be seen in FIG. 2, sole structure 14 includes a first component 26 having an upper surface 27 with a recess 28 formed therein. Upper surface 27 is secured to upper 12 with adhesive or other suitable fastening means.

An insert 36 is received in recess 28. Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means.

As illustrated in FIG. 2, insert 36 can provide cushioning or resiliency in the sole component. First component 26 can provide structure and support for insert 36. In such aspects, first component 26 can be formed of a material of higher density and/or hardness as compared to insert 36 such as, for example, non-foam materials including rubber and thermoplastic polyurethane, as well as foam materials. In certain aspects, insert 36 can be formed of a foam material as disclosed herein.

Figure 3:
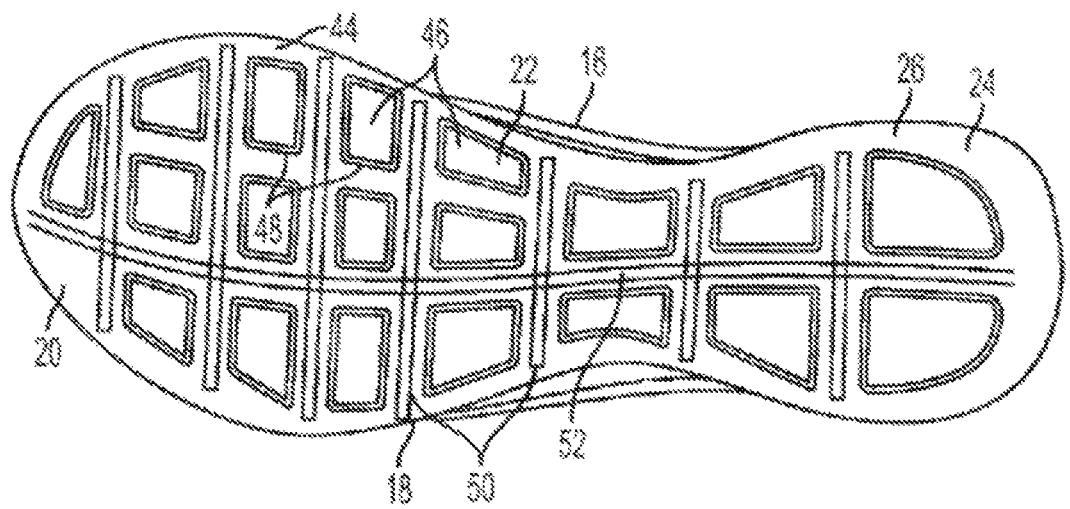
FIG. 3 is a plan view of the bottom of the sole component of the article of footwear of FIG. 1.
Figure 4:
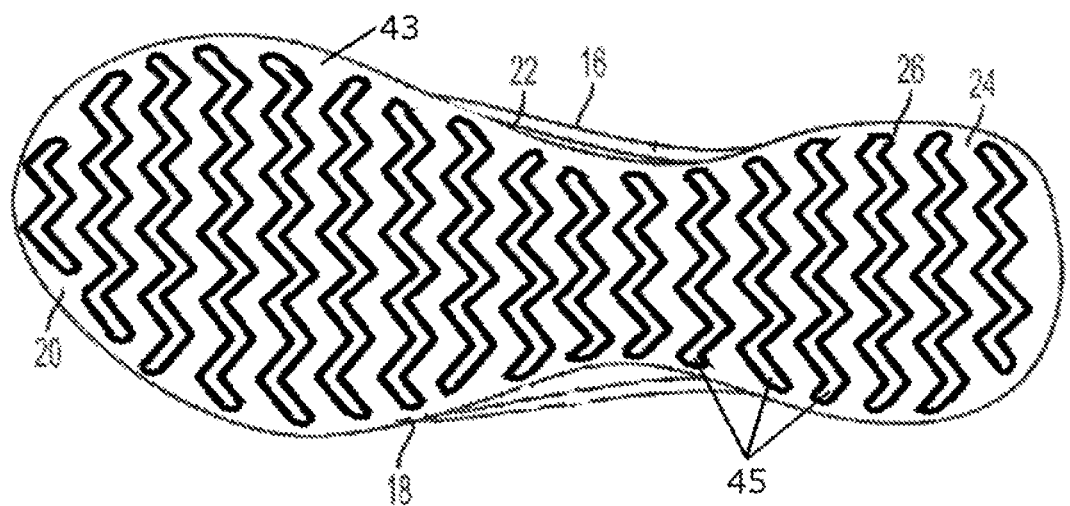
FIG. 4 is a plan view of the bottom of a second exemplary sole component of an article of footwear.

A second component can be secured to the lower surface 43 of first component 26. As depicted in FIG. 3, the second component can be an outsole 44 that can cover or nearly cover the entire lower surface 43 of the first component 26. As seen best in FIG. 3, the ground engaging outsole 44 includes a plurality of projections 46 providing improved grip when in use. Each projection 46 can be surrounded by a groove 48. A plurality of transverse slots 50 can also be formed in outsole 44, extending between adjacent projections 46. A longitudinal slot 52 can extend along outsole 44 from heel portion 26 to forefoot portion 20. As depicted in FIG. 4, the second component can include one or a plurality of lines 45 forming a traction pattern on the lower surface 43 of the first component 26.

In some aspects, the component is a sole structure or a portion thereof, such as a sole structure 14 depicted in FIGS. 1-3, that includes a foam described herein. The sole components and inserts for sole components can be made partially or entirely of a foam described herein. Any portion of a sole component or an insert for a sole component can be made of a foam described herein. For example, first component 26 of the sole structure, the entire insert 36, portions 62 or 64 of insert 60, or any combination thereof, can include a foam as described herein. The sole components and inserts can be made by foaming a composition provided herein, for example by injection molding or by injection molding followed by compression molding as described herein. The foams and components can demonstrate improved physical properties including one or more of an enhanced energy return, and enhanced split tear, a decreased specific density, or a combination thereof. The sole components including the foam can have a second component, e.g. a polyurethane resin component, adhered to a surface of the foam component.

In various aspects a sole structure or a portion thereof is provided for an article of footwear. Aspects include a sole structure or a portion thereof having (i) a first sole component comprising a polyolefin resin; and (ii) a second sole component adhered to a surface of the first sole component, wherein the second sole component includes a polyurethane resin. In various aspects, the second sole component is extruded onto the surface of the first sole component.

In a number of aspects, a sole structure or a portion thereof is provided including (i) a first sole component containing a polyolefin resin; and (ii) a second sole component made by a process including: (a) priming a surface of the first sole component to produce a primed surface; and (b) extruding a first component containing a first functional group and a second component containing a second functional group onto the primed surface, wherein, the second functional group is reactive with the first functional group; and at least one of the first functional group and the second functional group includes a saturated functional group to form the second sole component adhered to the surface of the first sole component.

The sole structures can include a first sole component including a foam composition described herein. Suitable foam compositions for a first sole component can include a thermoplastic copolyester elastomer. In various aspects, the foam compositions for a first sole component include one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units. In a number of aspects, the foam compositions for a first sole component include a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units. And yet, in some aspects, the first sole component includes an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups. The first sole component can also include a polyolefin resin containing a polyolefin copolymer and an effective amount of a polymeric resin modifier.

The second sole component is adhered to the surface of the first sole component. In at least some aspects, an adhesive peel strength between the surface of the first sole component and the surface of the second sole component is about 1.0 kilograms of force per centimeter to about 10.0 kilograms of force per centimeter, about 2.0 kilograms of force per centimeter to about 8.0 kilograms of force per centimeter, about 2.0 kilograms of force per centimeter to about 6.0 kilograms of force per centimeter, about 2.5 kilograms of force per centimeter to about 6.0 kilograms of force per centimeter, or about 3.2 kilograms of force per centimeter to about 6.0 kilograms of force per centimeter when measured according to the Adhesive Peel Strength Test.

In some aspects, the sole component or portion thereof includes a first sole component containing a polyolefin, and a second sole component; wherein the first sole component and the second sole component are adhesively bonded together by a method including (i) applying a chlorinated polyolefin primer to a surface of the textile component to produce a primed surface; and (ii) contacting the second sole component to the primed surface to adhesively bond the second sole component to the surface of the first sole component. The contacting can include pressing the second sole component onto the surface. The contacting can include extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component. In some aspects, the sole component or portion thereof includes a first sole component containing a polyolefin, and a second sole component; wherein the first sole component and the second sole component are adhesively bonded together by a method including (i) applying a chlorinated polyolefin primer to a surface of the textile component to produce a primed surface; (ii) applying a first waterborne polyurethane adhesive to the primed surface to produce an adhesive surface; and (iii) contacting the second sole component to the adhesive surface to adhesively bond the second sole component to the surface of the first sole component.

The method can further include prior to step (i), cleaning the surface of the textile component by one or both of (a) treating the surface with a high energy discharge and (b) applying a chemical cleaner to the surface. The high-energy discharge treatment step in step (i) can include flame treatment by exposing the surface of the first component to a suitable oxidizing flame for a period of about 0.1 seconds to about 10.0 seconds, about 0.2 seconds to about 3.0 seconds, or about 0.3 seconds to about 2.0 seconds. The high-energy discharge treatment step in step (i) can include flame treatment, corona treatment, plasma treatment, or a combination thereof. In step (ii) the chlorinated polyolefin primer can be applied to the treated surface at a thickness of about 0.05 millimeters to about 1.5 millimeters, about 0.1 millimeters to about 1.0 millimeters, about 0.1 millimeters to about 0.5 millimeters, or about 0.2 millimeters to about 0.4 millimeters and then dried.

The methods can include applying heat (a) to the primed surface of the first sole component after applying the chlorinated polyolefin primer, (b) to the adhesive surface of the first sole component after applying the first waterborne polyurethane adhesive, (c) to the surface of the second component after applying the second waterborne polyurethane adhesive, (d) to the primed surface after applying the first waterborne primer, or (e) any combination thereof. The applying heat can include applying heat, e.g. using an oven, at a temperature of about 45° C. to about 75° C. or about 60° C.

In some aspects, the article of footwear or portion thereof includes a first sole component containing a polyolefin resin, and a second sole component containing a polyurethane resin; wherein the first sole component and the second sole component are adhesively bonded together at an interface. The interface can include (1) a chlorinated polyolefin primer disposed on a surface of the first sole component and (2) a polyurethane adhesive disposed between the chlorinated polyolefin primer and a surface of the second sole component. Applicants have found that in some aspects a chlorinated polyolefin primer can create an improved surface for bonding to a component containing a polyolefin such that the adhesive bond formed is capable of meeting the adhesive strength and durability demands of the footwear industry. The includes, in some aspects, an adhesive peel strength between the surface of the first sole component and the surface of the second sole component that is at least 2.0 kilograms of force per centimeter, at least 2.5 kilograms of force per centimeter, at least 3.0 kilograms of force per centimeter, or at least 3.2 kilograms of force per centimeter when measured according to the Adhesive Peel Strength Test. The interface can further include a polyurethane primer disposed with the polyurethane adhesive.

Figure 5:
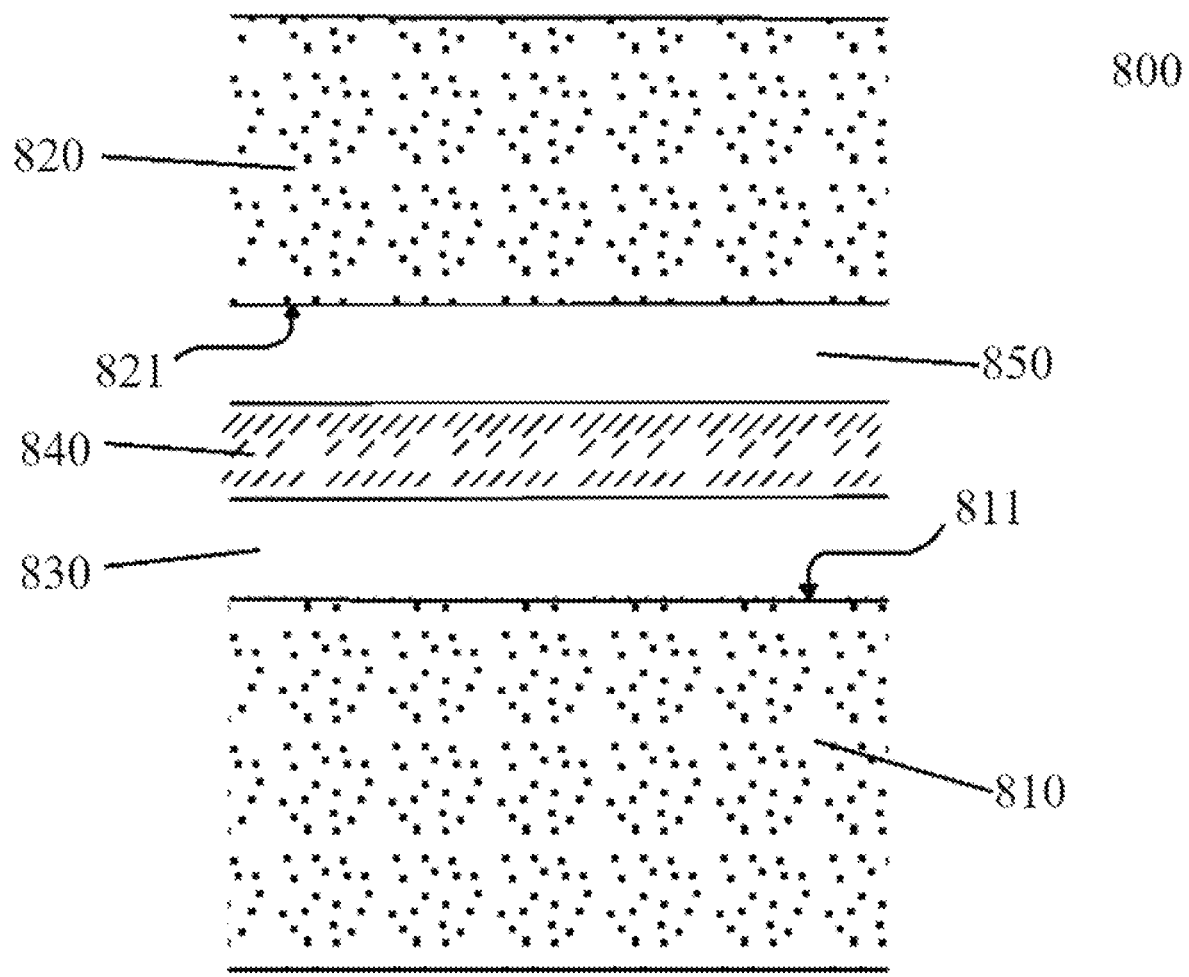
FIG. 5 depicts an exemplary interface adhesively bonding a first component and a second component.

An exemplary interface 800 adhesively bonding a first sole component 810 and a second sole component 820 is depicted in FIG. 5. A chlorinated polyolefin primer 830 disposed on a surface 811 of the first component 810. The first sole component 810 includes a polyolefin resin or other polyolefin material. The chlorinated polyolefin primer 830 can provide an improved surface energy for bonding and for wetting of the adhesive to the polyolefin plate as compared to the surface 811 of the first component 810 except without the chlorinated polyolefin primer, thereby increasing the adhesive strength of the interface 800. A polyurethane adhesive 840 is disposed between the chlorinated polyolefin primer 830 and a surface 821 of the second component 820. The polyurethane adhesive 840 can further include a polyurethane primer disposed with the polyurethane adhesive 840. In some aspects, the surface 821 of the second sole component 820 can also have a second chlorinated polyolefin primer 850.

The methods and interfaces include a chlorinated polyolefin primer or the use thereof. The chlorinated polyolefin primer can include a modified polypropylene. The chlorinated polyolefin primer can include a polyolefin modified with functional groups such as chlorine or chlorine and maleic anhydride functional groups. The chlorinated polyolefin primer can include a polyolefin selected from the group consisting of polyethylene, polypropylene, ethylene-propylene copolymer, ethylene-propylene-diene terpolymer, ethylene-propylene hexadiene terpolymer, ethylene-propylene-dicydcopentadiene terpolymer, and ethylene-propylene-ethylidenenorbornene terpolymer. The chlorinated polyolefin primer can include a polyolefin having a chlorine content of about 20 percent, about 30 percent, about 40 percent, about 50 percent, about 60 percent, or greater. The chlorinated polyolefin primer can include a polyolefin having a molecular weight of about 300 Daltons, about 400 Daltons, about 500 Daltons, about 550 Daltons, or higher. The chlorinated polyolefin primer can be applied in a suitable solvent such as ethyl acetate, methyl ethyl ketone, acetone, a combination thereof, or a combination with one or more additional solvents. The amount of chlorinated polyolefin in the chlorinated polyolefin primer can be about 0.5 wt % to about 40 wt % or about 1 wt % to about 5 wt %, with the remainder being solvent, optionally including one or more additives.

Split tear is an important physical property for a foam for a component of an article of footwear or athletic equipment. In some aspects, the foam or component can have a split tear value of about 1.0 kilograms per centimeter to 4.5 kilograms per centimeter, about 1.6 kilograms per centimeter to 4.0 kilograms per centimeter, about 2.0 kilograms per centimeter to 4.0 kilograms per centimeter, about 2.0 kilograms per centimeter to 3.5 kilograms per centimeter, or about 2.5 kilograms per centimeter to 3.5 kilograms per centimeter. The split tear can be measured as described in the examples below. In some aspects, the foam or component is compression molded, and the compression molded foam or component can have a split tear of about 0.08 kilograms per centimeter to 4.0 kilograms per centimeter, about 0.9 kilograms per centimeter to 3.0 kilograms per centimeter, about 1.0 to 2.0 kilograms per centimeter, about 1.0 kilograms per centimeter to 1.5 kilograms per centimeter, or about 2 kilograms per centimeter. In some aspects, the foam or component is injection molded, and the foam or component can have a split tear of about 0.07 kilograms per centimeter to 2.0 kilograms per centimeter, or about 0.8 kilograms per centimeter to 1.5 kilograms per centimeter, or about 0.9 to 1.2 kilograms per centimeter, about 1.5 kilograms per centimeter to 2.2 kilograms per centimeter.

The energy return, a measure of the percentage of energy the foam or component returns when compressed, is an important physical property. This is especially true for running and other athletic shoes. In some aspects, the foams and components provided herein have an energy return of about 60 percent to 90 percent, about 60 percent to 85 percent, about 65 percent to 85 percent, or about 70 percent to 85 percent. In some aspects, the foam or component is compression molded and can have an energy return of about 60 percent to 95 percent (e.g., about 60 percent to 85 percent; about 65 percent to 80 percent; about 65 percent to 75 percent; about 70 percent to 80 percent; or about 75 percent to 80 percent; about 75 percent to 85 percent; about 80 percent to 95 percent; or about 85 percent to 95 percent). The energy return can be measured as described in the examples below.

The foams and components can be lightweight. In some aspects, the foams and components can have a specific density of about 0.05 to 0.25, about 0.05 to 0.2, about 0.05 to 0.15, about 0.08 to 0.15, about 0.08 to 0.20, about 0.08 to 0.25, or about 0.1 to 0.15. In some aspects the foam or component is compression molded and can have a specific density of about 0.15 to 0.3, about 0.2 to 0.3, or about 0.15 to 0.25.

The foams and components can have desirable stiffness characteristics. In some aspects, the foams and components can have a stiffness of about 30 newtons per millimeter to about 275 newtons per millimeter; about 40 newtons per millimeter to about 275 newtons per millimeter; about 40 newtons per millimeter to about 100 newtons per millimeter; or about 50 newtons per millimeter to about 85 newtons per millimeter.

In some aspects, the foams have a multicellular foam structure. In some instances, the multicellular foam structure is a closed cell foam structure. In other instances, the multicellular foam structure is an open cell foam structure.

In some examples, the process for making the foams and components of the various examples described herein further includes compression molding the foam to give a compression molded foam or a compression molded component. In some aspects, compression molding foamed preforms formed from the foam compositions of the present disclosure can produce compression molded foam components having physical properties which make these components particularly advantageous for use in articles of footwear and athletic equipment. For example, the physical properties of these compression molded foam components make them particularly useful for use as cushioning elements, such as midsoles.

In some aspects, the resiliency and/or energy return of the compression molded foam or compression molded component can be significantly greater than the resiliency and/or energy return of the otherwise same foam preform used to make the compression molded foam component. While compression molded foam components formed from preforms foamed using other blowing methods sometimes have greater resiliency and/or energy return than their preforms, an even greater increase in resiliency and/or energy return can be achieved when compression molding foam preforms that were foamed using an impregnation process utilizing a physical blowing agent, as described herein. The resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component. In particular examples, the resiliency and/or energy return of the compression molded foam component is at least 9 percentage points greater than the resiliency and/or energy return of the foam preform used for make the compression molded foam component.

This greater increase in the resiliency and/or energy return of the compression molded foam component can thus result in components having higher resiliency and/or energy return than would be possible using foam preforms made using other blowing methods. Using the blowing methods described herein, it has been found that it is possible to produce compression molded foam components having higher than usual resiliencies while using materials and methods which are cost-effective for use in consumer goods such as articles of footwear and athletic equipment. The resiliency and/or energy return of the compression molded foam component can be greater than 45 percent, or greater than 50 percent, or greater than 55 percent, or greater than 60 percent, or greater than 65 percent. For example, the resiliency and/or energy return of the compression molded foam component can be from 45 percent to 95 percent, or from 50 percent to 90 percent, or from 55 percent to 90 percent, or from 60 percent to 80 percent, or from 50 percent to 85 percent, or from 55 percent to 75 percent, or from 60 percent to 75 percent. Compression molded foam components having resiliencies greater than 45 percent, or 50 percent, or 55 percent, or 60 percent, or 65 percent, can be particularly advantageous for use in articles of footwear. Additionally or in combination, the resiliency and/or energy return of the foam preform can be less than 75 percent, or less than 70 percent, or less than 65 percent, or less than 60 percent. For example, the resiliency and/or energy return of the foam preform can be from 40 percent to 80 percent, or from 55 percent to 75 percent, or from 50 percent to 70 percent or from 65 percent to 80 percent.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45 percent, or greater than 50 percent, or greater than 55 percent, or greater than 60 percent, or greater than 65 percent.

Several methods of measuring resiliency and/or energy return of foams (e.g., foam preforms and foam components) exist in the art. One method of measuring resiliency of foams is based on ASTM D 2632-92, which is a test for solid rubber materials. For use with foams, the test sample is prepared as described in ASTM D2632-92, but uses a sample of foam in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used.

The specific gravity of a foam is also an important physical property to consider when using a foam for a component of an article of footwear or athletic equipment. The foams and components of the present disclosure can have a specific gravity of from 0.02 grams per cubic centimeter to 0.22 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter, or from 0.10 grams per cubic centimeter to 0.12 grams per cubic centimeter, from 0.15 grams per cubic centimeter to 0.2 grams per cubic centimeter; 0.15 grams per cubic centimeter to 0.30 grams per cubic centimeter. Alternatively or in addition, the foam preform can have a specific gravity of from 0.01 grams per cubic centimeter to 0.10 grams per cubic centimeter, or of from 0.02 grams per cubic centimeter to 0.08 grams per cubic centimeter, or of from 0.03 grams per cubic centimeter to 0.06 grams per cubic centimeter; 0.08 grams per cubic centimeter to 0.15 grams per cubic centimeter; or from 0.10 grams per cubic centimeter to 0.12 grams per cubic centimeter. For example, the specific gravity of the compression molded foam component can be from or from 0.15 grams per cubic centimeter to 0.2 grams per cubic centimeter, and the specific gravity of the foam preform can be from 0.10 grams per cubic centimeter to 0.12 grams per cubic centimeter. The foam or component can be compression molded.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45 percent, or greater than 50 percent, or greater than 55 percent, or greater than 60 percent, or greater than 65 percent, and the compression molded foam can have a specific gravity of from 0.02 grams per cubic centimeter to 0.15 grams per cubic centimeter, or of from 0.03 grams per cubic centimeter to 0.12 grams per cubic centimeter, or of from 0.04 grams per cubic centimeter to 0.10 grams per cubic centimeter or from 0.11 grams per cubic centimeter to 0.12 grams per cubic centimeter, from 0.15 grams per cubic centimeter to 0.2 grams per cubic centimeter; or 0.15 grams per cubic centimeter to 0.30 grams per cubic centimeter.

The specific gravity of the foam or component can be determined by testing at least 3 representative samples taken from a foam preform or compression molded foam component (e.g., a 2 inch×2 inch sample or a 1 inch×1 inch sample), or at least 3 entire foam preforms or compression molded foam components. Using a balance with appropriate accuracy for the weight of the sample, the weight of each sample is determined both in air and when the sample is completely submerged in distilled water at a temperature of 22 degrees Celsius±2 degrees Celsius, after removing any air bubbles adhered to the surface of the foam sample weighing. The specific gravity (S.G.) is then calculated by taking the weight of the sample in water and subtracting that from the weight of the sample in air, and this value is then divided into the weight of the sample in air, where all the weights are weights in grams.

The foam preform or compression molded foam component can have desirable stiffness characteristics. In some aspects, the a foam preform or compression molded foam component can have a stiffness of about 30 newtons per millimeter to about 275 newtons per millimeter; about 40 newtons per millimeter to about 275 newtons per millimeter; about 40 newtons per millimeter to about 100 newtons per millimeter; or about 50 newtons per millimeter to about 85 newtons per millimeter.

In some aspects, the foam preform or compression molded foam component have a multicellular foam structure. In some instances, the multicellular foam structure is a closed cell foam structure. In other instances, the multicellular foam structure is an open cell foam structure.

Compression set of a foam is another important physical property for a foam used as a component of an article of footwear or athletic equipment. In accordance with the present disclosure, the compression molded foam or compression molded component can have a compression set of from 40 percent to 100 percent. For example, the compression set can be from 45 percent to 90 percent, or from 40 percent to 80 percent, or from 50 percent to 75 percent.

Compression set can be measured by preparing a sample of a standard thickness (e.g., 10 millimeter) of a foam preform. Components having a thickness less than the standard can be stacked to make a sample having the standard thickness. The sample is loaded into a metal compression plate and compressed to a height of 50 percent of the original thickness (e.g., 5 millimeter). The sample is placed in a 50 degrees Celsius oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50 percent compressed thickness from the original sample thickness, (c) dividing (a) by (b), and (d) multiplying the result by 100 to obtain the percent compression set (where all thicknesses are measured in millimeters).

Durometer is another important physical property of a foam or component that is to be used in an article of footwear or athletic equipment. In accordance with the present disclosure, the compression molded foam or component can have a durometer of at least 20 Asker C, or at least 30 Asker C, or at least 40 Asker C, or at least 50 Asker C. For example, the durometer of the compression molded foam or compression molded component can have a durometer of from 20 Asker C to 70 Asker C, or of from 20 Asker C to 40 Asker C, or from 30 Asker C to 35 Asker C, or of from 25 Asker C to 65 Asker C, or of from 30 Asker C to 50 Asker C, or of from 40 Asker C to 70 Asker C, or of from 35 Asker C to 55 Asker C, or from 50 Asker C to 65 Asker C. The foam preform can have a durometer of less than 40 Asker C, or less than 30 Asker C, or less than 20 Asker C. For example, the durometer of the foam preform can be from 15 Asker C to 50 Asker C, or from 20 Asker C to 50 Asker C, or from 20 Asker C to 40 Asker C, or from 20 Asker C to 30 Asker C. The durometer can be measured on a flat area of foam, e.g., at least 6 millimeter thick using an Asker C durometer.

In particular examples, the resiliency and/or energy return of the compression molded foam component can be at least at least 6 percentage points, or at least 7 percentage points, or at least 8 percentage points, or at least 9 percentage points, or at least 10 percentage points, or at least 12 percentage points greater than the resiliency and/or energy return of the foam preform used to make the compression molded foam component when the compression molded foam component has a resiliency and/or energy return greater than 45 percent, or greater than 50 percent, or greater than 55 percent, or greater than 60 percent, or greater than 65 percent, and the compression molded foam component can have a of at least 20 Asker C, or at least 30 Asker C, or at least 40 Asker C, or at least 50 Asker C. In addition, the compression molded foam can have a specific gravity of from 0.02 grams per cubic centimeter to 0.15 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter from 0.15 grams per cubic centimeter to 0.2 grams per cubic centimeter; or 0.15 grams per cubic centimeter to 0.30 grams per cubic centimeter.

Split tear is another important physical property for a foam or a component used in an article of footwear or athletic equipment. In accordance with the present disclosure, the compression molded foam or component can have a split tear of from 0.08 kilograms per centimeter to 4.0 kilograms per centimeter, or of from 0.9 kilograms per centimeter to 3.0 kilograms per centimeter, or of from 1.0 to 2.0 kilograms per centimeter, or of from 1.0 kilograms per centimeter to 1.5 kilograms per centimeter, or of about 2 kilograms per centimeter. Alternatively or in addition, the foam preform can have a split tear of from 0.07 kilograms per centimeter to 2.0 kilograms per centimeter, or of from 0.8 kilograms per centimeter to 1.5 kilograms per centimeter, or of from 0.9 to 1.2 kilograms per centimeter, or from about 1.5 kilograms per centimeter to about 2.2 kilograms per centimeter.

Split tear for foam preforms and compression molded foam components can be measured using ASTM D3574-95. Although this method is directed to bonded and molded urethane foams, it can be used on any foam material in accordance with the present disclosure. A sample of foam having a thickness of 10 millimeter±1 millimeter. If the foam preform or compression molded foam component has an outer skin, the outer skin should not be present on the test sample. A 3 centimeter long cut is placed in the center of one end of the specimen, and marked in five successive 2 centimeter portions along the edge of the sample. The sample is tested as described in ASTM D3574-95.

The tear strength of the compression molded foam component can range from 4 kilograms per centimeter to 10 kilograms per centimeter.

The tensile strength of the foam is another important physical characteristic. The foam or component can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter. The tensile strength can be measured on a die cut sample of the foam in the shape of a dumbbell of a standard size such as a 2.5 centimeter in width by 11.5 centimeter in length, with a minimum thickness of 3 to 4 millimeter. The dumbbell follows the shape described in ASTM D412, die degrees Celsius. The sample is loaded symmetrically into and tested using a long travel extensometer such as the Instron 2603-080 which allows for a minimum of 1000 percent strain with a gauge length of 25 millimeter and a resolution of at least 0.1 millimeter. The tensile value at the failure point of the sample (the point during testing when the load value initially drops) is recorded. The foam or component can be compression molded.

Another physical property to consider when determining whether or not a foam is suitable for use as a component of an article of footwear or athletic equipment is its 300 percent elongation. The compression molded foam or component can have an elongation of at least 125 kilograms per square centimeter, or at least 150 kilograms per square centimeter.

Some examples described herein are directed to a foam article (e.g., articles used to make at least portions of footwear or athletic equipment) made by a process/method comprising: forming a pre-foam composition comprising a polymer comprising styrene repeating units and non-styrenic repeating units; and a $C_4$-$C_{100}$ unsaturated olefin; crosslinking the polymer comprising styrene repeating units and non-styrenic repeating units and the $C_4$-$C_{100}$ unsaturated olefin olefin block copolymer of the pre-foam composition, forming a crosslinked pre-foam composition; and blowing the pre-foam composition, the crosslinked pre-foam composition, or blowing both the pre-foam composition and the crosslinked pre-foam composition, to give a foam article. In some examples, the cross-linking and the blowing can occur substantially simultaneously. In some examples, the process for forming foam articles further comprises injection molding the pre-foam composition, and the crosslinking occurs during the injection molding. In some examples, the crosslinked composition, or both the pre-foam composition and the crosslinked composition are blown in a mold. In some examples, the crosslinking occurs during the injection molding (e.g., the crosslinking occurs substantially in the mold).

In some examples, the foam articles of the various examples described herein can further comprise at least one ethylene vinyl acetate copolymer and/or at least one olefin block copolymer, as each of the terms is defined herein. The component, such as the midsole, can have a variety of beneficial properties.

It has been found that, for many examples, the resiliency and/or energy return (also referred to as energy return) of the compression molded foam article can be significantly greater than the resiliency and/or energy return of the foam article used to make the compression molded foam article. While compression molded foam articles formed using other blowing methods sometimes have greater resiliency and/or energy return than the corresponding foam article, an even greater increase in resiliency and/or energy return can be achieved when compression molding foam articles that were foamed using an impregnation process utilizing a physical blowing agent, as described herein. The resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article. In particular examples, the resiliency and/or energy return of the compression molded foam article is at least 9 percentage points greater than the resiliency and/or energy return of the foam article used for make the compression molded foam article.

This greater increase in the resiliency and/or energy return of the compression molded foam article can thus result in components having higher resiliency and/or energy return than would be possible using foam articles made using other blowing methods. Using the blowing methods described herein, it has been found that it is possible to produce compression molded foam articles having higher than usual resiliencies while using materials and methods which are cost-effective for use in consumer goods such as articles of footwear and athletic equipment. The resiliency and/or energy return of the compression molded foam article can be greater than 45 percent, or greater than 50 percent, or greater than 55 percent, or greater than 60 percent, or greater than 65 percent. For example, the resiliency and/or energy return of the compression molded foam article can be from 45 percent to 95 percent, or from 50 percent to 90 percent, or from 55 percent to 90 percent, or from 60 percent to 80 percent, or from 50 percent to 85 percent, or from 55 percent to 75 percent, or from 60 percent to 75 percent. Compression molded foam articles having resiliencies greater than 45 percent, or 50 percent, or 55 percent, or 60 percent, or 65 percent, can be particularly advantageous for use in articles of footwear. Additionally or in combination, the resiliency and/or energy return of the foam article can be less than 75 percent, or less than 70 percent, or less than 65 percent, or less than 60 percent. For example, the resiliency and/or energy return of the foam article can be from 40 percent to 80 percent, or from 55 percent to 75 percent, or from 50 percent to 70 percent or from 65 percent to 80 percent.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45 percent, or greater than 50 percent, or greater than 55 percent, or greater than 60 percent, or greater than 65 percent.

The specific gravity of a foam article is also an important physical property to consider when using a foam for a component of an article of footwear or athletic equipment. The compression molded foam articles of the present disclosure can have a specific gravity of from 0.02 grams per cubic centimeter to 0.22 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter, or from 0.10 grams per cubic centimeter to 0.12 grams per cubic centimeter, from 0.15 grams per cubic centimeter to 0.2 grams per cubic centimeter; 0.15 grams per cubic centimeter to 0.30 grams per cubic centimeter. Alternatively or in addition, the foam article can have a specific gravity of from 0.01 grams per cubic centimeter to 0.10 grams per cubic centimeter, or of from 0.02 grams per cubic centimeter to 0.08 grams per cubic centimeter, or of from 0.03 grams per cubic centimeter to 0.06 grams per cubic centimeter; 0.08 grams per cubic centimeter to 0.15 grams per cubic centimeter; or from 0.10 grams per cubic centimeter to 0.12 grams per cubic centimeter. For example, the specific gravity of the compression molded foam article can be from or from 0.15 grams per cubic centimeter to 0.2 grams per cubic centimeter, and the specific gravity of the foam article can be from 0.10 grams per cubic centimeter to 0.12 grams per cubic centimeter.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45 percent, or greater than 50 percent, or greater than 55 percent, or greater than 60 percent, or greater than 65 percent, and the compression molded foam article can have a specific gravity of from 0.02 grams per cubic centimeter to 0.15 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter from 0.15 grams per cubic centimeter to 0.2 grams per cubic centimeter; or 0.15 grams per cubic centimeter to 0.30 grams per cubic centimeter.

Compression set of a foam article is another important physical property for a foam used as a component of an article of footwear or athletic equipment. In accordance with the present disclosure, the compression molded foam article can have a compression set of from 40 percent to 100 percent. For example, the compression set can be from 45 percent to 90 percent, or from 40 percent to 80 percent, or from 50 percent to 75 percent.

Durometer is another important physical property of a foam article used as an article of footwear or athletic equipment. In accordance with the present disclosure, the compression molded foam article can have a durometer of at least 20 Asker C, or at least 30 Asker C, or at least 40 Asker C, or at least 50 Asker C. For example, the durometer of the compression molded foam article can have a durometer of from 20 Asker C to 70 Asker C, or of from 20 Asker C to 40 Asker C, or from 30 Asker C to 35 Asker C, or of from 25 Asker C to 65 Asker C, or of from 30 Asker C to 50 Asker C, or of from 40 Asker C to 70 Asker C, or of from 35 Asker C to 55 Asker C, or from 50 Asker C to 65 Asker C. The foam article can have a durometer of less than 40 Asker C, or less than 30 Asker C, or less than 20 Asker C. For example, the durometer of the foam preform can be from 15 Asker C to 50 Asker C, or from 20 Asker C to 50 Asker C, or from 20 Asker C to 40 Asker C, or from 20 Asker C to 30 Asker C. The durometer can be measured on a flat area of foam, e.g., at least 6 millimeter thick using an Asker C durometer.

In particular examples, the resiliency and/or energy return of the compression molded foam article can be at least at least 6 percentage points, or at least 7 percentage points, or at least 8 percentage points, or at least 9 percentage points, or at least 10 percentage points, or at least 12 percentage points greater than the resiliency and/or energy return of the foam article used to make the compression molded foam article when the compression molded foam article has a resiliency and/or energy return greater than 45 percent, or greater than 50 percent, or greater than 55 percent, or greater than 60 percent, or greater than 65 percent, and the compression molded foam article can have a of at least 20 Asker C, or at least 30 Asker C, or at least 40 Asker C, or at least 50 Asker C. In addition, the compression molded foam article can have a specific gravity of from 0.02 grams per cubic centimeter to 0.15 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter from 0.15 grams per cubic centimeter to 0.2 grams per cubic centimeter; or 0.15 grams per cubic centimeter to 0.30 grams per cubic centimeter.

The tear strength of the compression molded foam or article can range from 4 kilograms per centimeter to 10 kilograms per centimeter. The tensile strength of the foam or article is another important physical characteristic. The compression molded foam article can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter.

Another physical property to consider when determining whether or not a foam article is suitable for use as a component of an article of footwear or athletic equipment is its 300 percent elongation. The compression molded foam article can have an elongation of at least 125 kilograms per square centimeter, or at least 150 kilograms per square centimeter.

Various examples include methods of manufacturing an article of footwear or components for an article of footwear. In some examples, the methods of manufacturing an article of footwear include blowing a composition described herein to give a foam article; compression molding the foam article to make a compression molded component for an article of footwear. The component can be a midsole, and the method can include providing an upper and an outsole for an article of footwear; and combining the compression molded midsole, the upper, and the outsole to make an article of footwear. In some examples, the method of manufacturing the article of footwear includes combining a compression molded foam article, an upper, and an outsole to make an article of footwear.

In some aspects, the present disclosure is directed to a compression molded foam, and to a method of forming compression molded foam for, among other applications, articles of footwear or athletic equipment. In some examples, the method can be a process comprising providing (e.g., preparing) a foam preform and then compression molding the foam preform to form a compression molded foam.

The present inventors have recognized, among other things, that the compression molded foam of the various examples described herein has improved physical characteristics, such as, for example, improved resiliency and/or energy return.

In some examples, one step of the method comprises providing (e.g., preparing or obtaining) a pre-foam composition as disclosed herein. For example, the pre-foam composition can be prepared using any method known in the art, including using a suitable kneader, a suitable single-screw or a suitable twin-screw extruder. An extruder (e.g., single or twin screw) can be used to provide a pre-foam composition. The extruder can have a motor to turn a screw inside the extruder. Screw may be a single screw or twin screws made of individual elements of various sizes and pitches appropriate for mixing or kneading the specific materials used. In some examples, the extruder has a twin screw.

The various components that make up the pre-foam compositions of the various examples described herein (e.g., a polymer comprising styrene repeating units and non-styrenic repeating units; a $C_4$-$C_{100}$ unsaturated olefin; and optionally one or more additional components selected from an ethylene vinyl acetate copolymer; an olefin block copolymer; blowing agent; a crosslinking agent, and any combination thereof) are added into the extruder through a port. In some examples, the pre-foam compositions of the various examples described herein can be at least partially crosslinked at a first crosslinking temperature in, e.g., section of extruder to form a crosslinked pre-foam composition (e.g., at least partially crosslinked pre-foam composition), which, in some examples, may be a thermoplastic crosslinked pre-foam composition. Various other components (e.g., pigments, fillers, and blowing agents) can be added via a port into the extruder and mixed or kneaded with the pre-foam compositions and/or the crosslinked pre-foam composition (e.g., at least partially crosslinked pre-foam composition).

The various components that make up the pre-foam compositions of the various examples described herein may be added as a melt or as appropriately-sized solid particles, for example chips or pellets, that are melted in section as they are mixed or kneaded with, e.g., the crosslinked pre-foam composition (e.g., at least partially crosslinked pre-foam composition).

The contents of the extruder or mixer may be heated to, achieve, among other things, crosslinking of the pre-foam compositions to give a crosslinked pre-foam composition (e.g., at least partially crosslinked pre-foam composition). In other examples, the heating may trigger foaming (i.e., blowing) (e.g., via triggering a chemical blowing agent), thereby converting the crosslinked pre-foam composition (e.g., at least partially crosslinked pre-foam composition) to a foam composition that is sufficiently thermoplastic to be extruded or injected into a mold from the extruder 10. Alternatively, the crosslinked pre-foam composition (e.g., at least partially crosslinked pre-foam composition) can be foamed in the extruder using a physical blowing agent. And, in some examples, a chemical blowing agent can also be present, such that, when there is heating, the heating can trigger the chemical blowing agent.

In some examples, the pre-foam compositions may be added as a melt at a temperature close to or at the crosslinking temperature such that crosslinking can occur, but at a temperature that is sufficiently below the temperature that would trigger blowing. The temperature of the extruder can then be increased to a temperature close to or at the triggering temperature of a chemical blowing agent, thereby giving a foam composition.

The extent to which the pre-foam compositions is crosslinked to give a crosslinked pre-foam composition (e.g., at least partially crosslinked pre-foam composition) can be controlled so that the crosslinked pre-foam composition (e.g., at least partially crosslinked pre-foam composition) remains thermoplastic and can be mixed with various other components (e.g., pigments, fillers, and blowing agents) if necessary. This can be accomplished in various ways, for instance by controlling the amount of time for crosslinking; by controlling the crosslinking temperature; by causing a temperature reduction at a desired point of crosslinking to stop or slow further crosslinking; or by a combination of these. For example, the amount of time for crosslinking can be controlled by controlling screw speed, by locating port 8 closer to or further from port 6, or by a combination of these.

In some examples, as the crosslinking density increases, the crosslinked pre-foam composition (e.g., at least partially crosslinked pre-foam composition) can form phase separated domains, wherein, for example, the styrenic segments of the crosslinked polymer comprising styrene repeating units and non-styrenic repeating units phase separate into predominately styrene-rich domains.

A crosslinked pre-foam composition (e.g., at least partially crosslinked pre-foam composition) or a foam composition, each of which is sufficiently thermoplastic to be extruded or injected into a mold from the extruder, is extruded at an end of the extruded opposite the motor. In some examples, a vacuum port may be used to remove volatiles, for example water, volatile organic liquids that may have been introduced as solvents with some materials, crosslinking reaction by-products or blowing agent by-products. The extrudate may be shaped by being extruded through a die (not shown). For example, the extrudate (e.g., crosslinked pre-foam composition or foam composition) may be extruded in the form of strands that are then pelletized, in the form of a tube, or in the form of a sheet. The pelletization can be conducted using a cooled die. Additionally or alternatively, the pelletization can be performed under water, thus cooling the resulting pellets as they exited the pelletization die.

In some examples, the foam preforms of the various examples described herein are obtained by blowing the pre-foam composition, the crosslinked composition, or both the pre-foam composition and the crosslinked composition by about 150 percent to about 240 percent (e.g., from about 150 percent to about 220 percent; about 150 percent to about 200 percent, about 175 percent to about 225 percent, about 180 percent to about 230 percent or about 160 percent to about 240 percent) in at least one dimension (e.g., the vertical dimension) using a blowing agent.

In some examples, the foam preforms of the various examples described herein are made using a process that involves impregnating a pre-foam composition, a crosslinked pre-foam composition or combinations thereof (e.g., at or above a softening temperature of the pre-foam composition, crosslinked pre-foam composition or combinations thereof) with a physical blowing agent at a first concentration or first pressure.

As used herein, the term "impregnating" generally means dissolving or suspending a physical blowing agent in a pre-foam composition, a crosslinked pre-foam composition or combinations thereof. The impregnated pre-foam composition, crosslinked pre-foam composition or combinations thereof can then be foamed, or can be cooled (when applicable) and re-softened (when applicable) for blowing at a later time.

In some instances, the impregnated pre-foam composition, crosslinked pre-foam composition or combinations thereof is foamed by reducing the concentration or pressure of the physical blowing agent. The reduction in concentration of the physical blowing agent can release additional amounts (e.g., to create a secondary expansion of an originally-formed microcell in the pre-foam composition, crosslinked pre-foam composition or combinations thereof) of the impregnated physical blowing agent from the pre-foam composition, crosslinked pre-foam composition or combinations thereof, to further blow the pre-foam composition, crosslinked pre-foam composition or combinations thereof, forming a foam composition (e.g., a foam composition having a closed-cell structure).

In addition to injection molding, the pre-foam compositions of the present disclosure can be foamed and optionally molded using various processes known in the art. For example, the pre-foam compositions can be used to form slab foam, particulate (e.g., bead) foams of various shapes and sizes, etc. These various forms of foam can then be used in different ways. For example, slab foam can be used directly as a finished foam article, can be shaped (e.g., cut or trimmed) to form a finished foam article, or can be compression molded to form a finished foam article. The foams can be subjected to annealing processes as part of forming the finished foam article. Pellets of the pre-foam compositions can be used to form individual particulate foams, or can be foamed and molded to form unitary molded foam articles composed of individual portions of foam affixed to each other.

The foam compositions of the various examples described herein (e.g., foam preforms) may be further shaped or molded by any of the methods known for forming articles from thermoplastic materials.

Another step of the method for forming compression molded foam includes providing a foam preform that has been foamed using any suitable blowing process (e.g., blowing using a physical and/or chemical blowing agent), and then compression molding the foam preform to form a compression molded foam.

In some examples, the foam preform is prepared by a process comprising (i) softening a pre-foam composition, a crosslinked pre-foam composition or combinations thereof (e.g., by heating at a first temperature at or above a softening temperature of the pre-foam composition, crosslinked pre-foam composition or combinations thereof); (ii) simultaneously or sequentially with the softening (when applicable), contacting the pre-foam composition, crosslinked pre-foam composition or combinations thereof with a first concentration or first pressure of a physical blowing agent sufficient to drive an amount of the physical blowing agent into the pre-foam composition, crosslinked pre-foam composition or combinations thereof; (iii) changing the concentration or pressure (e.g., decreasing the pressure or concentration) of the physical blowing agent to a second concentration or second pressure that is effective to foam the pre-foam composition, crosslinked pre-foam composition or combinations thereof, thereby forming a foam composition (e.g., a foam composition having a closed-cell structure); and, (iv)

following the changing, cooling (when applicable) the foam composition to (e.g., cooling to a temperature below the softening temperature of the foam composition), to form a foam preform having an initial height. In some examples, this process is conducted with a composition comprising, consisting essentially of or consisting of a crosslinked pre-foam composition.

In other examples, the foam preform is prepared by (i) contacting (e.g., dissolving or suspending) the pre-foam composition, crosslinked pre-foam composition or combinations thereof with a first concentration of a chemical blowing agent, in some examples, at or above a softening temperature of the pre-foam composition, crosslinked pre-foam composition or combinations thereof; (ii) triggering the chemical blowing agent to foam the pre-foam composition, crosslinked pre-foam composition or combinations thereof, thereby forming a foam composition (e.g., a foam composition having a closed-cell structure); and, (iii) following the triggering, in some examples, cooling the foam composition to, e.g., a temperature below its softening temperature, to form a foam preform having an initial height. In some examples, this process is conducted with a composition comprising, consisting essentially of or consisting of a crosslinked pre-foam composition. In some examples, the "triggering" of the chemical blowing agent is performed by any suitable method, including heating the pre-foam composition, crosslinked pre-foam composition or combinations thereof comprising a concentration of the chemical blowing agent to a temperature sufficient to "trigger" the chemical blowing agent, wherein the concentration of the chemical blowing agent is effective to foam the pre-foam composition, crosslinked pre-foam composition or combinations thereof, thereby forming a foam composition (e.g., a foam composition having a closed-cell structure).

In some examples, the contacting comprises contacting at a pressure of from about 10 megapascals to about 100 megapascals (e.g., from about 30 megapascals to about 100 megapascals, about 20 megapascals to about 80 megapascals, about 30 megapascals to about 60 megapascals or about 40 megapascals to about 70 megapascals).

In some examples, whether the foam preform is prepared using a physical or chemical blowing agent, a foamed composition (e.g, in the form of a foam preform) can be compression molded. For example, the foamed composition can be compression molded by placing the foam preform in a compression mold having a height less than the initial height of the foam preform and closing the mold, thereby compressing the foam preform to the height of the mold. Simultaneously or sequentially with the compressing, the foam preform can be heated in the closed compression mold. During the compression molding, the temperature of at least a portion of the foam preform in the closed mold can be raised to a temperature within +30 degrees Celsius of the softening temperature of the foam composition. The temperature can be raised by heating the closed mold. Following the raising of the temperature, while the foam preform remains closed in the compression mold, the temperature of at least a portion of the foam preform can be lowered. The temperature can be lowered by cooling the closed mold. The lowering can lower the temperature of at least a portion of the foam preform to a temperature at least 35 degrees Celsius below the softening temperature of the foamed composition, thereby forming the compression molded foam. Following the cooling, the compression mold can be opened, and the compression molded foam can be removed from the compression mold.

Some examples contemplated herein are directed to compression molded components of articles of footwear or athletic equipment made in accordance with the compositions and processes described herein.

Other examples contemplated herein are directed to methods of manufacturing articles of footwear or athletic equipment. For example, the method can comprise providing a compression molded foam component of an article of footwear in accordance with the present disclosure, and combining the component with a footwear upper and an outsole to form the article of footwear. Similarly, the method can comprise providing a compression molded foam component of an article of athletic equipment in accordance with the present disclosure, and combining the compression molded foam component with other components to form a finished article of athletic equipment.

One method of making a compression molded foam (and compression molded foam articles) described herein comprises forming a foam preform and compression molding the foam preform to make a compression molded foam. In some examples, the foam preforms of the various examples described herein are obtained by blowing the pre-foam composition, the crosslinked composition, or both the pre-foam composition and the crosslinked composition by about 150 percent to about 240 percent (e.g., from about 150 percent to about 220 percent; about 150 percent to about 200 percent, about 175 percent to about 225 percent, about 180 percent to about 230 percent or about 160 percent to about 240 percent) in at least one dimension (e.g., the vertical dimension) using a blowing agent. In some examples, the blown pre-foam composition, the crosslinked composition, or both the pre-foam composition and the crosslinked composition can be compression molded to about 120 percent to about 200 percent (e.g., from about 120 percent to about 180 percent; about 130 percent to about 190 percent; about 150 percent to about 200 percent; or about 160 percent to about 190 percent) in at least one dimension.

Thus for example, if the foaming of the pre-foam composition, the crosslinked composition, or both the pre-foam composition and the crosslinked composition is about 200 percent, the blown pre-foam composition, the crosslinked composition, or both the pre-foam composition and the crosslinked composition can be compression molded by a net 20 percent by compression molding to about 180 percent. In another example, if the pre-foam composition, the crosslinked composition, or both the pre-foam composition and the crosslinked composition is blown into a 20 millimeter (height)×10 centimeter (width)×5 centimeter (depth) slab, and the slab is compression molded in the height direction by 20 percent, the compression molded slab would have the dimensions 18 millimeter (height)×10 centimeter (width)×5 centimeter (depth). In some examples, the compression molding is substantially maintained.

In some examples, the foam preform is made using a process that involves impregnating a pre-foam composition, a crosslinked pre-foam composition or combinations thereof (e.g., at or above a softening temperature of the pre-foam composition, crosslinked pre-foam composition or combinations thereof) with a physical blowing agent at a first concentration or first pressure. The impregnated pre-foam composition, crosslinked pre-foam composition or combinations thereof can then be foamed, or can be cooled (when applicable) and re-softened (when applicable) for blowing at a later time. In some instances, the impregnated pre-foam composition, crosslinked pre-foam composition or combinations thereof is foamed by reducing the concentration or pressure of the physical blowing agent. The reduction in concentration of the physical blowing agent can release additional amounts of the impregnated physical blowing agent from the pre-foam composition, crosslinked pre-foam composition or combinations thereof, to further blow the pre-foam composition, crosslinked pre-foam composition or combinations thereof, forming a foam composition (e.g., a foam composition having a closed-cell structure).

In some examples, the compression molding process is conducted by heating the foam preform in a closed compression mold. The foam preform is heated to a temperature close to its softening temperature, to allow the foam to retain the shape of the compression mold. For example, the foam preform can be heated to a temperature within ±30 degrees Celsius of its softening temperature, or within ±20 degrees Celsius of its softening temperature, or within ±10 degrees Celsius of its softening temperature, or within ±5 degrees Celsius of its softening temperature. For example, the foam preform can be heated to a temperature of from about 100 degrees Celsius to about 250 degrees Celsius, or of from about 140 degrees Celsius to about 220 degrees Celsius, or of from about 100 degrees Celsius to about 150 degrees Celsius, or of from about 130 degrees Celsius to about 150 degrees Celsius.

The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam from the mold.

The compression molding of the foam preform in the compression mold can result in a closed skin forming on the final compression molded foam component. However, care should be taken during the compression molding not to subject the foam preform to conditions such that more than a desired amount of the closed cell structures of the foam collapse. One way to avoid collapsing more than a desired amount of the closed cell structures is to control the temperature of the polymeric composition, for example, by controlling the temperature of the mold. For example, during the compression molding step, the heating of the foam preform in the compression mold can be conducted for time of from 100 seconds to 1,000 seconds, or of from 150 seconds to 700 seconds.

Once the foam preform has been heated in the compression mold at the appropriate temperature for the desired length of time to soften the preform to the desired level, the softened preform is cooled, for example, to a temperature at least 35 degrees Celsius below its softening temperature, or at least 50 degrees Celsius below its softening temperature, or at least 80 degrees Celsius below its softening temperature, to re-solidify the softened foam, thereby forming the compression molded foam. Once cooled, the compression molded foam component is removed from the compression mold. Following the heating, the cooling of the foam preform in the compression mold can be conducted for a time of from 50 to 1,000 seconds, or for a time of from 100 to 400 seconds.

The sole structures and portions thereof include a second component adhered to a surface of a first component that includes a foam described herein. The second component can include, for instance, a polyurethane resin. The polyurethane resin can include a reaction product of a first component comprising a first functional group and a second component comprising a second functional group, wherein, the second functional group is reactive with the first functional group; and at least one of the first functional group and the second functional group comprises a saturated functional group. Saturated functional groups can include a hydroxyl, a thiol, a primary amine, a secondary amine, an epoxy, or a combination thereof. In some aspects, each of the first functional group and the second functional group does not comprise an acrylate group or a methacrylate group.

In some aspects, the first component comprises a polyamine and the second component comprises a polyisocyanate. In some aspects, the first component comprises a Michael addition acceptor and the second component comprises a Michael addition donor. In some aspects, the first component comprises an isocyanate-functional prepolymer; and the second functional group comprises a primary amine, a secondary amine, a hydroxyl, or a combination thereof. The polyurethane resin can be the reaction product of an isocyanate prepolymer with a second prepolymer. Suitable second prepolymers can include a diacid prepolymer that reacts with the isocyanate prepolymer, a diol prepolymer that reacts with the isocyanate prepolymer, a diamine prepolymer that reacts with the isocyanate prepolymer, and a combination thereof. One or both of the diacid prepolymer and the second prepolymer can be multifunctional.

In some aspects, the second sole component can be printed or extruded directly onto the surface of the first sole component. For example, the second sole component can be made by a process comprising (a) priming a surface of the first sole component to produce a primed surface; and (b) extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

Priming the surface can include one or more of buffing the surface of the first component, cleaning the surface of the first component, and applying a primer to the surface of the first component. For example, the surface of the first component can be buffed using sandpaper (e.g., 100-grit sand paper), and then the surface can be cleaned by blowing it with compressed air and/or vacuuming it. Additionally, the surface can be cleaned by applying acetone or an aqueous solution of acetone, and allowing the surface to dry prior to applying any primer. The surface can further be treated using one or more components of a plastic preparation system, such as PPG ONECHOICE OC-1 (PPG Industries, Pittsburgh, Pa., USA). An anti-static cleaning product or a film former or both, such as PPG ONECHOICE SU4902 plastic adhesion wipe, can be used and then allowed to dry. Following preparation of the surface, a primer such as, for example, PPG SU4903 or SUA 4903 Plastic Bond can be applied and allowed to dry prior to application of the second component to the first component.

The extruding can include extruding a composition comprising the first component and the second component. In some aspects, extruding comprises extruding a composition comprising the first component and the second component, wherein a ratio (mass/mass) of the first component to the second component is about 0.9 to about 1.1. In some aspects, the extruding comprises extruding a composition comprising the first component and the second component onto the primed surface at a rate of about 0.01 milliliters per second (ml/s) to about 0.02 ml/s. In some aspects, the extruding comprises extruding a composition comprising the first component and the second component at a linear gantry speed of about 6 millimeters per second (mm/s) to about 10 millimeter/s.

In some aspects, the composition comprises a thermosetting composition. In some aspects, the composition is characterized by a shear storage modulus G' and a shear loss modulus G", wherein, the initial G"/G' ratio is less than 1.5; the initial G' is greater than 2,000 Pa; the G' at 6 minutes is greater than 1,000,000 Pa; and the G" at 6 minutes is greater than 600,000 Pa.; wherein, the initial G"/G' ratio and the initial G' refer to values measured within 30 seconds after the first component and the second component are mixed; the G' and G" after 6 minutes refers to the values measured 6 minutes after the first component and the second component are mixed; and the shear storage modulus G' and the shear loss modulus G" are measured using a rheometer with a gap from 1 millimeter to 2 millimeter, with a 25 millimeter-diameter parallel plate spindle, an oscillation frequency of 1 hertz and amplitude of 0.3 percent, and with a rheometer plate temperature of 25 degrees Celsius. In some aspects, the composition is characterized by an initial equivalent ratio of the first functional group to the second functional group is from 1.5:1 to 1:1.5. In some aspects, the composition is characterized by a viscosity from 5,000 centipoise to 5,000,000 centipoise, measured using a rheometer with a gap from 1 millimeter to 2 millimeter, a shear rate of $0.1\ s^{-1}$ at a temperature of 25 degrees Celsius. The composition can be a thermosetting composition. In some aspects, the composition is substantially free of solvent.

Compositions

In various aspects, compositions are provided that can be foamed, i.e. can be used to form a foam composition. In some aspects, these compositions are referred to as a "prefoam composition." In some aspects, the compositions can be used to generate foam compositions that are soft and have a high energy return making them useful for footwear. The compositions can be used to generate foams using any of a variety of methods known in the art. In some aspects, the foams are generated using injection molding or injection molding followed by compression molding techniques. The foamed compositions can include components of articles of footwear as described above, for example a midsole 146 as depicted in FIGS. 1A-1B.

The compositions described herein, when used to form foams, in some aspects produced foams having surprisingly high energy return/resiliency values. These compositions also, when used to form foams, in some aspects produce foams having high split-tear values. The compositions can, in some aspects, be used to produce foams having other beneficial properties, including additional properties beneficial for use in footwear including as cushioning components. The compositions of the present disclosure can be foamed and/or molded using various methods. In one example, the polymeric compositions can be foamed as part of an injection molding process. Optionally, the injection molded foam can subsequently be compression molded. Compression molding of the injection molded foam can modify the properties of the polymeric foam, such as reducing the compression set of the foam, which can be beneficial for foams used in footwear-related applications. Foams formed from the polymeric compositions of the present disclosure can be used in footwear-related applications without being compression molded.

In various aspects, a first sole component is provided including a polyolefin resin. For example, in some aspects the polyolefin resin includes a polyolefin copolymer and an effective amount of a polymeric resin modifier. In some aspects, the polyolefin resin has an abrasion loss of about 0.08 cubic centimeters to about 0.1 cubic centimeters pursuant to ASTM D 5963-97a using the Material Sampling Procedure. In some aspects, the effective amount of the polymeric resin modifier is an amount effective to allow the polyolefin resin to pass a flex test pursuant to the Cold Ross Flex Test using the Plaque Sampling Procedure. In some aspects, the effective amount of the polymeric resin modifier is an amount effective to allow the polyolefin resin to pass a flex test pursuant to the Cold Ross Flex Test using the Plaque Sampling Procedure without a significant change in an abrasion loss as compared to an abrasion loss of a second resin composition identical to the polyolefin resin except without the polymeric resin modifier when measured pursuant to ASTM D 5963-97a using the Material Sampling Procedure. In some aspects, the polyolefin resin includes a polyolefin copolymer, and an effective amount of a polymeric resin modifier. In some aspects, the polyolefin resin has an abrasion loss of about 0.05 cubic centimeters to about 0.1 cubic centimeters or about 0.08 cubic centimeters to about 0.1 cubic centimeters pursuant to ASTM D 5963-97a using the Material Sampling Procedure. In some aspects, the effective amount of the polymeric resin modifier is an amount effective to allow the resin composition to pass a flex test pursuant to the Cold Ross Flex Test using the Plaque Sampling Procedure. In some aspects, the abrasion loss of the polyolefin resin is about 0.08 cubic centimeters to about 0.1 cubic centimeters. In some aspects, the polyolefin copolymer is a random copolymer. In some aspects, the polyolefin copolymer comprises a plurality of repeat units, with each of the plurality of repeat units individually derived from an alkene monomer having about 1 to about 6 carbon atoms. In some aspects, the polyolefin copolymer comprises a plurality of repeat units, with each of the plurality of repeat units individually derived from a monomer selected from the group consisting of ethylene, propylene, 4-methyl-1-pentene, 1-butene, and a combination thereof. In some aspects, the polyolefin copolymer comprises a plurality of repeat units each individually selected from Formula 1A-1D

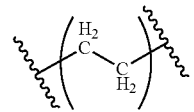

Formula 1A

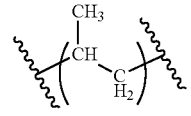

Formula 1B

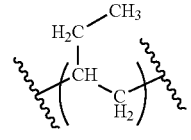

Formula 1C

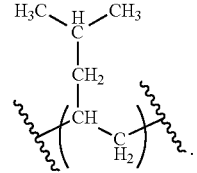

Formula 1D

In some aspects, the polyolefin copolymer comprises a plurality of repeat units each individually having a structure according to Formula 2

Formula 2

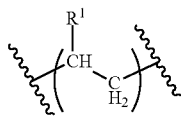

where $R^1$ is a hydrogen or a substituted or unsubstituted, linear or branched, $C_1$-$C_{12}$ alkyl or heteroalkyl.

In some aspects, the polymers in the polyolefin resin consist essentially of polyolefin copolymers. In some aspects, the copolymer is a random copolymer of a first plurality of repeat units and a second plurality of repeat units, and wherein each repeat unit in the first plurality of repeat units is derived from ethylene and the each repeat unit in the second plurality of repeat units is derived from a second olefin. In some aspects, the second olefin is selected from the group consisting of propylene, 4-methyl-1-pentene, 1-butene, and other linear or branched terminal alkenes having about 3 to 12 carbon atoms. In some aspects, each of the repeat units in the first plurality of repeat units has a structure according to Formula 1A, and wherein each of the repeat units in the second plurality of repeat units has a structure selected from Formula 1B-1D Formula 1A

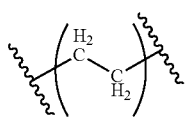

Formula 1B

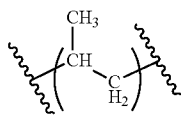

Formula 1C

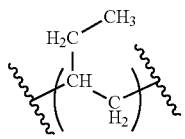

Formula 1D

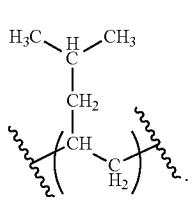

In some aspects, each of the repeat units in the first plurality of repeat units has a structure according to Formula 1A, and wherein each of the repeat units in the second plurality of repeat units has a structure according to Formula 2

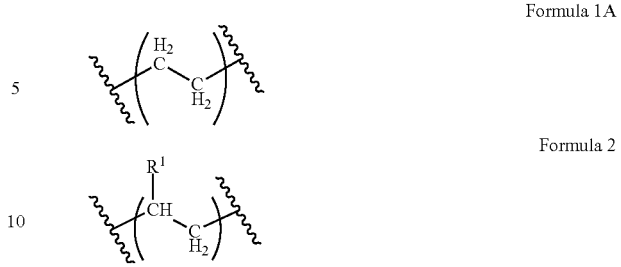

where $R^1$ is a hydrogen or a substituted or unsubstituted, linear or branched, $C_2$-$C_{12}$ alkyl or heteroalkyl.

In some aspects, the polyolefin copolymer comprises about 80% to about 99%, about 85% to about 99%, about 90% to about 99%, or about 95% to about 99% polyolefin repeat units by weight based upon a total weight of the polyolefin copolymer. In some aspects, the polyolefin copolymer comprises about 1% to about 5%, about 1% to about 3%, about 2% to about 3%, or about 2% to about 5% ethylene by weight based upon a total weight of the polyolefin copolymer. In some aspects, the polyolefin copolymer is substantially free of polyurethanes. In some aspects, polymer chains of the polyolefin copolymer are substantially free of urethane repeat units. In some aspects, the polyolefin resin is substantially free of polymer chains including urethane repeat units. In some aspects, the polyolefin copolymer is substantially free of polyamide. In some aspects, the polymer chains of the polyolefin copolymer are substantially free of amide repeat units. In some aspects, the polyolefin resin is substantially free of polymer chains including amide repeat units.

In some aspects, the polyolefin resin includes a thermoplastic copolyester elastomer. In some aspects, the polyolefin resin one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units. In some aspects, the polyolefin resin comprises a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units. In some aspects, the polyolefin resin comprises an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups.

In some aspects, a composition is provided including an A-B-A block copolymer, wherein each of the A blocks have styrenic repeat units, the B block is a random copolymer of ethylene and a first alpha-olefin having 3 to 8 carbon atoms (e.g. 3, 4, 5, 6, 7, or 8 carbon atoms), and wherein the A-B-A- block copolymer includes about 10 percent to 50 percent, about 10 percent to 40 percent, about 15 percent to 40 percent, or about 15 percent to 30 percent of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having about 2 to 24, about 3 to 24, about 3 to 18, or about 6 to 18 carbon atoms, and wherein the alpha-olefin linking polymer has an alpha-olefin monomer content of about 10 percent to 50 percent, about 10 percent to 40 percent, about 15 percent to 40 percent, or about 15 percent to 30 percent by weight based upon an entire weight of the alpha-olefin linking polymer.

In some aspects, a composition is provided including an A-B-A block copolymer, wherein each of the A blocks include repeat units according to the following formula

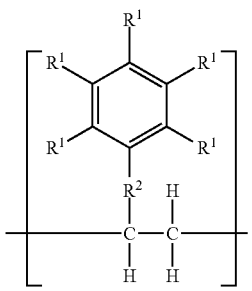

where each occurrence of $R^1$ is independently a hydrogen, halogen, hydroxyl, or a substituted or unsubstituted alkyl group having from 1 to 18, 1 to 15, 1 to 12, 3 to 18, 3 to 15, or 3 to 12 carbon atoms; where each occurrence of $R^2$ is independently none or a substituted or unsubstituted alkyl group having from 1 to 15, 1 to 12, 1 to 8, 3 to 8, 3 to 12, or 3 to 15 carbon atoms; wherein the B block is a random copolymer of ethylene and a first alpha-olefin having about 3 to 12, 3 to 10, or 3 to 8 carbon atoms; and wherein the A-B-A- block copolymer includes about 10 percent to 50 percent, about 10 percent to 40 percent, about 15 percent to 40 percent, or about 15 percent to 30 percent of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having about 2 to 24, about 3 to 24, about 3 to 18, or about 6 to 18 carbon atoms; wherein a ratio II of a total parts by weight of the linking polymer present in the composition to a total parts by weight of the A-B-A block copolymer present in the composition is from about 1.00 to 5.00, about 1.00 to 4.00, about 1.50 to 4.00, about 1.50 to 3.50, about 1.00 to 3.00, or about 2.00 to 4.00.

In some aspects, a composition is provided including an A-B-A block copolymer, wherein each of the A blocks include repeat units according to the following formula

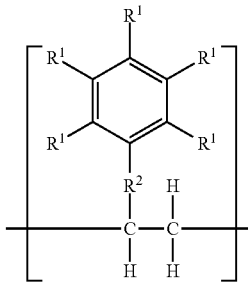

where each occurrence of $R^1$ is independently a hydrogen, halogen, hydroxyl, or a substituted or unsubstituted alkyl group having from 1 to 18, 1 to 15, 1 to 12, 3 to 18, 3 to 15, 3 to 12, 1 to 8, 3 to 8, 1 to 5, or 3 to 5 carbon atoms; where each occurrence of $R^2$ is independently none or a substituted or unsubstituted alkyl group having from 1 to 15, 1 to 12, 1 to 8, 3 to 8, 3 to 12, 3 to 15, 1 to 8, 1 to 5, or 1 to 3 carbon atoms; wherein the B block is a random copolymer of ethylene and a first alpha-olefin having about 3 to 12, 3 to 10, or 3 to 8 carbon atoms; and wherein the A-B-A- block copolymer includes about 10 percent to 50 percent, about 10 percent to 40 percent, about 15 percent to 40 percent, or about 15 percent to 30 percent of the A blocks by weight based upon an entire weight of the A-B-A block copolymer; an olefinic block copolymer, wherein the olefinic block copolymer is a copolymer of ethylene and a second alpha-olefin having about 4 to 14, about 6 to 12, or about 6 to 10 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin having about 2 to 24, about 3 to 24, about 3 to 18, or about 6 to 18 carbon atoms.

In some aspects, the alpha-olefin linking polymer has an alpha-olefin monomer content of about 10 percent to 50 percent, about 10 percent to 45 percent, about 15 percent to 45 percent, about 15 percent to 40 percent, or about 20 percent to 40 percent by weight based upon an entire weight of the alpha-olefin linking polymer.

In some aspects, each of the A blocks include a large amount of polystyrene. For example, each of the A blocks can include at least 80 percent, 90 percent or more styrene repeat units based upon the number of repeat units in the A block. In some aspects, each of the A blocks consists essentially of polystyrene.

In some aspects, each of the B blocks includes a random copolymer of ethylene and a first alpha-olefin having 4, 5, 6, 7, or 8 carbon atoms. In some aspects, the B block is essentially a random copolymer of ethylene and octene, or is random copolymer of ethylene and butadiene.

In some aspects there can be more than one alpha-olefin linking polymer present in the composition. For example, in some aspects, the composition includes a first alpha-olefin linking polymer and a second alpha-olefin linking polymer, wherein the first alpha-olefin linking polymer and the second alpha-olefin linking polymer are copolymers of ethylene and 1-butene, each having a different ratio of ethylene to 1-butene monomer content in the copolymer.

In some aspects, the composition includes about 5 parts by weight to about 15 parts by weight of the A-B-A block copolymer, about 10 parts by weight to about 20 parts by weight of the olefinic block copolymer, and about 25 parts by weight to about 35 parts by weight of the alpha-olefin linking polymers based upon an entire weight of the composition.

In some aspects, the composition includes an ethylene-vinyl acetate copolymer having a vinyl acetate content of about 10 percent to about 45 percent by weight based upon the weight of the ethylene-vinyl acetate copolymer.

In various aspects, the composition also includes comprising an ethylene-vinyl acetate copolymer having a vinyl acetate content of about 5 percent to 55 percent, about 5 percent to 50 percent, about 10 percent to 50 percent, about 10 percent to 45 percent, or about 15 percent to 40 percent by weight based upon the weight of the ethylene-vinyl acetate copolymer. The The A-B-A block copolymer can be at least partially or fully hydrogenated. In some aspects, the A-B-A block copolymer has a degree of hydrogenation of about 40 percent to 99 percent, about 50 percent to 99 percent, about 50 percent to 95 percent, about 50 percent to 90 percent, about 50 percent to 80 percent, or about 60 percent to 80 percent.

In some aspects, a composition is provided including partially hydrogenated thermoplastic elastomeric block copolymer, an olefinic block copolymer, and an alpha-olefin linking polymer. The partially hydrogenated thermoplastic elastomeric block copolymer can include one or more A blocks with aromatic repeat units, one or more B blocks with aliphatic repeat units, and one or more first ethylenically unsaturated groups present on one or both of the aromatic repeat units and the aliphatic repeat units. In some aspects, the aromatic repeat units are styrenic repeat units. The olefinic block copolymer can be a copolymer of a first alpha-olefin and a second alpha-olefin different from the first alpha-olefin, and wherein the olefinic block copolymer includes one or more second ethylenically unsaturated groups. The alpha-olefin linking polymer can include one or more aliphatic sidechains.

In some aspects, the partially hydrogenated thermoplastic elastomeric block copolymer can have an A-B block structure or an A-B-A block structure, wherein the A blocks and B blocks are as described herein. For example, each of the A blocks can independently include one or more aromatic repeat units such as styrene. Each of the B blocks can be an aliphatic polymer block comprising the one or more first ethylenically unsaturated units.

The aromatic repeat units can include any of a variety of aromatic units. The aromatic repeat units can include aliphatic backbones having a plurality of aromatic side chains.

In some aspects, a composition is provided including at least one polymer containing styrenic repeating units and non-styrenic repeating units; and at least one $C_4$-$C_{100}$ unsaturated olefin. The styrene repeat units can include blocks of polystyrene. The polymer containing styrenic repeating units and non-styrenic repeating units can be a block copolymer including blocks of polystyrene and non-styrenic polymeric blocks. In some examples, the polymer can include non-styrenic repeating units selected from the group polyester, poly-$C_2$-$C_8$-alkylene units, polyether units, polycarbonate units, polyamide units, polyketone units, polysiloxane units, and any combination thereof. The styrene repeating units and non-styrenic repeating units (e.g., polyester, poly-$C_2$-$C_8$-alkylene units, polyether units, polycarbonate units, polyamide units, polyketone units, polysiloxane units, and any combination thereof), can be in any order. Mixtures of two or more polymers including styrenic repeat units and non-styrenic repeat units are also contemplated herein.

As used herein, unless otherwise dictated by context, when two of the same type of components are said to be "different" this means that one has a different chemical composition from the other. For example, the second alpha-olefin being different from the first alpha-olefin means the second alpha-olefin has a chemical formula that is different from the chemical formula of the first alpha-olefin.

In some specific examples, the compositions include a polymer including styrene repeating units and non-styrenic repeating units, wherein the polymer includes block units of polyester. In some examples, the polymer including styrenic repeating units and non-styrenic repeating units includes poly-$C_2$-$C_8$-alkylene units. In some examples, the polymer including styrenic repeating units and non-styrenic repeating units of the various examples described herein includes units of polyethylene. In some examples, the polymer including styrenic repeating units and non-styrenic repeating units of the various examples described herein includes units of polypropylene. In other examples, the polymer including styrenic repeating units and non-styrenic repeating units of the various examples described herein includes units of polybutylene. In still other examples, the polymer including styrene repeating units and non-styrenic repeating units of the various examples described herein includes units of polybutadiene. In yet other examples, the polymer including styrenic repeating units and non-styrenic repeating units of the various examples described herein includes units of polyisoprene. The non-styrenic repeating units of the polymer can include polyethylene, polypropylene, polybutylene, polybutadiene, polyisoprene, or any combination thereof, and can be present in the polymer in any order.

In some examples, when the polymer comprising styrene repeating units and non-styrenic repeating units described herein comprise polyethylene, the polyethylene content of the polymer comprising styrene repeating units and non-styrenic repeating units is from about 50 mole percent to about 80 mole percent (e.g., from about 50 mole percent to about 75 mol percent; about 60 mole percent to about 80 mol percent; about 55 mole percent to about 70 mol percent; about 65 mole percent to about 80 mol percent; or about 70 mole percent to about 80 mol percent).

In some examples the polymer comprising styrene repeating units and non-styrenic repeating units is a $PS_q$—$X^1_n$—$X^2_m$—$X^3_p$, block copolymer wherein: PS represents polystyrene; $X^1$ is a poly-$C_2$-$C_8$-alkylene; $X^2$ is a poly-$C_2$-$C_8$-alkylene; $X^3$ is polyether, polyester, polycarbonate, polyamide, polyketone or polysiloxane; the subscripts q, n, m, and p represent mole fractions; $1>q>0$, n is 0 to 1, m is 0 to 1, and p is 0 to 1, provided that q+n+m+p=1; and the order of the PS, $X^1$, $X^2$, and $X^3$ blocks can be random or in the order shown. In some examples, $X^1$ is polyethylene, polypropylene, polybutylene, polybutadiene, or polyisoprene. In other examples, $X^2$ is polyethylene, polypropylene, polybutylene, polybutadiene, or polyisoprene.

Some examples of polymers comprising styrene repeating units and non-styrenic repeating units contemplated herein include styrene-butadiene-styrene block copolymers; styrene-polybutylene-styrene block copolymers; styrene-ethylene-butadiene-styrene block copolymers; styrene-ethylene-polybutylene-styrene block copolymers; styrene-isoprene-butadiene-styrene block copolymers; and combinations thereof.

Generally speaking, the block copolymers, such as the A-B-A block copolymer or the polymer comprising styrene repeating units and non-styrenic repeating units described herein, can be at least partially unsaturated (e.g., comprising ethylenic unsaturation). Thus, for example, at least one of the repeating units can comprise ethylenic unsaturation. As used herein, the term "partially unsaturated" (e.g., comprising ethylenic unsaturation) generally means that the polymer can have from about 20 mole percent to about 60 mole percent unsaturation (e.g., from about 20 mole percent to about 50 mole percent, about 20 mole percent to about 30 mol percent; about 25 mole percent to about 45 mol percent; about 30 mole percent to about 50 mol percent; about 20 mole percent to about 40 mol percent; or about 25 mole percent to about 40 mole percent unsaturation, such as ethylenic unsaturation). But it should be understood that, by virtue of the fact that polymers comprising styrene repeating units comprise phenyl rings, they will be "partially unsaturated."

Generally speaking, partial unsaturation makes it possible to form covalent crosslinking between, for example, the polymer comprising styrene repeating units and non-styrenic repeating units (intermolecular and intramolecular); the $C_4$-$C_{100}$ unsaturated olefin (intermolecular and intramolecular); and between the polymer comprising styrene repeating units and non-styrenic repeating units and the $C_4$-$C_{100}$ unsaturated olefin.

Generally speaking, the block copolymers, such as the A-B-A block copolymer or the polymer comprising styrene repeating units and non-styrenic repeating units described herein, have a weight average molecular weight (Mw) from about 25,000 grams per mole to about $1.5 \times 10^6$ grams per mole (e.g., from about 250,000 grams per mole to about $1.5 \times 10$ grams per mole, about 25,000 grams per mole to about 100,000 grams per mole; about 50,000 grams per mole to about 200,000 grams per mole, 75,000 grams per mole to about 150,000 grams per mole; about 100,000 grams per mole to about 300,000 grams per mole; about 250,000 grams per mole to about 750,000 grams per mole; about 300,000 grams per mole to about 800,000 grams per mole; about 250,000 grams per mole to about 650,000 grams per mole; about 500,000 grams per mole to about $1.5 \times 10^6$ grams per mole; about 750,000 grams per mole to about $1.5 \times 10^6$ grams per mole; or about 650,000 grams per mole to about $1.3 \times 10^6$ grams per mole).

Some examples of polymers comprising styrene repeating units and non-styrenic repeating units include those available from Kraton Performance Polymers Inc., Houston, Tex., such as KRATON® D styrene-butadiene-styrene (SBS) polymer comprising styrene repeating units and non-styrenic repeating units; KRATON® D styrene-isoprene-styrene/styrene-isoprene-butadiene-styrene polymer comprising styrene repeating units and non-styrenic repeating units (SIS)/(SIBS); KRATON® G styrene-ethyelen-butadiene-styrene/styrene-ethylene-propylene-styrene (SEBS/SEPS) polymer comprising styrene repeating units and non-styrenic repeating units; and KRATON® FG maleic anhydride-grafted styrene-ethyelen-butadiene-styrene (SEBS) polymer comprising styrene repeating units and non-styrenic repeating units. Some examples of polymer comprising styrene repeating units and non-styrenic repeating units also include SEPTON® hydrogenated polymer comprising styrene repeating units and non-styrenic repeating units (e.g., SEPTON® 4055; SEPTON® 8006; SEPTON® 4077; and SEPTON® 4099) available from Kuraray Co., Ltd., Tokyo, Japan. Other examples of polymer comprising styrene repeating units and non-styrenic repeating units include hydrogenated SEBS block copolymers available from Asahi Kasei Chemicals Corporation (e.g., the various grades of TUFTEC® hydrogenated SEBS block copolymers, including TUFTEC® P1083). While not being bound by any specific theory, it is believed that the level of hydrogenation of the polymer comprising styrene repeating units and non-styrenic repeating units, which in some examples influences (e.g., reduces) the level of ethylenic unsaturation of the polymer comprising styrene repeating units and non-styrenic repeating units, can influence the crystallinity and/or rigidity of the polymer comprising styrene repeating units and non-styrenic repeating units. Thus, for example, partially hydrogenated polymer comprising styrene repeating units and non-styrenic repeating units (e.g., those that are about 50 to about 80 percent hydrogenated) can be less crystalline and more rigid than their non-hydrogenated counterparts (e.g., those that are less than about 50 percent hydrogenated).

In one aspect, the pre-foam compositions of the various examples described herein can comprise any suitable amount of a polymer comprising styrene repeating units and non-styrenic repeating units. In some examples, the pre-foam compositions comprise from about 5 weight percent to about 50 weight percent (e.g., from about 5 weight percent to about 20 weight percent; about 15 weight percent to about 40 weight percent; about 10 weight percent to about 45 weight percent; about 25 weight percent to about 50 weight percent; or about 20 weight percent to about 45 weight percent) of the polymer comprising styrene repeating units and non-styrenic repeating units. In addition, or alternatively, the polymer comprising styrene repeating units and non-styrenic repeating units comprises a content of styrene repeating units from about 5 mole percent to about 50 mole percent (e.g., from about 5 mole percent to about 20 mol percent; about 15 mole percent to about 40 mol percent; about 10 mole percent to about 45 mol percent; about 25 mole percent to about 50 mol percent; or about 20 mole percent to about 45 mol percent). In addition, or alternatively, the polymer comprising styrene repeating units and non-styrenic repeating units comprises a content of non-styrenic repeating units from about 50 mole percent to about 95 mole percent (e.g., from about 50 mole percent to about 80 mole percent, about 60 mole percent to about 90 mole percent, about 70 mole percent to about 95 mole percent or about 75 mole percent to about 95 mol percent). In some instances, the sum of the content of styrene repeating units and the content of non-styrenic repeating units is 100 mol percent.

In particular examples, the pre-foam compositions described herein comprise from about 5 parts per hundred of resin to about 45 parts per hundred of the polymer comprising styrene repeating units and non-styrenic repeating units component (i.e., the styrenic copolymer component). The pre-foam compositions can comprise from about 10 parts per hundred to about 40 parts per hundred of the styrenic copolymer component. The pre-foam compositions can comprise from about 12 parts per hundred to about 35 parts per hundred of the styrenic copolymer component. The pre-foam compositions can comprise from about 15 parts per hundred to about 35 parts per hundred of the styrenic copolymer component. The pre-foam compositions can comprise from about 10 parts per hundred to about 30 parts per hundred of the styrenic copolymer component. The pre-foam compositions can comprise from about 10 parts per hundred to about 25 parts per hundred of the styrenic copolymer component. The pre-foam compositions can comprise from about 10 parts per hundred to about 22 parts per hundred of the styrenic copolymer component.

As used herein, the stryrenic copolymer component is understood to refer to all the polymers present in the pre-foam composition which individually have both styrene repeating units and non-styrenic repeating units. Thus, the concentration of the styrenic copolymer component in a pre-foam composition refers to the total concentration of each polymer comprising styrene repeating units and non-styrenic repeating units present in the composition. In some pre-foam compositions, the styrenic copolymer component can be formed of only a single polymer comprising styrene repeating units and non-styrenic repeating units. In other pre-foam compositions, the styrenic copolymer component can be by formed of a plurality of polymers each of which has both styrene repeating units and non-styrenic repeating units.

The pre-foam composition described herein also comprises at least one $C_4$-$C_{100}$ unsaturated olefin. The $C_4$-$C_{100}$ unsaturated olefin can be a $C_8$-$C_{50}$-unsaturated olefin. The $C_4$-$C_{100}$ unsaturated olefin can be a $C_{12}$-$C_{30}$-unsaturated olefin. The $C_4$-$C_{100}$ unsaturated olefin can be a $C_{16}$-$C_{100}$-unsaturated olefin. The $C_4$-$C_{100}$ unsaturated olefin can be a $C_{50}$-$C_{100}$-unsaturated olefin. As used herein, the $C_x$-$C_y$ nomenclature is understood to specify the carbon length of the unsaturated olefin, not the location of unsaturation. Mixtures of two or more $C_4$-$C_{100}$ unsaturated olefins are also contemplated herein. In some examples, a $C_4$-$C_{100}$ unsaturated olefin can be prepolymer (e.g., a monomer); a linear oligomer; a polymer.

As used herein, the term "unsaturated olefin" is understood to encompass any $C_4$-$C_{100}$ olefin comprising at least one terminal C—C double bond and a total of about 4 to about 100 (e.g., 8 to 50; 12 to 30; 4 to 20; 10 to 50; 30 to 90; 20 to 100; 50 to 75; or 20 to 80) total carbon atoms. Additional carbon-carbon double bonds can be present in the unsaturated olefin. Examples of $C_4$-$C_{100}$ unsaturated olefins include propene, 1-butene, 4-methyl-1-pentene, 1-hexene, 1-octene, 1-decene, 1-dodecene, 1-tetradecene, 1-hexadecene, and 1-octadecene. In other examples, $C_4$-$C_{100}$ unsaturated olefins can be alkyl- or cycloalkyl-substituted unsaturated olefins. As used herein, the term "unsaturated olefin" is also understood to encompass any $C_4$-$C_{100}$ olefin comprising a plurality of polymerized units, wherein at least a portion of the polymerized units include at least one terminal C—C double bond and a total of about 4 to about 100 (e.g., 8 to 50; 12 to 30; 4 to 20; 10 to 50; 30 to 90; 20 to 100; 50 to 75; or 20 to 80) total carbon atoms. In other words, the unsaturated olefin can be an unsaturated olefin polymer or copolymer, including unsaturated olefin block copolymers. Additional carbon-carbon double bonds can be present in the unsaturated olefin polymer or copolymer. Examples of unsaturated olefinic copolymers include the TAFMER® unsaturated olefin copolymers available from Mitsui Chemicals America, Inc., Rye Brook, N.Y. (e.g., TAFMER® DF110 and TAFMER® DF605 ethylene/unsaturated olefin copolymers); and ENGAGE® and INFUSE® olefin block copolymers, both available from The Dow Chemical Company, Midland, Mich. (e.g., INFUSE® 9107 olefin block copolymer).

In some examples, the pre-foam compositions of the various examples described herein can comprise one or more polymers comprising styrene repeating units and non-styrenic repeating units, one or more $C_4$-$C_{100}$ unsaturated olefins, and one or more olefin block copolymers.

In some examples, $C_4$-$C_{100}$ unsaturated olefins can comprise one or more heteroatoms (e.g., —O—, $NR^1$—, —S(O)$_q$— (wherein q is an integer from 0 to 2) and combinations thereof). An example of such heteroatom-interrupted $C_4$-$C_{100}$ unsaturated olefins include allyl ether and allyl-terminated polyethylene glycol.

In particular examples, the pre-foam compositions described herein comprise from about 30 parts per hundred to about 90 parts per hundred of the $C_4$-$C_{100}$ unsaturated olefin component (i.e., the unsaturated olefin component). The pre-foam compositions can comprise from about 35 parts per hundred to about 85 parts per hundred of the unsaturated olefin component. The pre-foam compositions can comprise from about 40 parts per hundred to about 80 parts per hundred of the unsaturated olefin component. The pre-foam compositions can comprise from about 45 parts per hundred to about 75 parts per hundred of the unsaturated olefin component. The pre-foam compositions can comprise from about 40 parts per hundred to about 85 parts per hundred of the unsaturated olefin component. The pre-foam compositions can comprise from about 45 parts per hundred to about 85 parts per hundred of the unsaturated olefin component. The pre-foam compositions can comprise from about 43 parts per hundred to about 82 parts per hundred of the unsaturated olefin component.

As used herein, the unsaturated olefin component is understood to refer to all the $C_4$-$C_{100}$ unsaturated olefins present in the pre-foam composition. Thus, the concentration of the unsaturated olefin component in a pre-foam composition refers to the total concentration of each $C_4$-$C_{100}$ unsaturated olefin present in the composition, including all $C_4$-$C_{100}$ unsaturated olefin monomers, $C_4$-$C_{100}$ unsaturated olefin oligomers, $C_4$-$C_{100}$ unsaturated olefin polymers, and $C_4$-$C_{100}$ unsaturated olefin copolymers. In some pre-foam compositions, the unsaturated olefin component can be formed of only a single $C_4$-$C_{100}$ unsaturated olefin, such as, for example, a single $C_4$-$C_{100}$ unsaturated olefin copolymer. In other pre-foam compositions, the unsaturated olefin component can be formed of a plurality of $C_4$-$C_{100}$ unsaturated olefin, such as, for example, a plurality of $C_4$-$C_{100}$ unsaturated olefin copolymers.

The compositions of the various examples described herein can also comprise at least one ethylene vinyl acetate copolymer, in addition to the polymer comprising styrene repeating units and non-styrenic repeating units; and the $C_4$-$C_{100}$ unsaturated olefin. And, in some instances, the at least one ethylene vinyl acetate copolymer comprises two different ethylene vinyl acetate copolymers.

In some examples, the at least one ethylene vinyl acetate copolymer is a random copolymer. In other examples, the at least one ethylene vinyl acetate copolymer comprises an ethylene content. In still other examples, the at least one ethylene vinyl acetate copolymer is at least partially unsaturated (e.g., comprises ethylenic unsaturation). In some examples, the pre-foam composition comprises about 20 weight percent to about 60 weight percent (e.g., from about 25 weight percent to about 50 weight percent; about 30 weight percent to about 50 weight percent; about 40 weight percent to about 60 weight percent; about 30 weight percent to about 60 weight percent; or about 45 weight percent to about 60 weight percent) of the at least one ethylene vinyl acetate copolymer. A suitable ethylene vinyl acetate copolymer includes EVLAX® 40L-03 ethylene vinyl acetate resin available from E.I. DuPont de Nemours Co., Wilmington, Del. Other suitable ethylene vinyl acetate copolymers include EVATHENE® UE659 and EVATHENE® UE3300 ethylene vinyl acetate copolymers available from USI Corporation, Taiwan, ROC.

In some examples, the pre-foam compositions comprise about 1 to about 10 weight percent of a first ethylene vinyl acetate copolymer and about 5 to about 50 weight percent of a second ethylene vinyl acetate copolymer, wherein the weight percent amounts are relative to the weight of the pre-foam composition.

In one example, when the at least one ethylene vinyl acetate copolymer comprises two different ethylene vinyl acetate copolymers, the at least two different ethylene vinyl acetate copolymers can differ in at least vinyl acetate content. Thus, for example, a first ethylene vinyl acetate copolymer can comprise about 15 to about 40 mole percent vinyl acetate (e.g., from about 15 to about 30 mol percent; about 25 to about 35 mol percent; or about 20 mole percent to about 40 mol percent) and a second ethylene vinyl acetate copolymer comprises about 15 to about 30 mole percent (e.g., from about 15 to about 25 mol percent; about 20 mole percent to about 30 mol percent; or about 15 mole percent to about 30 mol percent) vinyl acetate.

In particular examples, the pre-foam compositions described herein do not include an ethylene vinyl acetate copolymer (EVA). In other words, the pre-foam compositions described herein can be free of an EVA component.

Alternatively, the pre-foam compositions described herein can comprise from about 5 parts per hundred to about 50 parts per hundred of the EVA component. The pre-foam compositions can comprise from about 10 parts per hundred to about 45 parts per hundred of the EVA component. The pre-foam compositions can comprise from about 20 parts per hundred to about 45 parts per hundred of the EVA component. The pre-foam compositions can comprise from about 25 parts per hundred to about 40 parts per hundred of the EVA component. The pre-foam compositions can comprise from about 25 parts per hundred to about 35 parts per hundred of the EVA component. The pre-foam compositions can comprise from about 30 parts per hundred to about 37 parts per hundred of the EVA component. As used herein, the EVA component is understood to refer to all the ethylene vinyl acetate copolymers present in the pre-foam composition. Thus, the concentration of the EVA component in a pre-foam composition refers to the total concentration of each ethylene vinyl acetate copolymer present in the composition. In some pre-foam compositions, the EVA component can be formed of only a single ethylene vinyl acetate copolymer. In other pre-foam compositions, the EVA component can be formed of a plurality of different ethylene vinyl acetate copolymers.

Particular ratios of the components of the pre-foam compositions have been found to produce foams having beneficial properties. As used herein and unless otherwise indicated or dictated by context, the ratio of a first component to a second component is understood to the parts per hundred of resin (phr) of the first component divided by the parts per hundred of the second component present in the composition. In some aspects, a sum of ratios is presented, which is understood to mean the sum of the specific ratios described.

The composition can be a composition having a ratio of the styrenic copolymer component to the unsaturated olefin component of about 0.1 to about 1.0. The ratio of the styrenic copolymer component to the unsaturated olefin component can be from about 0.05 to about 0.40. The ratio of the styrenic copolymer component to the unsaturated olefin component can be from about 0.1 to about 0.3. The ratio of the styrenic copolymer component to the unsaturated olefin component can be from about 0.15 to about 0.32.

The composition can be a composition having a ratio of the styrenic copolymer component to the EVA component of about 0.2 to about 2.0. The ratio of the styrenic copolymer component to the EVA component can be from about 0.3 to about 1.0. The ratio of the styrenic copolymer component to the EVA component can be from about 0.3 to about 0.8. The ratio of the styrenic copolymer component to the EVA component can be from about 0.35 to about 0.72.

The composition can be a composition having a ratio of the unsaturated olefin component to the EVA component of about 2.0 to about 4.0. The ratio of the unsaturated olefin component to the EVA component can be from about 1.5 to about 3.0. The ratio of the unsaturated olefin component to the EVA component can be from about 1.5 to about 2.5. The ratio of the unsaturated olefin component to the EVA component can be from about 2.0 to about 2.5.

When the composition includes an EVA component, the composition can have a sum of the ratio of the styrenic copolymer component to the unsaturated olefin component, of the ratio of the styrenic copolymer component to the EVA component, and of the ratio of the unsaturated olefin component to the EVA component of about 1.5 to about 4.5. The sum of the ratios for the composition can be from about 2.0 to about 4.5. The sum of the ratios for the composition can be from about 2.2 to about 3.8. The sum of the ratios for the composition can be from about 2.5 to about 3.5.

It has been found that, in some aspects, a ratio II of a total parts by weight of the linking polymer present in the composition to a total parts by weight of the A-B-A block copolymer present in the composition has a strong impact on the desired softness and energy return of the foamed compositions. In some aspects, foam compositions having an improved softness and energy return can be formed from compositions having a ratio II from about 1.00 to 5.00, about 1.00 to 4.00, about 1.50 to 4.00, about 1.50 to 3.50, about 1.00 to 3.00, or about 2.00 to 4.00.

In some aspects, a composition is provided having one or more thermoplastic copolyester elastomers. The thermoplastic copolyester elastomers can include chain units derived from one or more olefins and chain units derived from one or more ethylenically-unsaturated acid groups. The compositions can also include a plurality of cations ionically crosslink anionic form of the acid groups in the thermoplastic copolyester elastomers. In some aspects, the compositions are essentially just the thermoplastic copolyester elastomers and metal cations. The thermoplastic copolyester elastomers can have a melt flow index of about 30 or less, about 20 or less, about 15 or less, about 10 or less, or about 5 or less.

A variety of thermoplastic copolyester elastomers can be processed as described herein can be used to form a foam composition. In some aspects, the thermoplastic copolyester elastomers are terpolymers of ethylene, acrylic acid, and methyl acrylate or butyl acrylate. In some aspects, a ratio III of a total parts by weight of the acrylic acid in the thermoplastic copolyester elastomers to a total weight of the thermoplastic copolyester elastomers is about 0.05 to about 0.6, about 0.1 to about 0.6, about 0.1 to about 0.5, about 0.15 to about 0.5, or about 0.2 to about 0.5.

The compositions provided herein can include a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester elastomer is a block copolymer. In some aspects, the thermoplastic copolyester elastomer is a segmented copolymer. In further aspects, the thermoplastic copolyester elastomer is a random copolymer. In still further aspects, the thermoplastic copolyester elastomer is a condensation copolymer.

In a further aspect, the thermoplastic copolyester elastomer can have a weight average molecular weight of about 50,000 Daltons to about 1,000,000 Daltons; about 50,000

Daltons to about 500,000 Daltons; about 75,000 Daltons to about 300,000 Daltons; about 100,000 Daltons to about 200,000 Daltons; or a value or values of weight average molecular weight within any of the foregoing ranges or a weight average molecular weight range encompassing any sub-range of the foregoing ranges.

In a further aspect, the thermoplastic copolyester elastomer can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

In a further aspect, the thermoplastic copolyester elastomer can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

In a further aspect, the thermoplastic copolyester elastomer can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, the thermoplastic copolyester elastomer can have first segments derived from a poly(tetramethylene ether)diol.

In a further aspect, the thermoplastic copolyester elastomer can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

In a further aspect, the thermoplastic copolyester elastomer can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

In a further aspect, the a thermoplastic copolyester elastomer comprises: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure according to the following formula:

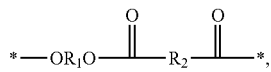

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein The second copolyester unit has a structure according to the following formula:

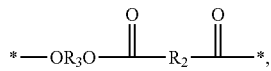

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In a further aspect, the thermoplastic copolyester elastomer comprises a plurality of first copolyester units having a structure according to the following formula:

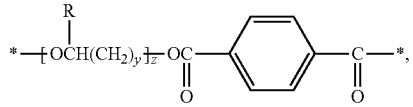

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In a further aspect, the thermoplastic copolyester elastomer comprises a plurality of first copolyester units having a structure according to the following formula:

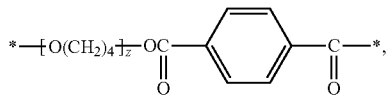

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

In a further aspect, the thermoplastic copolyester elastomer comprises a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer comprises a plurality of second copolyester units, each second copolyester unit of the plurality having a structure according to the following formula:

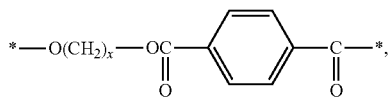

wherein x is an integer having a value from 1 to 20; wherein the foam article has a microcellular microcellular foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

In a further aspect, the thermoplastic copolyester elastomer comprises a plurality of second copolyester units, each second copolyester unit of the plurality having a structure according to the following formula:

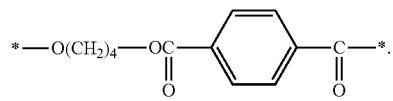

In a further aspect, the thermoplastic copolyester elastomer comprises a weight percent range of the plurality of first copolyester units based on total weight of the thermoplastic copolyester elastomer such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

In a further aspect, the thermoplastic copolyester elastomer can have a maximum load, when determined using a cyclic tensile test as described herein, of about 10 newtons to about 100 newtons; about 15 newtons to about 50 newtons; about 20 newtons to about 40 newtons; or any load value or set of load values within any of the foregoing ranges of load value, or any range of load values encompassing a sub-set of any of the foregoing ranges.

In a further aspect, the thermoplastic copolyester elastomer can have an energy efficiency, when determined using a cyclic tensile test as described herein, of greater than or equal to about 50 percent; of greater than or equal to about 60 percent; greater than or equal to about 70 percent; of about 50 percent to about 90 percent; of about 60 percent to about 90 percent; of about 70 percent to about 90 percent; or any energy efficiency value or set of energy efficiency values within any of the foregoing ranges of energy efficiency, or any range of energy efficiency values encompassing a sub-set of any of the foregoing ranges.

In a further aspect, the thermoplastic copolyester elastomer can have an energy return, when determined using a cyclic tensile test as described herein, of about 1 joules to 15 joules; about 2 joules to 12 joules; about 4 joules to 10 joules; or any energy return value or set of energy return values within any of the foregoing ranges of energy return, or any range of energy return values encompassing a sub-set of any of the foregoing ranges.

In a further aspect, the thermoplastic copolyester elastomer can have tensile modulus, when determined using a cyclic tensile test as described herein, of about 1 megapascals to 15 megapascals; or any tensile modulus value or set of tensile modulus values within any of the foregoing range of tensile modulus, or any range of tensile modulus values encompassing a sub-set of any of the foregoing ranges.

In some aspects, the thermoplastic copolyester elastomer can comprise phase separated domains. For example, the plurality of first segments derived from a dihydroxy-terminated polydiol can phase-separate into domains comprising primarily the first segments. Moreover, the plurality of second segments derived from a diol can phase-separate into domains comprising primarily the second segments. In other aspects, the thermoplastic copolyester elastomer can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 7:

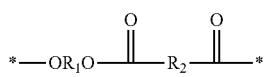
(7)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein The second copolyester unit has a structure represented by a formula 8:

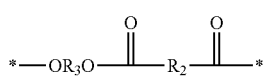
(8)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment. In still other aspects, the thermoplastic copolyester elastomer can comprise phase-separated domains comprising primarily of a plurality of first copolyester units, each first copolyester unit of the plurality having a structure represented by a formula 9:

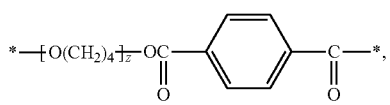
(9)

wherein z is an integer having a value from 2 to 60; and wherein a weight average molecular weight of each of the plurality of first copolyester units is from about 300 Daltons to about 7,000 Daltons; and other phase-separated domains comprising primarily of a plurality of second copolyester units, each second copolyester unit of the plurality having represented by a formula 10:

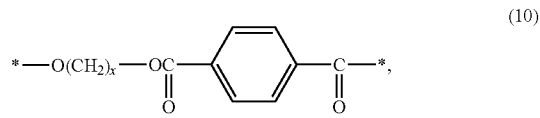
(10)

wherein x is an integer having a value from 1 to 20.

Exemplary, but non-limiting, thermoplastic polyester elastomers, including thermoplastic copolyester elastomers, that can be used in the disclosed methods, foams, and articles include Hytrel® 3078, Hytrel® 4068, and Hytrel® 4556 (DuPont, Wilmington, Del., USA); Pelprene™ P30B, P40B, and P40H (Toyobo U.S.A. Inc., New York, N.Y., USA); TRIEL® 5300, TRIEL® 5400, and blends thereof (Samyang Corporation, Korea); Keyflex BT1028D, BT1033D, BT1035D, BT1040D, BT1045D, and BT1047D (LG Chem, Korea); and KOPEL® KP3340, KP3346, KP3347, KP3942 (Kolon Plastics, Inc., Korea).

In some aspects, the disclosed foamed polymeric materials can further include one or more ionomers, such as any of the Surlyn® polymers (DuPont, Wilmington, Del., USA).

In some aspects, the foam compositions can further include one or more thermoplastic polyurethanes, such as Fortimo™ (Mitsui Chemicals, Inc., Tokyo, Japan); Texin® (Covestro LLC, Pittsburgh, Pa., USA); and BounCell-X™ (Lubrizol Advanced Materials, Inc., Brecksville, Ohio, USA).

The compositions of the various examples described herein can also comprise a blowing agent, a free-radical initiator or combinations thereof.

The blowing agent can be any appropriate type of physical blowing agent known in the art including nitrogen, carbon dioxide, hydrocarbons (e.g., propane, pentane, isopentane, and cyclopentane), chlorofluorocarbons, noble gases (e.g., helium (He), neon (Ne), argon (Ar), krypton (Kr), and xenon (Xe)) and/or mixtures thereof. In one example, the blowing agent comprises nitrogen. The blowing agent may be supplied in any flowable physical state such as a gas, a liquid, or a supercritical fluid. According to one example, a blowing agent source provides a blowing agent (e.g., carbon dioxide, nitrogen, and methanol) that is in a supercritical fluid state upon contacting (e.g., injection into) the pre-foam compositions of the various examples described herein, e.g., when the pre-foam compositions are formed in an extruder (e.g., a twin-screw extruder).

Alternatively, the blowing agent can be any appropriate type of chemical blowing agent known in the art including carbonates (e.g., ammonium carbonate and carbonates of alkali metals), azo compounds, diazo compounds, and combinations thereof. Chemical blowing agents include 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide, and combinations thereof. In the case of chemical blowing agents, gaseous products (e.g., nitrogen gas) and other by-products are formed by a chemical reaction(s), promoted by the process or by a reacting polymer's exothermic heat. Since the blowing reaction occurs forming low molecular weight compounds acting as the blowing gas, additional exothermic heat may also be released.

In some examples, the compositions described herein may require a temperature (e.g., from heating) of from about 130 degrees Celsius to about 210 degrees Celsius (e.g., from about 150 degrees Celsius to about 190 degrees Celsius or 165 degrees Celsius to about 195 degrees Celsius-such as temperatures to which an extruder and/or a mold might be heated) to "trigger" the chemical blowing agent to "decompose" to produce the gas(es) necessary to transform the pre-foam compositions of the various examples described herein into the foam compositions of the various examples described herein.

Examples of blowing agents include UNICELL brand blowing agents, such as UNICELL-D600 MT, available from Dongjin Semichem Co., Ltd., Seoul, Korea.

In some examples, a combination of physical and chemical blowing agents can be used.

The pre-foam compositions of the various examples described herein can also comprise metal oxides, organic acids, fillers, nucleating agents, and combinations thereof. Examples of metal oxides include zinc oxide, titanium dioxide, and combinations thereof. Examples of organic acids include $C_3$-$C_{30}$-alkanoic acids (e.g., $C_{14}$-$C_{30}$-alkanoic acids such as fatty acids) such as stearic acid and combinations of two or more $C_3$-$C_{30}$-alkanoic acids. Calcium carbonate is an example of a material which can be used both as a filler and as a nucleating agent.

The pre-foam compositions of the various examples described herein can also comprise one or more crosslinking agents. Examples of crosslinking agents include aliphatic unsaturated amides, such as methylenebisacryl- or -methacrylamide or ethylenebisacrylamide; aliphatic esters of polyols or alkoxylated polyols with ethylenically unsaturated acids, such as di(meth)acrylates or tri(meth)acrylates of butanediol or ethylene glycol, polyglycols or trimethylolpropane; di- and triacrylate esters of trimethylolpropane; acrylate and methacrylate esters of glycerol and pentaerythritol; allyl compounds, such as allyl (meth)acrylate, alkoxylated allyl (meth)acrylate, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, and tetraallylethylenediamine. Mixtures of the crosslinking agents can also be employed.

The pre-foam compositions of the various examples described herein can also comprise one or more free-radical initiators, such as an organic peroxide, a diazo compound (e.g., those described in U.S. Pat. No. 6,303,723, which is incorporated by reference as if fully set forth herein) or combinations of two or more free-radical initiators. Examples of organic peroxides that can be used as free-radical initiators include dicumyl peroxide; n-butyl-4,4-di(t-butylperoxy) valerate; 1,1-di(t-butylperoxy)3,3,5-trimethyl-cyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy) hexyne-3; di(2-t-butyl-peroxyisopropyl)benzene; dilauroyl peroxide; dibenzoyl peroxide; t-butyl hydroperoxide; and combinations thereof.

The pre-foam compositions of the various examples described herein can be solids or liquids at a temperature of about 25 degrees Celsius.

The pre-foam compositions of the various examples described herein can be crosslinked to form crosslinked pre-foam compositions. The pre-foam compositions can be crosslinked using various methods, including chemical crosslinking methods or crosslinking methods using actinic radiation (e.g., thermal radiation, UV light, electron beam and gamma radiation). Such compositions comprise, in some examples, a polymer comprising styrene repeating units and non-styrenic repeating units, the polymer crosslinked with a $C_4$-$C_{100}$ unsaturated-olefin block copolymer comprising blocks of $C_4$-$C_{100}$ unsaturated-olefin olefin. The crosslinking between the polymer comprising styrene repeating units and non-styrenic repeating units and the $C_4$-$C_{100}$ unsaturated olefin block copolymer can occur directly between the molecules of the polymer comprising styrene repeating units and non-styrenic repeating units and the $C_4$-$C_{100}$ unsaturated olefin block copolymer, for example, without an "external" crosslinking agent such as the one or more crosslinking agents described herein. The crosslinking between the polymer comprising styrene repeating units and non-styrenic repeating units and the $C_4$-$C_{100}$ unsaturated olefin block copolymer can also occur with an "external" crosslinking agent, such as the one or more crosslinking agents described herein.

Those of ordinary skill in the art will also recognize that there can be intramolecular crosslinking occurring between portions of a polymer comprising styrene repeating units and non-styrenic repeating units molecule or portions of a $C_4$-$C_{100}$ unsaturated olefin block copolymer. This crosslinking can occur in the presence or in the absence of an "external" crosslinking agent such as the one or more crosslinking agents described herein.

In some examples, the pre-foam compositions of the various examples described herein can be crosslinked to form crosslinked pre-foam compositions in the presence of a blowing agent (e.g., a chemical blowing agent or a physical blowing agent, as described herein).

In some examples, the crosslinked pre-foam compositions of the various examples described herein can be solids or liquids, but generally are solids (e.g., thermoplastic solids) at a temperature of about 25 degrees Celsius or higher (e.g., at a temperature of from about 25 degrees Celsius to about 220 degrees Celsius and a pressure of from about 500 kPa to about 100 megapascals). In some examples, the foam compositions of the various examples described herein are generally are solids (e.g., thermoplastic solids) at a temperature of about 25 degrees Celsius or higher (e.g., at a temperature of from about 25 degrees Celsius to about 220 degrees Celsius and a pressure of from about 500 kPa to about 100 megapascals).

In some examples, the crosslinked pre-foam compositions of the various examples described herein can further comprise at least one ethylene vinyl acetate copolymer and/or at least one olefin block copolymer, as each of the terms is defined herein.

Foam compositions are also contemplated herein and are interchangeably called "foam preforms." As used herein, the term "foam compositions" refers to:

a crosslinked pre-foam composition that is foamed (e.g., foamed using a blowing agent (physical and/or chemical)) before crosslinking, after crosslinking or substantially simultaneously with crosslinking; or combinations of a pre-foam composition and a crosslinked pre-foam composition (e.g., a combination of a pre-foam composition and a crosslinked pre-foam composition, wherein the combination is foamed (e.g., foamed using a blowing agent (physical and/or chemical)) after the combination is formed either after mixing two such compositions or after partially crosslinking the pre-foam composition, such that some crosslinked pre-foam composition is formed in situ).

In some examples, the foam compositions of the various examples described herein can further comprise at least one ethylene vinyl acetate copolymer and/or at least one olefin block copolymer, as each of the terms is defined herein.

Some foam compositions of the various examples described herein (e.g., foam compositions comprising a polymer comprising styrene repeating units and non-styrenic repeating units, crosslinked with a $C_4$-$C_{100}$ unsaturated olefin) can form solid (e.g., thermoplastic) foam materials. These thermoplastic foam materials can be used as "foam preforms" and the foam preforms can subsequently be compression molded. The foam compositions of the present disclosure can have a density of about 0.08 grams per cubic centimeter to about 0.15 grams per cubic centimeter (e.g., from about 0.10 grams per cubic centimeter to about 0.12 grams per cubic centimeter). In some examples, such foam preforms have an energy return from about 60 percent to about 85 percent (e.g., from about 65 percent to about 80 percent; about 65 percent to about 75 percent; about 70 percent to about 80 percent; or about 75 percent to about 80 percent).

Some foam compositions of the various examples described herein (e.g., foam preforms) can be compression molded to form compression molded foam. Such compression molded foam can have a density of from about 0.15 grams per cubic centimeter to about 0.30 grams per cubic centimeter (e.g., from about 0.15 grams per cubic centimeter to about 0.2 grams per cubic centimeter).

Disclosed herein are methods for making a foam article, the method comprising: forming a mixture of molten polymeric material and a blowing agent, wherein the polymeric material comprises a disclosed thermoplastic copolyester elastomer; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity.

Also disclosed are methods for making a foam article, the method comprising: forming a mixture of molten polymeric material and a blowing agent, wherein the polymeric material comprises a disclosed thermoplastic copolyester elastomer; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity; wherein the mixture has an injection temperature; and wherein the injection temperature is from about the melting temperature of the thermoplastic copolyester elastomer to about 50 degrees C. above the tail temperature of the thermoplastic copolyester elastomer.

Also disclosed are methods for making a foam article, the method comprising: forming a mixture of molten polymeric material and a blowing agent, wherein the polymeric material comprises a disclosed thermoplastic copolyester elastomer; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity; wherein the foaming occurs at a foaming temperature; and wherein the foaming temperature is from about the melting temperature of the thermoplastic copolyester elastomer to about 50 degrees C. above the tail temperature of the thermoplastic copolyester elastomer.

Dynamic scanning calorimetry (DSC) is used to determine the melting temperature and the tail temperature of a thermoplastic copolyester elastomer, and an exemplary method is described herein below in the Examples. Briefly, 10-30 mg pieces of undried resin pellets are cycled from −90 degrees C. to 225 degrees C. at 20 degrees C./min and cooled to −90° C. at 10° C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The $T_m$ and $T_g$ values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline. A schematic illustrating the method for determining peak and tail temperatures is shown in FIG. 7.

For example, the disclosed foamed polymeric materials can be prepared using a suitable extruder. An extruder (e.g., single or twin screw) can be used to provide a composition. The extruder can have a motor to turn a screw inside the extruder. Extruder may be a single screw or twin screws made of individual elements of various sizes and pitches appropriate for mixing or kneading the specific materials used. In some examples, the extruder has a twin screw.

The various components that make up the compositions used to form the thermoplastic copolyester elastomer foam of the various examples described herein are added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the thermoplastic copolyester elastomer foam is prepared by using a physical blowing agent which foams the composition after it exits the extruder, and the thermoplastic copolyester elastomer foam is thus substantially free of a chemical blowing agent or decomposition product thereof.

In some examples, the compositions can be added as a melt at a temperature close to or at a temperature that causes ionic crosslinks between polymer chains to dissociate. At lower temperatures the ionic moieties can reform or reassociate. Due to the ionic crosslinking, the extent to which the compositions are crosslinked during processing can be controlled by controlling the temperature; by causing a temperature reduction at a desired point to increase crosslinking, which results in an increase in the modulus or viscosity of the molten resin as the ionic moieties reassociate.

If a chemical blowing agent is used, the processing (melting) temperature used can be sufficiently below the temperature that would trigger the blowing agent. In order to foam the composition, the temperature near the exit of the extruder can be increased to a temperature close to or at the triggering temperature of a chemical blowing agent, thereby producing a chemically foamed thermoplastic copolyester elastomer foam as the composition exits the extruder (e.g., as the composition is injected into an injection mold).

Alternatively or in addition, a physical blowing agent can be used for foam the composition to form a physically foamed thermoplastic copolyester elastomer foam, or a physically and chemically foamed thermoplastic copolyester elastomer foam. For example, a supercritical fluid such as supercritical carbon dioxide or supercritical nitrogen can be mixed with the molten polymeric composition in the barrel of the extruder. As the mixture of the molten composition comprising one or more thermoplastic copolyester elastomers and a supercritical fluid exits the extruder, the pressure drop between the higher pressure in the extruder and the lower pressure outside the extruder causes the supercritical fluid to transition to the gas phase and foam the molten polymeric composition.

Various examples include methods of manufacturing an article of footwear or components for an article of footwear. In some examples, the methods of manufacturing an article of footwear include injection molding a composition to form a thermoplastic copolyester elastomer foam described herein to produce a foam article or component of an article, such as an article of footwear. The article or component of an article can be a midsole or a component of a midsole, and the method can include providing an upper and an outsole for an article of footwear; and combining the midsole or midsole component, the upper, and the outsole to make an article of footwear. In some examples, the method of manufacturing the article of footwear includes combining an article comprising a thermoplastic copolyester elastomer foam, an upper, and an outsole to make an article of footwear.

The articles or components of articles such as midsoles, midsole components, inserts and insert components can be prepared by injection molding a melt composition described herein using a physical blowing agent. The injection molding can use a screw-type injector that allows for maintaining and controlling the pressure in the injector barrel. The injection molding machine can allow metering and delivering a supercritical fluid such as carbon dioxide or nitrogen into the composition prior to injection. The supercritical fluid can be mixed into the composition within the injection barrel and then injected into the mold. The supercritical fluid can then expand to create cell nuclei to form the physical foam within the mold. The injection molding can include physical foaming of the compositions described herein using a microcellular foam injection molding process, such as, for example the MuCell process (Trexcel Inc., Royal Oak. Mich., USA).

In some examples, the thermoplastic copolyester elastomer foams of the various examples described herein are made using a process that involves impregnating a polymeric composition (e.g., at or above a softening temperature of the composition) with a physical blowing agent at a first concentration or first pressure. As used herein, the term "impregnating" generally means dissolving or suspending a physical blowing agent in a composition. The impregnated composition can then be foamed, or can be cooled (when applicable) and re-softened (when applicable) for blowing at a later time.

In some instances, the impregnated composition is foamed by reducing the solubility of the physical blowing agent in the polymer matrix through pressure or temperature changes. The reduction in solubility of the physical blowing agent can release additional amounts (e.g., to create a secondary expansion of an originally-formed microcell in the composition) of the impregnated physical blowing agent from the composition, to further blow the composition, forming a foam composition (e.g., a foam composition having a microcellular structure).

In addition to injection molding, the thermoplastic copolyester elastomer foam of the present disclosure can be foamed and molded using various processes known in the art. For example, the thermoplastic copolyester elastomer foam can be formed into slab foam, filament or strand foams, particulate (e.g., bead) foams of various shapes and sizes, etc. These various forms of foam can then be used in different ways. For example, like injection molded foam, slab foam and filament or strand foam can be used directly as a finished foam article, or can be shaped (e.g., cut, buffed, or trimmed) to form a finished foam article, or can be compression molded to form a finished foam article. Optionally, the thermoplastic copolyester elastomer foam can be subjected to annealing processes as part of forming the finished foam article. Pellets of the compositions can be used to form individual particulate thermoplastic copolyester elastomer foams, or can be foamed and molded to form unitary molded foam articles composed of individual portions of foam affixed to each other.

The thermoplastic copolyester elastomer foams of the various examples described herein may be further shaped or molded by any of the methods known for forming articles from thermoplastic materials. Optionally, the thermoplastic copolyester elastomer foams of the present disclosure which have been foamed using any suitable blowing process (e.g., blowing using a physical and/or chemical blowing agent), including by injection molding using only a physical blowing agent, can then be compression molded to form a compression molded foam.

In some examples, the thermoplastic copolyester elastomer foam of the present disclosure can be prepared by a process comprising (i) softening a composition (e.g., by heating at a first temperature at or above a softening temperature of the composition); (ii) simultaneously or sequentially with the softening (when applicable), contacting the composition with a first concentration or first pressure of a physical blowing agent sufficient to drive an amount of the physical blowing agent into the composition or combine the physical blowing agent with the composition; (iii) changing the concentration or pressure (e.g., decreasing the pressure or concentration) of the physical blowing agent to a second concentration or second pressure that is effective to foam the composition, thereby forming a thermoplastic copolyester elastomer foam (e.g., a thermoplastic copolyester elastomer foam having a microcellular structure); and, (iv) following the changing, cooling (when applicable) the thermoplastic copolyester elastomer foam to (e.g., cooling to a temperature below the softening temperature of the composition), to form a solidified thermoplastic copolyester elastomer foam.

In other examples, the thermoplastic copolyester elastomer foam of the present disclosure is prepared by (i) contacting (e.g., dissolving or suspending) the composition with a first concentration of a chemical blowing agent, in some examples, at or above a softening temperature of the composition (ii) triggering the chemical blowing agent to foam the composition, thereby forming a thermoplastic copolyester elastomer foam (e.g., a thermoplastic copolyester elastomer foam having a microcellular structure); and, (iii) following the triggering, in some examples, cooling the thermoplastic copolyester elastomer foam to, e.g., a temperature below its softening temperature, to form a solidified thermoplastic copolyester elastomer foam. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to foam the composition, thereby forming a thermoplastic copolyester elastomer foam (e.g., a thermoplastic copolyester elastomer foam having a microcellular structure). In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

Chemical foaming agents may be endothermic or exothermic, which refers to a type of decomposition they undergo to produce the gas for foaming. The decomposition may be a result of thermal energy in the system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the polymer composition being molded and thermal variables of the foaming agent to be decomposed are coupled together such that process parameters are selected so that the polymer can be molded and the foaming agent can decompose at an appropriate phase of the molding operation.

In a further example, the disclosed foamed polymeric materials and articles can be prepared by using systems such as those disclosed in U.S. Patent Appl. No. 62/734,912, which is incorporated herein by reference. Briefly, the system provides for decreased pressure losses across the system as well as to control (e.g., deliberately increase or decrease) the elongation, apparent shear, and/or zero shear viscosities of the molten polymeric material that is flowed into the mold. The method includes flowing a molten polymeric material into a shot tuning chamber from an upstream device and adjusting a temperature, a pressure, or both, within the shot tuning chamber to create a tuned molten polymeric material. The method additionally includes flowing the tuned molten polymeric material into a mold cavity from the shot tuning chamber. It will be appreciated that fine-tuning the temperature of and/or pressure applied to the molten polymeric material enables the system to have a desired impact on the physical and mechanical properties of the molded article. In particular, the temperature of the molten polymeric material may be controlled to achieve a desired range of shear/extensional viscosities, which reduces (e.g., substantially eliminates) uncontrolled bubble growth and/or nucleation. In one example, the method may also include adjusting (e.g., increasing and/or decreasing) a pressure in the mold cavity via a gas counter pressure (GCP) assembly prior to or while the molten polymeric material is flowed from the shot tuning chamber into the mold cavity. In such an example, the molten polymeric material may be flowed into the mold cavity at pressures well above ambient pressure. Furthermore, GCP may be introduced into the mold cavity to control nucleation and bubble growth during polymer foaming as well as increase surface quality of the molded article. Nucleation and bubble growth control enhances cell density uniformity and mechanical properties of the molded polymeric material. In some examples, the improvement in cell density homogeneity may be particularly beneficial in articles having low densities such as articles that have a density less than or equal to 0.3 grams per cubic centimeter and/or in articles having large dimensions such as articles having a thickness that is a 1.0 cm, for instance.

In various aspects, the system can include a shot tuning chamber configured to receive a molten polymeric material from an upstream device. The shot tuning chamber is also configured to adjust one or more of a temperature of and a pressure applied to the molten polymeric material to create an adjusted molten polymeric material and to dispense the adjusted molten polymeric material. In this way, the system can selectively adjust tuning chamber temperature and/or pressure to achieve desired properties, as previously mentioned. In one example, the system may further include an adjustable mold runner configured to regulate fluidic communication between the shot tuning chamber and a mold cavity in a mold. In another example, the system can further include a GCP assembly coupled to the mold cavity and configured to regulate an amount of counter pressure gas flow into and out of the mold cavity. Providing GCP adjustment allows for additional tuning of the polymeric material as it enters and cools in the mold.

Alternatively, the disclosed foamed polymeric materials and articles can be prepared using methods and systems as described in International Patent Appl. No. PCT/US2018/035128. Briefly, the method can comprise a method for molding a single-phase solution comprised of a polymer composition and a gas. The polymer composition and the gas are maintained under pressure during the molding operation to prevent a cellular structure from being formed by the dissolved gas in the polymer composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the resulting article may solidify entrapping the compressed gas, or the article may be exposed to a reduction in pressure causing the entrapped gas to form a microcellular structure.

The method can include forming the single-phase solution, such as through introduction of pressurized gas with a polymer composition that is melted, e.g., from about the $T_m$ up to about 50 degrees C. above the $T_{tail}$ of the thermoplastic copolyester elastomer as described elsewhere, in an injection molding apparatus's barrel (e.g., screw) that is effective to mix and dissolve the gas with the polymer composition while under pressure. The method continues with pressurizing a mold cavity of a mold above atmospheric pressure to a mold pressure. Atmospheric pressure is a pressure of the environment in which the mold cavity is exposed (e.g., general environment pressure). The mold pressure is at least a pressure to maintain the single-phase solution as a single single-phase. The method further includes injecting the single-phase solution into the pressurized mold cavity. The method also includes maintaining at least the mold pressure in the mold cavity during the injecting of the single-phase solution. As a result, the pressure in the mold cavity prevents the gas from coming out of solution to form a two-phase mixture (e.g., foaming) upon exit from the injection molding apparatus. As the pressure is maintained, premature foaming as the polymer composition is injected from the injection molding apparatus is avoided to allow a decoupling of process parameters associated with the foaming agent and the polymer composition.

In another example, a molding system can be utilized to prepare the disclosed foamed polymeric materials that includes a device configured to receive a polymeric material and heat the polymeric material to form a molten polymeric material. The molding system additionally includes a shot tuning chamber configured to receive the molten polymeric material from the device and adjust a temperature of or a pressure applied to the molten polymeric material. The molding system also includes an adjustable mold runner configured to regulate the flow of the molten polymeric material between the shot tuning chamber and a mold cavity. In one example, the device may be an injection device or an extrusion device. The molding system allows the characteristics of the polymeric material to be adapted to achieve desired end-use goals.

In some aspects, the present disclosure is directed to a compression molded thermoplastic copolyester elastomer foam, and to a method of forming compression molded thermoplastic copolyester elastomer foam for, among other applications, articles of footwear or athletic equipment. In some examples, the method can be a process comprising providing (e.g., preparing) a thermoplastic copolyester elastomer foam preform and then compression molding the thermoplastic copolyester elastomer foam preform to form a compression molded thermoplastic copolyester elastomer foam. For example, the thermoplastic copolyester elastomer foam can be compression molded by placing the thermoplastic copolyester elastomer foam preform in a compression mold having a height less than the initial height of the thermoplastic copolyester elastomer foam preform and closing the mold, thereby compressing the thermoplastic copolyester elastomer foam preform to the height of the mold. Simultaneously or sequentially with the compressing, the thermoplastic copolyester elastomer foam preform can be heated in the closed compression mold. During the compression molding, the temperature of at least a portion of the thermoplastic copolyester elastomer foam preform in the closed mold can be raised to a temperature within ±30 degrees C. of the softening temperature of the composition. The temperature can be raised by heating the closed mold. Following the raising of the temperature, while the thermoplastic copolyester elastomer foam preform remains closed in the compression mold, the temperature of at least a portion of the thermoplastic copolyester elastomer foam preform can be lowered. The temperature can be lowered by cooling the closed mold. The lowering can lower the temperature of at least a portion of the thermoplastic copolyester elastomer foam preform to a temperature at least 35 degrees C. below the softening temperature of the composition, thereby forming the compression molded thermoplastic copolyester elastomer foam. Following the cooling, the compression mold can be opened, and the compression molded thermoplastic copolyester elastomer foam can be removed from the compression mold.

Examples contemplated herein are directed to methods of manufacturing articles of footwear or athletic equipment. For example, the method can comprise providing components such as midsoles and inserts of an article of footwear in accordance with the present disclosure, and combining the component with a footwear upper and an outsole to form the article of footwear.

One method of making compression molded thermoplastic copolyester elastomer foam articles such as midsoles and inserts or components of articles such as components of midsoles or components of inserts described herein comprises forming a thermoplastic copolyester elastomer foam preform and compression molding the thermoplastic copolyester elastomer foam preform to make a compression molded thermoplastic copolyester elastomer foam. In some examples, the foam preforms of the various examples described herein are obtained by blowing the composition by about 150 percent to about 240 percent (e.g., from about 150 percent to about 220 percent; about 150 percent to about 200 percent, about 175 percent to about 225 percent, about 180 percent to about 230 percent or about 160 percent to about 240 percent) in at least one dimension (e.g., the vertical dimension) using a blowing agent. In some examples, the blown composition can be compression molded to about 120 percent to about 200 percent (e.g., from about 120 percent to about 180 percent; about 130 percent to about 190 percent; about 150 percent to about 200 percent; or about 160 percent to about 190 percent) in at least one dimension.

Thus for example, if the foaming of the composition is about 200 percent, the blown composition can be compression molded by a net 20 percent by compression molding to about 180 percent. In another example, if the composition is blown into a 20 millimeter (height)×10 centimeter (width)×5 centimeter (depth) slab (wherein hereinafter, "mm" will be used to indicate millimeter and "cm" will be used to indicate centimeter), and the slab is compression molded in the height direction by 20 percent, the compression molded slab would have the dimensions 18 mm (height)×10 cm (width)×5 cm (depth). In some examples, the compression molding is substantially maintained.

In some examples, the thermoplastic copolyester elastomer foam is made using a process that involves impregnating a composition (e.g., at or above a softening temperature of the composition) with a physical blowing agent at a first concentration or first pressure. The impregnated composition can then be foamed, or can be cooled (when applicable) and re-softened (when applicable) for blowing at a later time. In some instances, the impregnated composition is foamed by reducing the temperature or pressure, impacting the solubility of the physical blowing agent. The reduction in solubility of the physical blowing agent can release additional amounts of the impregnated physical blowing agent from the composition to further blow the composition forming a thermoplastic copolyester elastomer foam (e.g., a thermoplastic copolyester elastomer foam having a microcellular structure).

In some examples, the compression molding process is conducted by heating the thermoplastic copolyester elastomer foam preform in a closed compression mold. The thermoplastic copolyester elastomer foam preform is heated to a temperature close to its softening temperature, to allow the foam to retain the shape of the compression mold. For example, the foam preform can be heated to a temperature within ±30 degrees C. of its softening temperature, or within ±20 degrees C. of its softening temperature, or within ±10 degrees C. of its softening temperature, or within ±5 degrees C. of its softening temperature. For example, the thermoplastic copolyester elastomer foam preform can be heated to a temperature of from about 100 degrees C. to about 250 degrees C., or of from about 140 degrees C. to about 220 degrees C., or of from about 100 degrees C. to about 150 degrees C., or of from about 130 degrees C. to about 150 degrees C.

The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam from the mold.

The injection molded thermoplastic copolyester elastomer foam can have a closed skin. A closed skin can also be formed by compression molding a thermoplastic copolyester elastomer foam preform in a compression mold. However, care should be taken during the compression molding not to subject the thermoplastic copolyester elastomer foam preform to conditions such that more than a desired amount of the closed cell structures of the foam collapse. One way to avoid collapsing more than a desired amount of the closed cell structures is to control the temperature of the thermoplastic copolyester elastomer foam during the compression molding process, for example, by controlling the temperature of the mold. For example, during the compression molding step, the heating of the thermoplastic copolyester elastomer foam preform in the compression mold can be conducted for time of from 100 seconds to 1,000 seconds, or of from 150 seconds to 700 seconds.

Once the thermoplastic copolyester elastomer foam has been heated in the compression mold at the appropriate temperature for the desired length of time to soften the thermoplastic copolyester elastomer foam to the desired level, the softened preform is cooled, for example, to a temperature at least 35 degrees C. below its softening temperature, or at least 50 degrees C. below its softening temperature, or at least 80 degrees C. below its softening temperature, to re-solidify the softened foam, thereby forming the compression molded foam. Once cooled, the compression molded thermoplastic copolyester elastomer foam is removed from the compression mold. Following the heating, the cooling of the foam preform in the compression mold can be conducted for a time of from 50 to 1,000 seconds, or for a time of from 100 to 400 seconds.

In the thermoplastic copolyester elastomer foam of the present disclosure, the composition comprising one or more thermoplastic copolyester elastomers has a foam structure with a density of about 0.7 grams per cubic centimeter, 0.5 grams per cubic centimeter, 0.4 grams per cubic centimeter, 0.3 grams per cubic centimeter, or less. The thermoplastic copolyester elastomer foam has a density of about 0.1 grams per cubic centimeter to about 0.22 grams per cubic centimeter, about 0.2 grams per cubic centimeter to about 0.35 grams per cubic centimeter, or about 0.1 grams per cubic centimeter to about 0.35 grams per cubic centimeter. The thermoplastic copolyester elastomer foam can be foamed using any one of the methods described above. The foams and components of the present disclosure can have a density of from 0.02 grams per cubic centimeter to 0.22 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter, or from 0.10 grams per cubic centimeter to 0.12 grams per cubic centimeter, from 0.15 grams per cubic centimeter to 0.2 grams per cubic centimeter; 0.15 grams per cubic centimeter to 0.30 grams per cubic centimeter. Alternatively or in addition, the foam preform can have a density of from 0.01 grams per cubic centimeter to 0.10 grams per cubic centimeter, or of from 0.02 grams per cubic centimeter to 0.08 grams per cubic centimeter, or of from 0.03 grams per cubic centimeter to 0.06 grams per cubic centimeter; 0.08 grams per cubic centimeter to 0.15 grams per cubic centimeter; or from 0.10 grams per cubic centimeter to 0.12 grams per cubic centimeter. For example, the density of the compression molded foam component can be from or from 0.15 grams per cubic centimeter to 0.2 grams per cubic centimeter, and the density of the foam preform can be from 0.10 grams per cubic centimeter to 0.12 grams per cubic centimeter.

Additives.

In various aspects, the disclosed foamed polymeric materials can independently further comprise an additive. The additive can be incorporated directly into the disclosed foam particles or binding materials, or alternatively, applied thereto. Additives that can be used in the disclosed foam particles or binding materials include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. In some aspects, the additive can be a wax, an anti-oxidant, a UV-absorbing agent, a coloring agent, or combinations thereof.

When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkyithiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3,5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)proponic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4- hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2.2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithio terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris (3,5-di-tert-butyl-4-hydroxy-phenylpropionyl)-hexahydro-1.3,5-triazine, 1,3,5-tris(3,5-dicyclohexyl-4-hydroxybenzyl)isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclco[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclco[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N, N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclco[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclco[2.2.2]octane, and mixtures of esters derived from two or more of the foregoing mono- or polyhydric alcohols.

Exemplary amides of 3-(3,5-di-tert-butyl-4-hydromhenyl)propionic acid, include, but are not limited to, N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N, N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N, N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a UV absorber and/or light stabilizer, including, but not limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-($\omega$)-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-$\alpha$-cumyl-5-t-octylphenyl)-2H-benzotriazole, 2-(2-hydroxy-3-t-octyl-5-$\alpha$-cumylphenyl)-2H-benzotriazole, 5-fluoro-2-(2-hydroxy-3,5-di-$\alpha$-cumyl-phenyl)-2H-benzotriazole. 5-chloro-2-(2-hydroxy-3,5-di-$\alpha$-cumylphenyl)-2H-benzotriazole, 5-chloro-2-(2-hydroxy-3-$\alpha$-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-$\alpha$-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-$\alpha$-cumyl-5-t-octylphenyl)-2H-benzotriazole, 5-trifluoromethyl-2-(2-hydroxy-3-$\alpha$-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-$\alpha$-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid, include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, poly[methylpropyl-3-oxy-4-(2,2,6,6-tetramethyl-4-piperidyl)]siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy) phenylJ-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethylphenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy) phenyl]-s-triazine, 2,4,6-tris[2-hydroxy-4-(3-sec-butyloxy-2-hydroxypropyloxy)phenyq-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the disclosed polymeric foamed materials can further include one or nucleating agent. Nucleating agents are widely used to modify the properties of various polymers. Nucleating agents can aid in decreasing foam density, increasing the number of cells present in the foam, and decreasing cell size in the foam by providing a surface for heterogeneous nucleation of gas bubbles from the supercritical fluid state. For the thermoplastic copolyester elastomer foams of the present disclosure, nucleating agents can influence the properties of the final foam article by modifying the quantity, distribution and rate of supercritical fluid conversion from a liquid to a gas during the foaming process as lower pressures. The addition of nucleating agents provides a surface on which the supercritical fluid can be transformed from a liquid to a gas. As a consequence, many nucleation sites will result in many gas cell domains. In a particular example, the nucleating agent can include a metal salt of a fatty acid. In some aspects, the nucleating agent is zinc stearate. In some aspects, the composition contains about 0.1 wt. percent to about 10 wt. percent, about 0.1 wt. percent to about 5 wt. percent, about 0.1 wt. percent to about 2 wt. percent, or about 0.5 wt. percent to about 2 wt. percent of the nucleating agent based upon a total weight of the composition.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nano-clays, nano-carbon, graphite, nano-silica, and the like.

In a further aspect, the foamed polymeric material can further comprise a filler. The filler can be present in an amount from about 0.05 weight percent to about 20 weight percent based on the total weight of the foamed polymeric material; about 0.1 weight percent to about 10 weight percent based on the total weight of the foamed polymeric material; or present in an amount that is a value or set of values within the foregoing ranges, or any range that is a sub-set of the foregoing ranges. In some instances, the filler is a particulate filler. In further aspects, the filler is a carbonaceous filler. The carbonaceous filler can be carbon black, activated carbon, graphite, carbon fibers, carbon fibrils, carbon nanoparticles, or combinations thereof. In various aspects, the carbonaceous filler can be chemically-modified. Alternatively, the filler can be an inorganic filler. The inorganic filler can be an oxide, a hydroxide, a salt, a silicate, a metal, or combinations thereof. Examples of an inorganic filler include, but are not limited to, glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavy-weight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

In some examples, the disclosed foamed polymeric materials can also include a nanofiller. Nanofillers can not only serve as mechanical reinforcement but also nucleating agents. A variety of nanofillers can be used in lieu of or in addition to the zinc stearate. Nanofillers can include nanomaterials having one-dimensional structures such as of plates, laminas and/or shells; two-dimensional structures such as nanotubes and nanofibres having a diameter lower than 0.1 μm; or three-dimensional nanostructures such as nanoparticles or beads. Nanoplate fillers can be natural or synthetic clays, as well as phosphates of transition metals. Clay-based nanocomposites generate an overall improvement in physical performances. The most widely used ones are the phyllosilicates. Nanofillers can include nano-oxides such as nanoparticles of Titanium dioxide or Rutile. Other nanofillers can include nanoparticles of alumina or aluminum oxide, diatomite, and nanoscale carbon materials such as single-wall carbon nanotubes (SWCNT) or double-wall carbon nanotubes (DWCNT).

In some aspects, the additive is a cross-linking agent. There are a variety of cross-linking agents that can be used in the disclosed thermoplastic compositions. For example, a cross-linking agent can be a free-radical initiator. The free radical initiator can generate free radicals through thermo cleavage or UV radiation. The free-radical initiator can be present in an amount from about 0.001 weight percent to about 1.0 weight percent. A variety of radical initiators can be used as the radical sources to make thermoplastic compositions have a crosslinked structure. Suitable radical initiators applied include peroxides, sulfurs, and sulfides. Exemplary peroxides include, but are not limited to, aliphatic peroxides and aromatic peroxides, such as diacetylperoxide, di-tert-butypperoxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 trimethylcyclohexane, and di(2,4-dichloro-benzoyl), or combinations of two or more of the foregoing.

In some aspects, the additive is a colorant. The term "colorant," as used herein, means a compound providing color to a substrate, e.g., a disclosed thermoplastic composition. The colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 weight percent and about 5 weight percent relative to the weight of the composition. In a further aspect, the disclosed thermoplastic composition can comprise between about 0.01 weight percent and about 3 weight percent relative to the weight of the composition.

The disclosed foamed polymeric materials can comprise one or more colorants. In some aspects, the disclosed foamed polymeric materials can comprise a first colorant, and the binding material can comprise a second colorant. In this instance, it is understood that the first colorant can comprise one or more dyes or pigments. Similarly, it is understood that the second colorant can comprise one or more dyes or pigments.

There are at least two types of metal complex dyes that can be used as colorants. Acid metal complex dyes are soluble in water and therefore dissolved in a water solvent system prior to use. Solvent metal complex dyes are insoluble in water and therefore dissolved in a water/organic solvent system prior to use.

The solvent system used for metal complex dyes should both dissolve the dyes and promote diffusion of dye molecules into the elastomeric substrates under mild conditions. Thus, it was discovered that certain organic solvents not only dissolve dyes that are insoluble in water such as solvent metal complex dyes, but also promote or facilitate dye diffusion into the polymer matrix of both acid metal complex dyes and solvent metal complex dyes.

Suitable organic solvents include ethylene glycol phenyl ether (EGPE) and isopropanol. Generally a relatively smaller amount of organic solvent is needed.

A suitable solvent system for acid metal complex dyes contains, for example, 90 to 100 volume percent water and 0 to 10 volume percent organic solvent. Typical amounts of organic solvents are 0.5 to 7 volume percent or 1 to 5 volume percent.

A suitable solvent system for solvent metal complex dyes contains, besides water and ethylene glycol phenyl ether, a third component, usually an organic solvent, to increase the solubility of dyes. For example, the solvent system may contain 40 to 80 volume percent water and 60 to 20 volume percent organic solvent. Suitable organic solvents include, but are not limited to, alcohols, ethers, esters and ketones. Suitable solvent metal complex dyes include Orasol Yellow 2RLN, Orasol Yellow 2GLN-M, Pylam Solvent Red, Pylam Brilliant Yellow, and Resofast Orange M2Y.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether.

In a two-phase solvent system, a solution is prepared containing a major amount of water and a minor amount of an organic solvent. The organic solvent is either partially miscible with water or nearly insoluble in water such that the water and organic solvent form a two phase system. The two-phase solvent composition allows fast and uniform dyeing, e.g., of foam particles.

The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets.

A two-phase solvent composition can contain 1 to 30 volume percent, for example, 1 to 25 volume percent, organic solvent, and 70 to 99 volume percent, for example, 75 to 99 volume percent, water. These two-phase solvent compositions are particularly suitable for solvent dyes that have high solubility in organic solvents. Generally, dyes suitable for use in this embodiment include those that are highly soluble in organic solvent, but nearly insoluble in water.

When suitable substrates are immersed in the two-phase solvent dye system, droplets of organic solvent and dye are preferentially adsorbed onto the surface of the substrate. This creates a thin layer of organic solvent with a high concentration of dye on the surface of the substrate. In addition, the organic solvent causes the substrate to swell providing an open polymeric structure. The combination of such open structure in the substrate and high concentration of dye facilitates fast diffusion of dye molecules into the substrate.

Thus, the two-phase solvent composition both dissolves dyes and promotes diffusion of dye molecules into flexible substrates under mild conditions. Compared with conventional dyeing systems, the two-phase solvent dye system provides fast dyeing, uses less organic solvent, uses mild dyeing conditions, and provides potential for effective dye recovery/removal from solvent.

In some aspects, a dye can be a metal complex dye such as, but not limited to, Bezanyl Black, Bezanyl Red, Bezanyl Yellow, Orasol Black, Orasol Blue GN, Orasol Red G, Orasol Yellow 2GLN, Isolan Blue, SP-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange, and Resofast Yellow.

In some aspects, the disclosed foamed polymeric materials can be dyed with a nonionic or anionic ("acid") dye by one of: (1) before being infused with the supercritical fluid, (2) during being infused with the supercritical fluid by a nonionic or anionic dye dissolved or dispersed in the supercritical fluid, which optionally comprises a polar liquid, (3) during immersion in the heated fluid, where the heated fluid contains the dye, or (4) after being foamed.

In some aspects, the colorant can be an acid dyes, such as a water-soluble anionic dyes. Acid dyes are available in a wide variety, from dull tones to brilliant shades. Chemically, acid dyes include azo, anthraquinone and triarylmethane compounds.

The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000

C.I. generic names. In the C.I. each compound is presented with two numbers referring to the coloristic and chemical classification. The "generic name" refers to the field of application and/or method of coloration, while the other number is the "constitution number." Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes and nonionic disperse dyes are commercially available from many sources, including Dystar L.P., Charlotte, N.C., under the trademark TELON; Huntsman Corporation, Woodlands, Tex., under the trademarks ERIONYL and TECTILON; BASF SE, Ludwigshafen, Germany under the trademark BASACID; Clariant International Ltd., Muttenz, Switzerland, under the trademarks of SOLVAPERM, HOSTASOL, POLYSYNTHREN, and SAVINYL; and Bezema AG, Montlingen, Switzerland under the trade name Bemacid.

Nonionic disperse dyes are also commercially available in many colors and include fluorescent dyes.

In some aspects, the disclosed foamed polymeric materials can be dyed before being foamed. The acid or nonionic disperse dye solution in which the pellets or other articles are dyed may include, for example, from about 0.001 to about 5.0 grams per liter, preferably from about 0.01 to about 2 grams per liter of the acid or nonionic disperse dye compound or combination of acid or nonionic disperse dye compounds. The amount of acid or nonionic disperse dye compound use will determine how strong the color is and how quickly the pellets or other articles are dyed, and may be optimized in a straightforward manner; generally, a more concentrated dye solution can provide a stronger (deeper, darker, more intense) dyed color and can more quickly dye the pellets or other articles containing the thermoplastic elastomer.

The dye solution may include a water-soluble organic solvent. Water solubility of a particular organic solvent used in a particular amount in the dye solution is determined at 20 degrees Celsius. and 1 atm. pressure at the concentration at which the alcohol is to be used in the dye solution; the organic solvent is water soluble if it fully dissolves or is fully miscible in water at 20 degrees Celsius. and 1 atm. pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50 percent by volume, or up to about 25 percent by volume, or from about 1 percent to about 50 percent by volume, or from about 5 percent to about 40 percent by volume, or from about 10 percent to about 30 percent by volume, or from about 15 percent to about 25 percent by volume of the aqueous medium used to make the dye solution. Whether an organic solvent is used and how much organic solvent is used may be varied according to which dye is used and to the application method for contacting the dye solution with the pellets or other articles.

If the disclosed foamed polymeric materials comprise thermoplastic polyurethane elastomers or thermoplastic polyurea elastomers, the anionic dye solution also advantageously includes a quaternary (tetraalkyl) ammonium salt selected from soluble tetrabutylammonium compounds and tetrahexylammonium compounds. Such articles are advantageously dyed in an acid dye solution including an anionic dye compound, a quaternary ammonium salt selected from soluble tetrabutylammonium compounds and tetrahexylammonium compounds, and, optionally, a water-soluble organic solvent.

The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphite, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color for the dyed cover or coating layer. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution used to dye the disclosed foamed polymeric materials when they contain thermoplastic polyurethane elastomers or thermoplastic polyurea elastomers may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the cover or coating layer and may be optimized in a straightforward manner. The process of dyeing the disclosed foamed polymeric materials containing thermoplastic polyurethane elastomers or thermoplastic polyurea elastomers with this dye solution containing the soluble tetraalkylammonium compound can produce strong color intensity in the dyed foam particles or binding materials.

The disclosed foamed polymeric materials may be dyed with a nonionic or anionic dye one of (1) before being infused with the supercritical fluid. The pellets may also be dyed while being infused with the supercritical fluid by a nonionic or anionic dye dissolved or dispersed in the supercritical fluid, which optionally comprises a polar liquid. The pellets may also be dyed while being immersed in the heated fluid, where the heated fluid contains the dye. In particular, the heated fluid may be a heated aqueous dye solution, which may contain the quaternary ammonium salt and organic solvents as described. Finally, the disclosed foamed polymeric materials can be dyed after being foamed using the dyeing process as already described.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the parts per hundreds as "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the parts per hundreds as 'about x, y, z, or greater' should be interpreted to include the specific ranges of 'about x', 'about y', and 'about z' as well as the ranges of 'greater than x', greater than y', and 'greater than z'. In addition, the parts per hundreds as "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The term "about," as used herein, can include traditional rounding according to significant figures of the numerical value. In some aspects, the term about is used herein to mean a deviation of 10 percent, 5 percent, 2.5 percent, 1 percent, 0.5 percent, 0.1 percent, 0.01 percent, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun parts per hundreds denotes a particular specified feature or particular specified features and may have a singular or plural connotation depending upon the context in which it is used.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The term "copolymer" refers to a polymer having two or more monomer species, and includes terpolymers (i.e., copolymers having three monomer species).

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of poplyethylene; "units of polypropylene" refers to block units of polypropylene; "units of polybutylene" refers to block units of polybutylene, and so on. Such use will be clear from the context.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Unless otherwise specified, temperatures referred to herein are based on atmospheric pressure (i.e. one atmosphere).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

As used herein the term "weight percent," indicates the percent by weight of a given component based on the total weight of the composition, unless otherwise specified. That is, unless otherwise specified, all wt percent values are based on the total weight of the composition. It should be understood that the sum of wt percent values for all components in a disclosed composition or formulation are equal to 100.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials

The materials referred to throughout the examples are, unless otherwise indicated, described in Table 1 below. The partially hydrogenated SEBS block copolymers from Asahei Kasei (marketed under the trade name TUFTEC®) all have an elongation at break of greater than 650 percent when measured using ASTM D638. The P1083 (and the research grade JT-83) have a styrene content of about 20 percent, while the P5051 has a styrene content of about 47 percent. The SEBS copolymer from KRATON Polymers (KRATON® G1651E) has a styrene content of about 30 percent-33 percent. The ENGAGED polyolefin elastomers are copolymers of ethylene and octene, while the TAFMER® linking polymers are random copolymers of ethylene and 1-butene. For materials where the supplier is not listed in Table 1 (e.g. stearic acid), these materials are generally available from a variety of suppliers.

TABLE 1

Materials Used In Examples

| Trade Name | Ingredient | Description | Supplier |
|---|---|---|---|
| TUFTEC ® P1083 | Partially hydrogenated SEBS block copolymer | Aromatic/aliphatic copolymer | Asahei Kasei |
| TUFTEC ® JT-83 (research grade of P1083) | Partially hydrogenated SEBS block copolymer | Aromatic/aliphatic copolymer | Asahei Kasei |
| TUFTEC ® P5051 | Partially hydrogenated SEBS block copolymer | Aromatic/aliphatic copolymer | Asahei Kasei |
| KRATON ® G1651E | partially hydrogenated SEBS block copolymer | Aromatic/aliphatic copolymer | KRATON Polymers Group |
| INFUSE ™ 9000 OBC | Olefin block copolymer | Olefinic Copolymer | Dow Chemical Co. |
| INFUSE ™ 9107 OBC | Olefin block copolymer | Olefinic Copolymer | Dow Chemical Co. |
| INFUSE ™ 9530 OBC | Olefin block copolymer | Olefinic Copolymer | Dow Chemical Co. |
| ENGAGE ® 8480 | Polyolefin elastomer | Olefinic Copolymer | Dow Chemical Co. |
| ENGAGE ® 8540 | Polyolefin elastomer | Olefinic Copolymer | Dow Chemical Co. |
| ENGAGE ® 8440 | Polyolefin elastomer | Olefinic Copolymer | Dow Chemical Co. |
| TAFMER ® DF-110 | Alpha-olefin copolymer | Linking Polymer | Mitsui Elastomers |
| TAFMER ® DF-605 | Alpha-olefin copolymer | Linking Polymer | Mitsui Elastomers |
| EVA-659 | Ethylene vinyl acetate copolymer | Ethylene vinyl acetate (EVA) | USI Corporation |
| EVA-3330 | Ethylene vinyl acetate copolymer | EVA | USI Corporation |
| ELVAX ® 360 | Ethylene vinyl acetate copolymer | EVA | DuPont |
| ST/AC | Stearic Acid | Organic acid | |
| ZnO | Zinc oxide | Metal oxide | |
| $TiO_2$ | Titanium Dioxide | Metal oxide | |
| $CaCO_3$ | Calcium Carbonate | Filler/Nucleating Agent | |
| TAC-50GR | Triallyl cyanurate | Crosslinking agent | |
| Color base | | Coloring agent | |
| 27020 | Blue tint | Coloring agent | |
| EVA 1375 | Red pigment | Coloring agent | |

TABLE 1-continued

Materials Used In Examples

| Trade Name | Ingredient | Description | Supplier |
|---|---|---|---|
| 8502 | Black pigment | Coloring agent | |
| R929 | | Coloring agent | |
| UNICELL D600-MT (MB-50%) | | Blowing agent | Tramaco |
| JTR/TL | | Blowing agent | Kumyang |
| COLINK 101-45GE | 2,5-Dimethyl-2,5-di(tert-butylperoxy)hexane | Free-radical initiator | |
| DCP | Dicumyl peroxide | Free-radical initiator | |

Example 1: Batch Process of Preparing Compositions Capable of being Foamed

The pre-foam compositions, compositions prior to being foamed, described in Tables 3 and 4 were prepared. Some of the pre-foam compositions were first compounded using the components shown in Table 2 to form pre-foam base compositions (PFBC) 1 and PFBC 2, according to Example 1. These PFBCs were then used to prepare the foam compositions shown in Tables 3, 4. The properties of the foam compositions are described in Table 5. In some instances, PFC 1 or PFBC 2 were further modified as shown in Tables 3, 4 and 5 by adding additional materials. Other formulations were prepared directly, without first forming a pre-foam base composition.

TABLE 2

Table 2: Composition of Pre-Foam Base Compositions Used For Making Pre-Foam Compositions

| Trade Name | Pre-Foam Base Composition 1 (PFBC 1) phr in PFBC1 | Pre-Foam Base Composition 2 (PFBC 2) phr in PFBC2 | Formulations A, B, C, and D phr in formulation |
|---|---|---|---|
| TUFTEC ® P1083 | 10.0 | 16.6 | ** |
| TUFTEC ® P5051 | 0.0 | 0.0 | ** |
| TUFTEC ® JT-83 | 0.0 | 0.0 | ** |
| KRATON ® D G1651E | 0.0 | 0.0 | ** |
| INFUSE ™ OBC9000 | 0.0 | 0.0 | ** |
| INFUSE ™ OBC9107 | 15.0 | 24.9 | ** |
| INFUSE ™ OBC9507 | 0.0 | 0.0 | ** |
| INFUSE ™ OBC9530 | 0.0 | 0.0 | ** |
| ENGAGE ® 8480 | 0.0 | 0.0 | ** |
| ENGAGE ® 8540 | 0.0 | 0.0 | ** |
| ENGAGE ® 8440 | 0.0 | 0.0 | ** |
| TAFMER ® DF-110 | 12.0 | 19.9 | ** |
| TAFMER ® DF-605 | 18.0 | 29.9 | ** |
| EVA-659 | 40.0 | 0.0 | ** |
| EVA-3330 | 5.0 | 0.0 | ** |
| ELVAX ® 360 | 0.0 | 0.0 | ** |
| ELVAX ® 40L-03 | 0.0 | 0.0 | ** |
| ST/AC | 1.0 | 1.7 | 0.0 |
| ZnO | 0.8 | 1.4 | 1.5 |
| TiO$_2$ | 0.0 | 0.0 | 3.6 |
| CaCO$_3$ | 0.0 | 0.0 | 5.0 |
| TAC-50GR | 0.3 | 0.5 | 0.0 |
| Color base | 11.0 | 18.3 | 0.0 |
| 27020 | 0.0 | 0.0 | 0.0 |
| EVA 1375 | 0.0 | 0.0 | 0.0 |
| 8502 | 0.0 | 0.0 | 0.0 |
| R929 | 0.0 | 0.0 | 0.1 |
| UNICELL D600-MT | 11.5 | 11.5 | 0.0 |
| JTR/TL | 0.0 | 0.0 | 9.8 |
| COLINK 101-45GE | 0.0 | 0.0 | 0.0 |
| DCP | 0.7* | 0.7* | 0.7 |

*concentration in formulation
** See Table 2 and 3

The pre-foam compositions were formed using a batch process where the partially hydrogenated SEBS block copolymer and the olefin polymer were combined in a kneader for about 20 minutes. During this time, the kneader temperature was maintained at a temperature of from about 100 degrees Celsius to about 120 degrees Celsius. In some examples, the ethylene vinyl acetate copolymer (the EVA component of the composition) and/or pigments was added to the mixture the partially hydrogenated SEBS block copolymer and the olefin polymer.

Next, where present, the one or more metal oxide, one or more organic acid, and one or more crosslinking agent were added to the mixture. The combined mixture including the partially hydrogenated SEBS block copolymer and the olefin polymer, as well as (if present) the EVA along with the metal oxide, organic acid, and crosslinking agent were mixed in the kneader for about 20 minutes, while the kneader temperature was held at a temperature of from about 100 degrees Celsius to about 120 degrees Celsius.

Next, the kneader temperature was lowered to about 90 degrees Celsius or below. The combined mixture in the kneader was then combined with the blowing agent and a free radical initiator. The kneaded mixture was then subjected to pelletization using a die that is cooled to maintain the temperature at about 90 degrees Celsius or below.

TABLE 3

Composition of foams

| | Composition | | | | |
|---|---|---|---|---|---|
| | A | B | C | D | E |
| Material | Parts by Wt. | Parts by Wt. | Parts by Wt. | Parts by Wt. | Parts by Wt. |
| PFBC 1 (MB1) | 0.0 | 0.0 | 0.0 | 0.0 | 0.0 |
| PFBC 2 (MB2) | 0.0 | 0.0 | 0.0 | 0.0 | 70.0 |

TABLE 3-continued

Composition of foams

| Material | | | | | |
|---|---|---|---|---|---|
| Kraton G1651E | 0.0 | 0.0 | 0.0 | 0.0 | 0.0 |
| TUFTEC ® P1083 | 0.0 | 0.0 | 0.0 | 0.0 | 9.3 |
| TUFTEC ® JT-83 | 20.0 | 20.0 | 20.0 | 20.0 | 10.0 |
| TUFTEC ® P5051 | 0.0 | 0.0 | 0.0 | 0.0 | 0.0 |
| INFUSE™ 9000 OBC | 0.0 | 0.0 | 0.0 | 0.0 | 0.0 |
| INFUSE™ 9107 OBC | 0.0 | 0.0 | 0.0 | 0.0 | 13.9 |
| INFUSE™ 9530 OBC | 0.0 | 0.0 | 0.0 | 20.0 | 20.0 |
| ENGAGE ® 8440 | 0.0 | 0.0 | 20.0 | 0.0 | 0.0 |
| ENGAGE ® 8480 | 20.0 | 0.0 | 0.0 | 0.0 | 0.0 |
| ENGAGE ® 8540 | 0.0 | 20.0 | 0.0 | 0.0 | 0.0 |
| TAFMER ® DF-110 | 0.0 | 0.0 | 0.0 | 0.0 | 11.1 |
| TAFMER ® DF-605 | 0.0 | 0.0 | 0.0 | 0.0 | 16.7 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 60.0 | 60.0 | 60.0 | 60.0 | 0.0 |
| ZnO | | | | | 1.0 |
| ST/AC | | | | | 1.0 |
| TAC-GR50 | | | | | 0.3 |
| D600MT | | | | | 8.9 |
| DCP | | | | | 0.0 |
| 101-45GE | | | | | 0.9 |
| Total Parts by Wt. | 120.7 | 120.7 | 120.7 | 120.7 | 112.0 |

| | Composition | | | | |
|---|---|---|---|---|---|
| | F | G | H | I | J |
| Material | Parts by Wt. | Parts by Wt. | Parts by Wt. | Parts by Wt. | Parts by Wt. |
| PFBC 1 (MB1) | 0.0 | 0.0 | 0.0 | 0.0 | 0.0 |
| PFBC 2 (MB2) | 90.0 | 70.0 | 100.0 | 50.0 | 80.0 |
| Kraton G1651E | 0.0 | 0.0 | 0.0 | 0.0 | 0.0 |
| TUFTEC ® P1083 | 11.9 | 9.3 | 13.2 | 6.6 | 10.6 |
| TUFTEC ® JT-83 | 10.0 | 10.0 | 0.0 | 10.0 | 0.0 |
| TUFTEC ® P5051 | 0.0 | 0.0 | 0.0 | 20.0 | 0.0 |
| INFUSE™ 9000 OBC | 0.0 | 0.0 | 0.0 | 0.0 | 0.0 |
| INFUSE™ 9107 OBC | 17.9 | 13.9 | 19.9 | 9.9 | 15.9 |
| INFUSE™ 9530 OBC | 0.0 | 20.0 | 0.0 | 20.0 | 20.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 14.3 | 11.1 | 15.9 | 7.9 | 12.7 |
| TAFMER ® DF-605 | 21.5 | 16.7 | 23.8 | 11.9 | 19.1 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.2 | 0.4 | 0.4 | 0.3 | 0.4 |
| D600MT | 10.0 | 8.9 | 15.2 | 8.9 | 4.7 |
| DCP | 0.4 | 0.0 | 0.0 | 0.0 | 0.0 |
| 101-45GE | 0.9 | 0.8 | 0.8 | 0.9 | 0.8 |
| Total Parts by Wt. | 113.5 | 112.1 | 118.4 | 112.0 | 107.9 |

| | Composition | | | | |
|---|---|---|---|---|---|
| | K | L | M | N | O |
| Material | Parts by Wt. | Parts by Wt. | Parts by Wt. | Parts by Wt. | Parts by Wt. |
| PFBC 1 (MB1) | 0.0 | 0.0 | 0.0 | 0.0 | 0.0 |
| PFBC 2 (MB2) | 60.0 | 80.0 | 100.0 | 100.0 | 70.0 |
| Kraton G1651E | 0.0 | 0.0 | 0.0 | 0.0 | 0.0 |
| TUFTEC ® P1083 | 7.9 | 10.6 | 13.2 | 13.2 | 9.3 |
| TUFTEC ® JT-83 | 0.0 | 0.0 | 0.0 | 0.0 | 10.0 |
| TUFTEC ® P5051 | 0.0 | 0.0 | 0.0 | 0.0 | 0.0 |
| INFUSE™ 9000 OBC | 0.0 | 0.0 | 0.0 | 0.0 | 20.0 |
| INFUSE™ 9107 OBC | 11.9 | 15.9 | 19.9 | 19.9 | 13.9 |
| INFUSE™ 9530 OBC | 40.0 | 20.0 | 0.0 | 0.0 | 0.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 9.5 | 12.7 | 15.9 | 15.9 | 11.1 |
| TAFMER ® DF-605 | 14.3 | 19.1 | 23.8 | 23.8 | 16.7 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.4 | 0.4 | 0.4 | 0.4 | 0.3 |
| D600MT | 4.4 | 8.6 | 5.0 | 8.6 | 8.9 |
| DCP | 0.0 | 0.0 | 0.0 | 0.0 | 0.0 |
| 101-45GE | 0.8 | 0.8 | 0.8 | 0.8 | 0.9 |
| Total Parts by Wt. | 107.6 | 111.8 | 108.2 | 111.8 | 112.0 |

| | Composition | | | | |
|---|---|---|---|---|---|
| | P | Q | R | S | T |
| Material | Parts by Wt. | Parts by Wt. | Parts by Wt. | Parts by Wt. | Parts by Wt. |
| PFBC 1 (MB1) | 0.0 | 0.0 | 0.0 | 0.0 | 0.0 |
| PFBC 2 (MB2) | 70.0 | 100.0 | 60.0 | 70.0 | 100.0 |
| Kraton G1651E | 0.0 | 0.0 | 0.0 | 0.0 | 0.0 |
| TUFTEC ® P1083 | 9.3 | 13.2 | 7.9 | 9.3 | 13.2 |
| TUFTEC ® JT-83 | 10.0 | 0.0 | 0.0 | 10.0 | 0.0 |
| TUFTEC ® P5051 | 0.0 | 0.0 | 0.0 | 0.0 | 0.0 |
| INFUSE™ 9000 OBC | 0.0 | 0.0 | 0.0 | 0.0 | 0.0 |
| INFUSE™ 9107 OBC | 13.9 | 19.9 | 11.9 | 13.9 | 19.9 |
| INFUSE™ 9530 OBC | 20.0 | 0.0 | 40.0 | 20.0 | 0.0 |
| ENGAGE ® 8440 | 0.0 | 0.0 | 0.0 | 0.0 | 0.0 |
| ENGAGE ® 8480 | 0.0 | 0.0 | 0.0 | 0.0 | 0.0 |
| ENGAGE ® 8540 | 0.0 | 0.0 | 0.0 | 0.0 | 0.0 |
| TAFMER ® DF-110 | 11.1 | 15.9 | 9.5 | 11.1 | 15.9 |
| TAFMER ® DF-605 | 16.7 | 23.8 | 14.3 | 16.7 | 23.8 |
| EVA-659 | 0.0 | 0.0 | 0.0 | 0.0 | 0.0 |
| EVA-3330 | 0.0 | 0.0 | 0.0 | 0.0 | 0.0 |
| ELVAX ® 360 | 0.0 | 0.0 | 0.0 | 0.0 | 0.0 |
| ZnO | 1.0 | 1.0 | 1.0 | 1.0 | 1.0 |
| ST/AC | 1.0 | 1.0 | 1.0 | 1.0 | 1.0 |
| TAC-GR50 | 0.3 | 0.4 | 0.4 | 0.4 | 0.4 |
| D600MT | 8.6 | 8.8 | 8.3 | 8.9 | 15.2 |
| DCP | 0.0 | 0.0 | 0.0 | 0.0 | 0.0 |
| 101-45GE | 0.9 | 0.8 | 0.8 | 0.8 | 0.8 |
| Total Parts by Wt. | 111.8 | 116.5 | 111.5 | 112.1 | 118.4 |

| | Composition | | |
|---|---|---|---|
| | U | V' | W' |
| Material | Parts by Wt. | Parts by Wt. | Parts by Wt. |
| PFBC 1 (MB1) | 100.0 | 100.0 | 100.0 |
| PFBC 2 (MB2) | 0.0 | 0.0 | 0.0 |
| Kraton G1651E | 0.0 | 0.0 | 0.0 |
| TUFTEC ® P1083 | 8.0 | 8.0 | 8.0 |
| TUFTEC ® JT-83 | 0.0 | 0.0 | 0.0 |
| TUFTEC ® P5051 | 0.0 | 0.0 | 0.0 |
| INFUSE™ 9000 OBC | 0.0 | 0.0 | 0.0 |
| INFUSE™ 9107 OBC | 12.0 | 12.0 | 12.0 |
| INFUSE™ 9530 OBC | 0.0 | 0.0 | 0.0 |
| ENGAGE ® 8440 | 0.0 | 0.0 | 0.0 |
| ENGAGE ® 8480 | 0.0 | 0.0 | 0.0 |
| ENGAGE ® 8540 | 0.0 | 0.0 | 0.0 |
| TAFMER ® DF-110 | 9.6 | 9.6 | 9.6 |
| TAFMER ® DF-605 | 14.4 | 14.4 | 14.4 |
| EVA-659 | 31.9 | 31.9 | 31.9 |
| EVA-3330 | 4.0 | 4.0 | 4.0 |
| ELVAX ® 360 | 0.0 | 0.0 | 0.0 |
| ZnO | 1.0 | 1.0 | 1.0 |
| ST/AC | 1.0 | 1.0 | 1.0 |
| TAC-GR50 | 0.4 | 1.0 | 0.6 |
| D600MT | 8.8 | 8.4 | 7.9 |
| DCP | 0.0 | 0.0 | 0.0 |
| 101-45GE | 0.8 | 0.2 | 0.6 |
| Total Parts by Wt. | 112.0 | 111.6 | 111.1 |

Example 2: Continuous Process of Preparing Pre-Foam Compositions

Pre-foam compositions can be prepared using a continuous process where the styrenic copolymer component and the unsaturated olefin component are pre-mixed in a hopper and fed into a twin-screw extruder. The zone in the twin-screw extruder into which the styrenic copolymer component and the unsaturated olefin component are fed (ZONE 1) is held at a temperature of from about 100 degrees Celsius to about 120 degrees Celsius. When included in the pre-foam composition, the optional EVA component and/or pigments are pre-mixed with the styrenic copolymer component and the unsaturated olefin component.

Next, one or more metal oxide, one or more organic acid, and one or more crosslinking agent are added to the mixture of polymer and unsaturated olefin The particle size of the metal oxide used was less than 1 micron. The combined mixture of the styrenic copolymer component, the unsaturated olefin component, the optional EVA component, and the metal oxide, organic acid, and crosslinking agent are mixed in ZONE 1 of the twin-screw extruder at a temperature of from about 100 degrees Celsius to about 120 degrees Celsius until thoroughly mixed.

The combined mixture of the styrenic copolymer component, the, unsaturated olefin component, the optional EVA component, and the metal oxide, organic acid, and crosslinking agent move to ZONE 2 of the twin-screw extruder, where the temperature is about 90 degrees Celsius or below. The combined mixture of the styrenic copolymer component, the unsaturated olefin component, the EVA component, and the metal oxide, organic acid, and crosslinking agent are then combined in ZONE 2 with a blowing agent and a free radical initiator.

Next, the mixture of the styrenic copolymer component, the unsaturated olefin component, the optional EVA component, and the metal oxide, organic acid, crosslinking agent, blowing agent, and free radical initiator is then subjected to pelletization using a die that is cooled to maintain the temperature at about 90 degrees Celsius or below. The pelletization can performed under water, thus cooling the resulting pellets as they exit the pelletization die.

Example 3: Forming Foam Articles from Pre-Foam Compositions

Pellets made according to the batch process described in Examples 1 using the pre-foam composition formulations described in Tables 1-4 were injection molded (IM) into a pre-heated mold where the mold temperature was, from about 170 degrees Celsius to about 180 degrees Celsius. The mold temperature was above the decomposition temperature of the chemical blowing agent, which decomposed producing gas in the softened composition and foaming it. The mold temperature was also above the initiation temperature of the free-radical initiator, producing a polymerization reaction which crosslinked the unsaturated styrenic copolymer component with the unsaturated olefin component of the composition.

As indicated in Table 5, some of the pre-foam compositions were foamed and injection molded in a single-step process (IM) to produce the finished molded foam article without a compression molding step, while other pre-foam compositions were foamed and molded using a process in which the pre-foam composition was first injection molded to form a molded foam pre-foam, then the molded foam pre-form was annealed, and then the annealed molded foam pre-form was compression molded to produce the finished molded foam article (IM+CM).

For the pre-foam compositions which were injection molded and subsequently compression molded to produce the finished molded foam articles (IM+CM), the injection molded foam preform was taken through an annealing process in which the foam preform was heated to a temperature of about 70 degrees Celsius to about 80 degrees Celsius for about 10 to about 15 minutes; then cooled to a temperature of about 60 degrees Celsius to about 70 degrees Celsius and held at that temperature for about 10 to about 15 minutes; next the preform was cooled to a temperature of about 50 degrees Celsius to about 60 degrees Celsius and held at that temperature for about 10 to about 15 minutes; then cooled to a temperature of about 45 degrees Celsius to about 55 degrees Celsius and held at that temperature for about 10 to about 15 minutes. The annealed molded foam preform was then washed with water (about 35 degrees Celsius to about 40 degrees Celsius) for about 10 to about 15 minutes and subsequently dried for 24 hours.

The annealed molded foam preform was then placed in a compression mold which is at least 10 percent smaller at least one dimension relative to its initial foamed, molded and annealed state prior to the compression molding. During the compression molding process, the foam preform is heated to a surface temperature of from about 130 degrees Celsius to about 150 degrees Celsius. Then the foam preform is cooled to a surface temperature of about 30 degrees Celsius in about 15 minutes or less (e.g., in about 12 minutes or less) to give a finished compression molded foam article.

While this experiment used the pre-foam compositions only to produce injection molded foam articles (IM) and injection molded and compression molded foam articles (IM+CM) using the processes described above, the pre-foam compositions described herein can be foamed and/or molded using other types of processes known in the art. For example, these pre-foam compositions can be used to form slab foam, particulate (e.g., bead) foams, etc. These forms of foam can then be used in various ways. For example, slab foam can be formed, and then can be used as formed as a final component, or can be compression molded to form a final component. Pellets of the pre-foam compositions can be used to form individual particulate foams, or can be foamed and molded to form molded foam articles.

TABLE 4

Compositions and Component Ratios for Foams

| Composition | A | B | C | D | E |
|---|---|---|---|---|---|
| Aromatic/Aliphatic Block Copolymer (Parts by Wt.) | 20.0 | 20.0 | 20.0 | 20.0 | 19.3 |
| Olefinic Copolymer (Parts by Wt.) | 20.0 | 20.0 | 20.0 | 20.0 | 33.9 |
| Linking Polymer (Parts by Wt.) | 0.0 | 0.0 | 0.0 | 0.0 | 27.8 |
| EVA Copolymer (Parts by Wt.) | 0.0 | 0.0 | 0.0 | 0.0 | 0.0 |
| Resin Component (Parts by Wt.) | 40.0 | 40.0 | 40.0 | 40.0 | 81.0 |
| Component Ratios | | | | | |
| I: Olefinic Copolymer (Parts by Wt.) to Aromatic/Aliphatic Block Copolymer (Parts by Wt.) | 1.00 | 1.00 | 1.00 | 1.00 | 1.76 |
| II: Linking Polymer (Parts by Wt.) to Aromatic/Aliphatic Block Copolymer (Parts by Wt.) | 0.00 | 0.00 | 0.00 | 0.00 | 1.44 |

TABLE 4-continued

| Compositions and Component Ratios for Foams | | | | | |
|---|---|---|---|---|---|
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.00 | 0.00 | 0.00 | 0.00 | 0.82 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | N/A | N/A | N/A | N/A | 0.00 |
| Sum of Ratios I-V | 1.00 | 1.00 | 1.00 | 1.00 | 3.20 |
| Sum of Ratios I-VI* | N/A | N/A | N/A | N/A | 4.02 |
| Composition | F | G | H | I | J |
| Aromatic/Aliphatic Block Copolymer (Parts by Wt.) | 21.9 | 19.3 | 13.2 | 36.6 | 10.6 |
| Olefinic Copolymer (Parts by Wt.) | 17.9 | 33.9 | 19.9 | 29.9 | 35.9 |
| Linking Polymer (Parts by Wt.) | 35.7 | 27.8 | 39.7 | 19.9 | 31.8 |
| EVA Copolymer (Parts by Wt.) | 0.0 | 0.0 | 0.0 | 0.0 | 0.0 |
| Resin Component (Parts by Wt.) | 75.5 | 81.0 | 72.8 | 86.4 | 78.2 |
| Component Ratios | | | | | |
| I: Olefinic Copolymer (Parts by Wt.) to Aromatic/Aliphatic Block Copolymer (Parts by Wt.) | 0.82 | 1.76 | 1.50 | 0.82 | 3.39 |
| II: Linking Polymer (Parts by Wt.) to Aromatic/Aliphatic Block Copolymer (Parts by Wt.) | 1.63 | 1.44 | 3.00 | 0.54 | 3.00 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 2.00 | 0.82 | 2.00 | 0.66 | 0.89 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 2.45 | 3.20 | 4.50 | 1.36 | 6.39 |
| Sum of Ratios I-VI* | 4.45 | 4.02 | 6.50 | 2.02 | 7.28 |

| Composition | K | L | M | N | O |
| Aromatic/Aliphatic Block Copolymer (Parts by Wt.) | 7.9 | 10.6 | 13.2 | 13.2 | 19.3 |
| Olefinic Copolymer (Parts by Wt.) | 51.9 | 35.9 | 19.9 | 19.9 | 13.9 |
| Linking Polymer (Parts by Wt.) | 23.8 | 31.8 | 39.7 | 39.7 | 27.8 |
| EVA Copolymer (Parts by Wt.) | 0.0 | 0.0 | 0.0 | 0.0 | 0.0 |
| Resin Component (Parts by Wt.) | 83.7 | 78.2 | 72.8 | 72.8 | 61.0 |
| Component Ratios | | | | | |
| I: Olefinic Copolymer (Parts by Wt.) to Aromatic/Aliphatic Block Copolymer (Parts by Wt.) | 6.54 | 3.39 | 1.50 | 1.50 | 0.72 |
| II: Linking Polymer (Parts by Wt.) to Aromatic/Aliphatic Block Copolymer (Parts by Wt.) | 3.00 | 3.00 | 3.00 | 3.00 | 1.44 |

TABLE 4-continued

| Compositions and Component Ratios for Foams | | | | | |
|---|---|---|---|---|---|
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.46 | 0.89 | 2.00 | 2.00 | 2.00 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 9.54 | 6.39 | 4.50 | 4.50 | 2.16 |
| Sum of Ratios I-VI* | 10.00 | 7.28 | 6.50 | 6.50 | 4.16 |
| Composition | P | Q | R | S | T |
| Aromatic/Aliphatic Block Copolymer (Parts by Wt.) | 19.3 | 13.2 | 7.9 | 19.3 | 13.2 |
| Olefinic Copolymer (Parts by Wt.) | 33.9 | 19.9 | 51.9 | 33.9 | 19.9 |
| Linking Polymer (Parts by Wt.) | 27.8 | 39.7 | 23.8 | 27.8 | 39.7 |
| EVA Copolymer (Parts by Wt.) | 0.0 | 0.0 | 0.0 | 0.0 | 0.0 |
| Resin Component (Parts by Wt.) | 81.0 | 72.8 | 83.7 | 81.0 | 72.8 |
| Component Ratios | | | | | |
| I: Olefinic Copolymer (Parts by Wt.) to Aromatic/Aliphatic Block Copolymer (Parts by Wt.) | 1.76 | 1.50 | 6.54 | 1.76 | 1.50 |
| II: Linking Polymer (Parts by Wt.) to Aromatic/Aliphatic Block Copolymer (Parts by Wt.) | 1.44 | 3.00 | 3.00 | 1.44 | 3.00 |
| III: EVA Copolymer (Parts by Wt.) to Aromatic/Aliphatic Block Copolymer (Parts by Wt.) | 0.00 | 0.00 | 0.00 | 0.00 | 0.00 |
| IV: Linking Polymer (Parts by Wt.) to Olefinic Copolymer (Parts by Wt.) | 0.82 | 2.00 | 0.46 | 0.82 | 2.00 |
| V: EVA Copolymer (Parts by Wt.) to Olefinic Copolymer (Parts by Wt.) | 0.00 | 0.00 | 0.00 | 0.00 | 0.00 |
| VI: EVA Copolymer (Part by Wt.) to Linking Polymer (Parts by Wt.) | 0.00 | 0.00 | 0.00 | 0.00 | 0.00 |
| Sum of Ratios I-V | 3.20 | 4.50 | 9.54 | 3.20 | 4.50 |
| Sum of Ratios I-VI* | 4.02 | 6.50 | 10.00 | 4.02 | 6.50 |

| Composition | U | V' | W' |
|---|---|---|---|
| Aromatic/Aliphatic Block Copolymer (Parts by Wt.) | 8.0 | 8.0 | 8.0 |
| Olefinic Copolymer (Parts by Wt.) | 12.0 | 12.0 | 12.0 |
| Linking Polymer (Parts by Wt.) | 23.9 | 23.9 | 23.9 |
| EVA Copolymer (Parts by Wt.) | 35.9 | 35.9 | 35.9 |
| Resin Component (Parts by Wt.) | 79.8 | 79.8 | 79.8 |
| Component Ratios | | | |
| I: Olefinic Copolymer (Parts by Wt.) to Aromatic/Aliphatic Block Copolymer (Parts by Wt.) | 1.50 | 1.50 | 1.50 |
| II: Linking Polymer (Parts by Wt.) to Aromatic/Aliphatic Block Copolymer (Parts by Wt.) | 3.00 | 3.00 | 3.00 |

TABLE 4-continued

Compositions and Component Ratios for Foams

| | | | |
|---|---|---|---|
| III: EVA Copolymer (Parts by Wt.) to Aromatic/Aliphatic Block Copolymer (Parts by Wt.) | 4.50 | 4.50 | 4.50 |
| IV: Linking Polymer (Parts by Wt.) to Olefinic Copolymer (Parts by Wt.) | 2.00 | 2.00 | 2.00 |
| V: EVA Copolymer (Parts by Wt.) to Olefinic Copolymer (Parts by Wt.) | 3.00 | 3.00 | 3.00 |
| VI: EVA Copolymer (Part by Wt.) to Linking Polymer (Parts by Wt.) | 1.50 | 1.50 | 1.50 |
| Sum of Ratios I-V | 4.50 | 4.50 | 4.50 |
| Sum of Ratios I-VI* | 15.50 | 15.50 | 15.50 |

NT: not tested
N/A: not applicable

Example 4: Testing of Foam Articles

Examples of foam articles formed from the formulations described in Tables 3 and 4 were made and tested to determine their physical properties (e.g., specific gravity, hardness, split tear, compression set, and energy return). The results for foam articles for the various formulations are reported in Table 5.

The purpose of this experiment was to identify pre-foam compositions with improved split-tear values as compared to conventional ethylene vinyl acetate (EVA) foam, but which otherwise maintained the physical properties of conventional EVA foam which are beneficial for us as components of articles of footwear. The experimental pre-foam compositions were based on using a styrenic copolymer component, an unsaturated olefin component, and optionally an EVA component. Some of the formulations were used to produce foams which were first injection molded and then annealed and compression molded to produce a final foam component (IM+CM), while other formulations were used to produce foams which were injection molded to produce a final foam component (IM). The target range for the split-tear values was from about 2.5 kilograms per centimeter to about 3.0 kilograms per centimeter or greater. As a comparison, the split tear value for conventional EVA foam is about 1.7. The target ranges for the other physical properties of the final foam component were: a specific gravity of about 0.1 to about 0.2; an Asker C hardness of about 40 to about 50; a compression set of about 20 percent to about 35 percent; and a resilience of at least about 60 percent. These target ranges were based primarily on the physical properties of conventional EVA foam used as components for article of footwear, which has a specific gravity of from 0.080 to 0.095, an Asker C hardness of 34-38, a compression set of 75 percent, and an resiliency of about 59.

The test method used to obtain the specific gravity values reported in Table 5 is as follows.

The specific gravity of the foam was be determined by testing 3 representative samples taken from a foam preform or compression molded foam component. Using a balance with appropriate accuracy for the weight of the sample, the weight of each sample was determined both in air and when the sample was completely submerged in distilled water at a temperature of 22 degrees Celsius±2 degrees Celsius, after removing any air bubbles adhered to the surface of the foam sample before weighing. The specific gravity (S.G.) was then calculated by taking the weight of the sample in water and subtracting that from the weight of the sample in air, and this value was then divided into the weight of the sample in air, where all the weights are weights in grams.

Split Tear Test

The test method used to obtain the split tear values for foam articles as shown in Table 5 is as follows.

Four die-cut, rectangular-shaped samples of slab sheet or molded foam were prepared, each measuring 2.54 centimeter×15.24 centimeter×10±1 millimeter (thickness). If the foam material to be tested had a skin, the material had its skin removed before preparing the four samples. A 3 centimeter long cut was made in the center from one end of the sample. Then five successive 2 centimeter portions were marked on the sample.

The crosshead speed of the tensile test apparatus was set at 50 millimeter/min. Each separated end of the sample was clamped in an upper grip and a lower grip of the test apparatus. The separation was placed in the middle between both grips. Each section of the sample was held in a clamp in such a manner that the original adjacent cut edges formed a straight line joining the centers of the clamps.

As needed, the cut was aided with a sharp knife to keep separating the foam material in the center of the sample. Readings caused by cutting with the knife were discarded. The lowest values for each of the five portions of each sample were recorded in kilograms per centimeter. Five values were recorded for each sample and an average of the five values was then obtained and reported. If a portion of a sample included a portion having an air bubble more than 2 millimeter in diameter, the value for the portion including the air bubble was not included in the average. If more than one portion of a sample was found to include air bubbles having a diameter greater than 2 millimeter, another sample was then tested.

Durometer Hardness Test

The test used to obtain the hardness values for the foam articles reported in Table 5 is as follows.

For flat foams, the sample was a minimum of 6 millimeter thick for Asker C durometer testing. If necessary, foam samples were stacked to make up the minimum thickness. Foam samples were large enough to allow all measurements to be performed at a minimum of 12 millimeter from the edge of the sample and at least 12 millimeter from any other measurement. Regions tested were flat and parallel with an area at least 6 millimeter in diameter. For the samples tested in Table 5, standard samples having dimensions of approximately 35 centimeter×13 centimeter×1.8 centimeter, were used, and a minimum of five hardness measurements were taken and tested using a 1 kg head weight.

Compression Set

The test used to obtain the compression set values for foam articles reported in Table 5 is as follows.

A foam sample was compressed between two metal plates to 50 percent of its original thickness and placed in an oven at 50 degrees Celsius for 6 hours. The sample was then cooled and the difference between its precompression and post-compression thickness was used as the measure of static compression set.

For the tests reported in Table 5, molded plaques having skin on one side and a thickness of 10 millimeter were used to obtain the samples. The plaque was then skived to a thickness of 10+/−0.5 millimeter to remove the skin before cutting the samples. Compression molded foam materials having skin on two sides had the skin skived from one side, so that skin remained on only one side. Five 2.54 centimeter diameter circles were then machine drilled from the plaque to obtain the samples to be tested.

The compression set testing device consists of two flat steel plates set between the parallel faces of the compression device with compression rings and spacer bars for each set of parallel faces. Four compression rings of the same thickness (4.5 millimeter or 5.0 millimeter based on the specimen thickness) were used for each parallel face of the compression device. The percent compression set was calculated using the following equation:

percent Set=((Original gauge−final gauge)/(50 percent Original gauge))×100

The center area of each specimen was marked and used to measure the specimens with the use of an AMES gage with no load on top.

Energy Return Test

The test used to obtain the energy return values for foam articles reported in Table 5 is as follows.

Energy return of the foam articles was determined using ASTM D 2632 92, which uses a vertical rebound apparatus.

TABLE 5

Processing Methods and Properties of Foam Articles

| Composition | A | B | C | D | E |
|---|---|---|---|---|---|
| Processing Method | 2 | 2 | 2 | 2 | 2 |
| Physical Properties IM Foam | | | | | |
| Specific Gravity | 0.1185 | 0.1166 | 0.1171 | 0.1153 | 0.11 |
| Hardness (Asker C) | 32-33 | 33-34 | 32-33 | 28-30 | 41-42 |
| Split Tear (kilograms per centimeter) | 1.79-1.75 | 1.61-1.78 | 1.58-1.62 | 1.52-1.56 | 1.3 |
| Compression Set (percent) | 72-73 | 70-71 | 72-74 | 70-71 | 51-53 |
| Energy Return (slab) (percent) | | | | | NA |
| IM + CM Foam | | | | | |
| Specific Gravity | 0.2048 | 0.2089 | 0.2021 | 0.2042 | 0.16-0.17 |
| Hardness (Asker C) | 49-50 | 50-51 | 49-50 | 56-58 | 53-54 |
| Split Tear (kilograms per centimeter) | 2.7-2.8 | 2.6-2.8 | 2.8-2.9 | 2.4-2.5 | 2 |
| Compression Set (percent) | 43-45 | 39-40 | 49-50 | 38-39 | 21 |
| Energy Return (slab) (percent) | 50-51 | 49-50 | 53-54 | 47-48 | 68 |

| Composition | F | G | H | I | J |
|---|---|---|---|---|---|
| Processing Method | 2 | 2 | 1 | 2 | 2 |
| Physical Properties IM Foam | | | | | |
| Specific Gravity | 0.09 | 0.1 | 0.15 | 0.11 | 0.159 |
| Hardness (Asker C) | 32-34 | 34-35 | 52-53 | 43-45 | 50-51 |
| Split Tear (kilograms per centimeter) | 1.9 | 2 | 2.5-2.6 | 1.6 | 2.98-3.06 |
| Compression Set (percent) | 71-72 | 74-76 | 35-55 | 69 | 49-51 |
| Energy Return (slab) (percent) | 60 | 83-89 | 71 | 64 | 64-65 |
| IM + CM Foam | | | | | |
| Specific Gravity | 0.13-0.14 | NT | NA | 0.18 | NT |
| Hardness (Asker C) | 43-48 | NT | NA | 55-59 | NT |
| Split Tear (kilograms per centimeter) | 2.3 | NT | NA | 2.5-2.6 | NT |
| Compression Set (percent) | 39-41 | NT | NA | 21-22 | NT |
| Energy Return (slab) (percent) | 68 | NT | NA | 69 | NT |

| Composition | K | L | M | N | O |
|---|---|---|---|---|---|
| Processing Method | 2 | 1 | 2 | 1 | 2 |
| Physical Properties IM Foam | | | | | |
| Specific Gravity | 0.15 | 0.17 | 0.167 | 0.17 | 0.13 |
| Hardness (Asker C) | 46-48 | 54-55 | 52-54 | 54-55 | 42-44 |
| Split Tear (kilograms per centimeter) | 2.73-3.01 | 2.6-2.7 | 3.0-3.1 | 2.7-2.8 | 2 |
| Compression Set (percent) | 59-61 | 26-32 | 43-46 | 28-33 | 71 |
| Energy Return (slab) (percent) | 67-72 | 69-70 | 61-63 | 69-72 | 65 |
| IM + CM Foam | | | | | |
| Specific Gravity | NT | NA | NT | NA | 0.17-0.18 |
| Hardness (Asker C) | NT | NA | NT | NA | 54-57 |

TABLE 5-continued

Processing Methods and Properties of Foam Articles

| | | | | | |
|---|---|---|---|---|---|
| Split Tear (kilograms per centimeter) | NT | NA | NT | NA | 3.0-3.1 |
| Compression Set (percent) | NT | NA | NT | NA | 28 |
| Energy Return (slab) (percent) | NT | NA | NT | NA | 69 |

| Composition | P | Q | R | S | T |
|---|---|---|---|---|---|
| Processing Method | 2 | 1 | 1 | 1 | 1 |
| Physical Properties | | | | | |
| IM Foam | | | | | |
| Specific Gravity | 0.11 | 0.17 | 0.16 | 0.15 | 0.11 |
| Hardness (Asker C) | 42-43 | 54-55 | 51-52 | 49-51 | 33-36 |
| Split Tear (kilograms per centimeter) | 2 | 3.4 | 2.6 | 2.8-3.0 | 1.4-1.7 |
| Compression Set (percent) | 66-72 | 38-39 | 37-43 | 40-50 | 63-70 |
| Energy Return (slab) (percent) | NA | 68 | 71-73 | 74-76 | 84-87 |
| IM + CM Foam | | | | | |
| Specific Gravity | 0.17 | NA | NA | NA | NA |
| Hardness (Asker C) | 52-55 | NA | NA | NA | NA |
| Split Tear (kilograms per centimeter) | 3.1 | NA | NA | NA | NA |
| Compression Set (percent) | 31-37 | NA | NA | NA | NA |
| Energy Return (slab) (percent) | 67-70 | NA | NA | NA | NA |

| Composition | U | V' | W' |
|---|---|---|---|
| Processing Method | 1 | 1 | 1 |
| Physical Properties | | | |
| IM Foam | | | |
| Specific Gravity | 0.18 | 0.19 | 0.19 |
| Hardness (Asker C) | 42-45 | 42-44 | 43-45 |
| Split Tear (kilograms per centimeter) | 2.5-2.6 | 2.6-2.7 | 2.6 |
| Compression Set (percent) | 29-33 | 32-34 | 31-32 |
| Energy Return (slab) (percent) | 78-80 | 80 | 79-82 |
| IM + CM Foam | | | |
| Specific Gravity | NA | NA | NA |
| Hardness (Asker C) | NA | NA | NA |
| Split Tear (kilograms per centimeter) | NA | NA | NA |
| Compression Set (percent) | NA | NA | NA |
| Energy Return (slab) (percent) | NA | NA | NA |

NT: not tested
NA: not applicable
1: Pre-foam composition was injection molded to form final foam article
2: Pre-foam composition was injection molded to form foam preform, and then the foam preform was compression molded to form final foam article Results Four of the 13 final molded foam articles produced using injection molding and compression molding (IM+CM) had split tear values of greater than 2.5, and 8 of the 11 final molded foam articles produced using just the injection molding process (IM) had split tear values of greater than 2.5. Unexpectedly, 12 of the formulations which produced molded foam articles with the target split tear values also had resiliency values significantly higher than expected. Specifically, formulations H, I, L, N, O, P, Q, R, S, U, V and X had resiliency values ranging from 67 percent to 82 percent. However, only 2 pre-foam compositions were found which produced final foam components having all their physical properties in the target ranges (formulations U and X). The resiliency values for these two formulations were found to be over 14 percentage points greater than for conventional EVA foam.

In general, the pre-foam compositions which produced final foam components with unexpectedly high resiliency values included from about 10 parts per hundred of resin (phr) to about 22 parts per hundred of the styrenic copolymer component, and from about 45 parts per hundred to about 80 parts per hundred of the unsaturated olefin component. Some of these pre-form compositions also comprised from about 31 parts per hundred to about 36 parts per hundred of the EVA component, while others were free of the EVA component. Generally, the pre-foam compositions which produced final foam components with target split tear values and unexpectedly high resiliency values had ratios of the parts per hundred of the styrenic copolymer component to the parts per hundred of the unsaturated olefin component which ranged from about 0.17 to about 0.30. For the pre-foam compositions including an EVA component, the ratios of the parts per hundred of the styrenic copolymer component to the parts per hundred of the EVA component ranged from about 0.37 to about 0.70. The ratios of the parts per hundred of the unsaturated olefin component to the parts per hundred of the EVA component ranged from about 2.2 to about 2.3. For the pre-foam compositions including an EVA component, the sum of all three ratios ranged from about 2.7 to about 3.3.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following numbered aspects, which should not be confused with the claims. Each of the numbered aspects below can, in some instances, be combined with one or more other aspects, including aspects described elsewhere in this disclosure.

Aspect 1. A sole structure or a portion thereof comprising: (i) a first sole component comprising a polyolefin resin; and (ii) a second sole component adhered to a surface of the first sole component, wherein the second sole component comprises a polyurethane resin.

Aspect 2. A sole structure or a portion thereof comprising: (i) a first sole component comprising a polyolefin resin; and (ii) a second sole component made by a process comprising: (a) priming a surface of the first sole component to produce a primed surface; and (b) extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

Aspect 3. The sole structure or portion thereof according to any one of aspects 1-97, wherein the first sole component comprises a foam composition according to any one of aspects 175-230.

Aspect 4. The sole structure or portion thereof according to any one of aspects 1-97, wherein the first sole component is made by a by a process comprising injection molding and crosslinking a pre-foam composition according to any one of aspects 175-230.

Aspect 5. The sole structure or portion thereof according to any one of aspects 1-97, wherein the process of making the first sole component further comprises compression molding the crosslinked composition to produce the first sole component.

Aspect 6. The sole structure or portion thereof according to any one of aspects 1-97, wherein the first sole component comprises a foam composition according to any one of aspects 231-282.

Aspect 7. The sole structure or portion thereof according to any one of aspects 1-97, wherein the first sole component comprises a thermoplastic copolyester elastomer.

Aspect 8. The sole structure or portion thereof according to any one of aspects 1-97, wherein the first sole component comprises one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units.

Aspect 9. The sole structure or portion thereof according to any one of aspects 1-97, wherein the first sole component comprises a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units.

Aspect 10. The sole structure or portion thereof according to any one of aspects 1-97, wherein the first sole component comprises an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups.

Aspect 11. The sole structure or portion thereof according to any one of aspects 1-97, wherein the polyolefin resin comprises a polyolefin copolymer and an effective amount of a polymeric resin modifier.

Aspect 12. The sole structure or portion thereof according to any one of aspects 1-97, wherein the polyolefin resin has an abrasion loss of about 0.08 cubic centimeters to about 0.1 cubic centimeters pursuant to ASTM D 5963-97a using the Material Sampling Procedure.

Aspect 13. The sole structure or portion thereof according to any one of aspects 1-97, wherein the effective amount of the polymeric resin modifier is an amount effective to allow the polyolefin resin to pass a flex test pursuant to the Cold Ross Flex Test using the Plaque Sampling Procedure.

Aspect 14. The sole structure or portion thereof according to any one of aspects 1-97, wherein the effective amount of the polymeric resin modifier is an amount effective to allow the polyolefin resin to pass a flex test pursuant to the Cold Ross Flex Test using the Plaque Sampling Procedure without a significant change in an abrasion loss as compared to an abrasion loss of a second resin composition identical to the polyolefin resin except without the polymeric resin modifier when measured pursuant to ASTM D 5963-97a using the Material Sampling Procedure.

Aspect 15. The sole structure or portion thereof according to any one of aspects 1-97, wherein the polyolefin resin comprises a polyolefin copolymer, and an effective amount of a polymeric resin modifier.

Aspect 16. The sole structure or portion thereof according to any one of aspects 1-97, wherein the polyolefin resin has an abrasion loss of about 0.05 cubic centimeters to about 0.1 cubic centimeters or about 0.08 cubic centimeters to about 0.1 cubic centimeters pursuant to ASTM D 5963-97a using the Material Sampling Procedure.

Aspect 17. The sole structure or portion thereof according to any one of aspects 1-97, wherein the effective amount of the polymeric resin modifier is an amount effective to allow the resin composition to pass a flex test pursuant to the Cold Ross Flex Test using the Plaque Sampling Procedure.

Aspect 18. The sole structure or portion thereof according to any one of aspects 1-97, wherein the abrasion loss of the polyolefin resin is about 0.08 cubic centimeters to about 0.1 cubic centimeters.

Aspect 19. The sole structure or portion thereof according to any one of aspects 1-97, wherein the polyolefin copolymer is a random copolymer.

Aspect 20. The sole structure or portion thereof according to any one of aspects 1-97, wherein the polyolefin copolymer comprises a plurality of repeat units, with each of the plurality of repeat units individually derived from an alkene monomer having about 1 to about 6 carbon atoms.

Aspect 21. The sole structure or portion thereof according to any one of aspects 1-97, wherein the polyolefin copolymer comprises a plurality of repeat units, with each of the plurality of repeat units individually derived from a monomer selected from the group consisting of ethylene, propylene, 4-methyl-1-pentene, 1-butene, and a combination thereof.

Aspect 22. The sole structure or portion thereof according to any one of aspects 1-97, wherein the polyolefin copolymer comprises a plurality of repeat units each individually selected from Formula 1A-1D

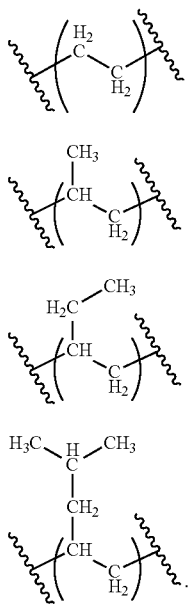

Formula 1A

Formula 1B

Formula 1C

Formula 1D

Aspect 23. The sole structure or portion thereof according to any one of aspects 1-97, wherein the polyolefin copolymer comprises a plurality of repeat units each individually having a structure according to Formula 2

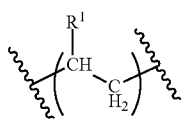

Formula 2 where $R^1$ is a hydrogen or a substituted or unsubstituted, linear or branched, $C_1$-$C_{12}$ alkyl or heteroalkyl.

Aspect 24. The sole structure or portion thereof according to any one of aspects 1-97, wherein polymers in the polyolefin resin consist essentially of polyolefin copolymers.

Aspect 25. The sole structure or portion thereof according to any one of aspects 1-97, wherein the polyolefin copolymer is a random copolymer of a first plurality of repeat units and a second plurality of repeat units, and wherein each repeat unit in the first plurality of repeat units is derived from ethylene and the each repeat unit in the second plurality of repeat units is derived from a second olefin.

Aspect 26. The sole structure or portion thereof according to any one of aspects 1-97, wherein the second olefin is selected from the group consisting of propylene, 4-methyl-1-pentene, 1-butene, and other linear or branched terminal alkenes having about 3 to 12 carbon atoms.

Aspect 27. The sole structure or portion thereof according to any one of aspects 1-97, wherein each of the repeat units in the first plurality of repeat units has a structure according to Formula 1A, and wherein each of the repeat units in the second plurality of repeat units has a structure selected from Formula 1B-1D

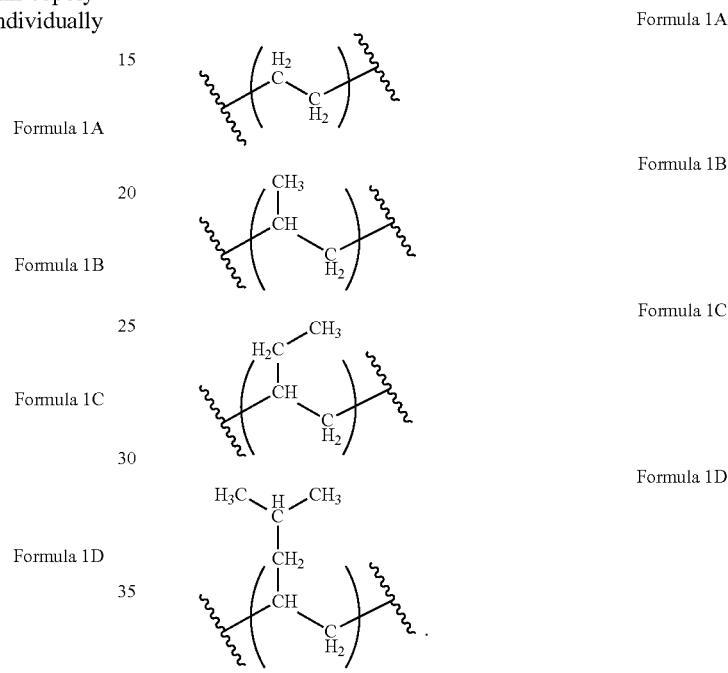

Formula 1A

Formula 1B

Formula 1C

Formula 1D

Aspect 28. The sole structure or portion thereof according to any one of aspects 1-97, wherein each of the repeat units in the first plurality of repeat units has a structure according to Formula 1A, and wherein each of the repeat units in the second plurality of repeat units has a structure according to Formula 2

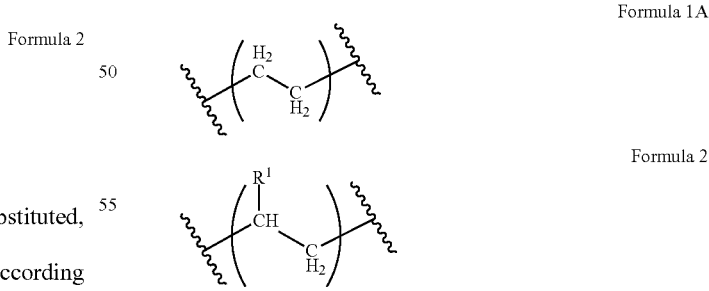

Formula 1A

Formula 2 where $R^1$ is a hydrogen or a substituted or unsubstituted, linear or branched, $C_2$-$C_{12}$ alkyl or heteroalkyl.

Aspect 29. The sole structure or portion thereof according to any one of aspects 1-97, wherein the polyolefin copolymer comprises about 80% to about 99%, about 85% to about 99%, about 90% to about 99%, or about 95% to about 99% polyolefin repeat units by weight based upon a total weight of the polyolefin copolymer.

Aspect 30. The sole structure or portion thereof according to any one of aspects 1-97, wherein the polyolefin copolymer comprises about 1% to about 5%, about 1% to about 3%, about 2% to about 3%, or about 2% to about 5% ethylene by weight based upon a total weight of the polyolefin copolymer.

Aspect 31. The sole structure or portion thereof according to any one of aspects 1-97, wherein the polyolefin copolymer is substantially free of polyurethanes.

Aspect 32. The sole structure or portion thereof according to any one of aspects 1-97, wherein polymer chains of the polyolefin copolymer are substantially free of urethane repeat units.

Aspect 33. The sole structure or portion thereof according to any one of aspects 1-97, wherein the resin composition is substantially free of polymer chains including urethane repeat units.

Aspect 34. The sole structure or portion thereof according to any one of aspects 1-97, wherein the polyolefin copolymer is substantially free of polyamide.

Aspect 35. The sole structure or portion thereof according to any one of aspects 1-97, wherein polymer chains of the polyolefin copolymer are substantially free of amide repeat units.

Aspect 36. The sole structure or portion thereof according to any one of aspects 1-97, wherein the polyolefin resin is substantially free of polymer chains including amide repeat units.

Aspect 37. The sole structure or portion thereof according to any one of aspects 1-97, wherein the polyurethane resin comprises a reaction product of a first component comprising a first functional group and a second component comprising a second functional group, wherein, the second functional group is reactive with the first functional group; and at least one of the first functional group and the second functional group comprises a saturated functional group.

Aspect 38. The sole structure or portion thereof according to any one of aspects 1-97, wherein the first component comprises a polyamine and the second component comprises a polyisocyanate.

Aspect 39. The sole structure or portion thereof according to any one of aspects 1-97, wherein the first component comprises a Michael addition acceptor and the second component comprises a Michael addition donor.

Aspect 40. The sole structure or portion thereof according to any one of aspects 1-97, wherein the saturated functional group comprises a hydroxyl, a thiol, a primary amine, a secondary amine, an epoxy, or a combination thereof.

Aspect 41. The sole structure or portion thereof according to any one of aspects 1-97, wherein each of the first functional group and the second functional group does not comprise an acrylate group or a methacrylate group.

Aspect 42. The sole structure or portion thereof according to any one of aspects 1-97, wherein, the first component comprises an isocyanate-functional prepolymer; and the second functional group comprises a primary amine, a secondary amine, a hydroxyl, or a combination thereof.

Aspect 43. The sole structure or portion thereof according to any one of aspects 1-97, wherein the polyurethane resin comprises a reaction product of an isocyanate prepolymer with a second prepolymer.

Aspect 44. The sole structure or portion thereof according to any one of aspects 1-97, wherein the second prepolymer is selected from the group consisting of a diacid prepolymer, a diol prepolymer, a diamine prepolymer, and a combination thereof.

Aspect 45. The sole structure or portion thereof according to any one of aspects 1-97, wherein the diacid prepolymer is multifunctional.

Aspect 46. The sole structure or portion thereof according to any one of aspects 1-97, wherein the second prepolymer is multifunctional.

Aspect 47. The sole structure or portion thereof according to any one of aspects 1-97, wherein extruding comprises extruding a composition comprising the first component and the second component.

Aspect 48. The sole structure or portion thereof according to any one of aspects 1-97, wherein the composition comprises a thermosetting composition.

Aspect 49. The sole structure or portion thereof according to any one of aspects 1-97, wherein the composition is characterized by a shear storage modulus G' and a shear loss modulus G", wherein, the initial G"/G' ratio is less than 1.5; the initial G' is greater than 2,000 Pa; the G' at 6 minutes is greater than 1,000,000 Pa; and the G" at 6 minutes is greater than 600,000 Pa.; wherein, the initial G"/G' ratio and the initial G' refer to values measured within 30 seconds after the first component and the second component are mixed; the G' and G" after 6 minutes refers to the values measured 6 minutes after the first component and the second component are mixed; and the shear storage modulus G' and the shear loss modulus G" are measured using a rheometer with a gap from 1 millimeter to 2 millimeter, with a 25 millimeter-diameter parallel plate spindle, an oscillation frequency of 1 hertz and amplitude of 0.3 percent, and with a rheometer plate temperature of 25 degrees Celsius.

Aspect 50. The sole structure or portion thereof according to any one of aspects 1-97, the first component comprises a polyamine and the second component comprises a polyisocyanate; the first component comprises a Michael addition acceptor and the second component comprises a Michael addition donor; or a combination thereof.

Aspect 51. The sole structure or portion thereof according to any one of aspects 1-97, wherein the composition is characterized by an initial equivalent ratio of the first functional group to the second functional group is from 1.5:1 to 1:1.5.

Aspect 52. The sole structure or portion thereof according to any one of aspects 1-97, wherein the composition is characterized by a viscosity from 5,000 centipoise to 5,000,000 centipoise, measured using a rheometer with a gap from 1 millimeter to 2 millimeter, a shear rate of 0.1 per second at a temperature of 25 degrees Celsius.

Aspect 53. The sole structure or portion thereof according to any one of aspects 1-97, wherein the composition comprises a thermosetting composition.

Aspect 54. The sole structure or portion thereof according to any one of aspects 1-97, wherein the composition is substantially free of solvent.

Aspect 55. The sole structure or portion thereof according to any one of aspects 1-97, wherein the saturated functional group comprises a hydroxyl, a thiol, a primary amine, a secondary amine, an epoxy, or a combination of any of the foregoing.

Aspect 56. The sole structure or portion thereof according to any one of aspects 1-97, wherein each of the first functional group and the second functional group does not comprise an acrylate group or a methacrylate group.

Aspect 57. The sole structure or portion thereof according to any one of aspects 1-97, wherein the first functional group comprises an isocyanate-functional prepolymer; and the second functional group comprises a primary amine, a secondary amine, a hydroxyl, or a combination thereof.

Aspect 58. The sole structure or portion thereof according to any one of aspects 1-97, wherein the extruding comprises extruding a composition comprising the first component and the second component, wherein a ratio (mass/mass) of the first component to the second component is about 0.9 to about 1.1.

Aspect 59. The sole structure or portion thereof according to any one of aspects 1-97, wherein the extruding comprises extruding a composition comprising the first component and the second component onto the primed surface at a rate of about 0.01 milliliters per second (mL/s) to about 0.02 mL/s.

Aspect 60. The sole structure or portion thereof according to any one of aspects 1-97, wherein the extruding comprises extruding a composition comprising the first component and the second component at a linear gantry speed of about 6 millimeters per second to about 10 millimeter per second.

Aspect 61. The sole structure or portion thereof according to any one of aspects 1-97, wherein the first component further comprises an isocyanate-functional monomer.

Aspect 62. The sole structure or portion thereof according to any one of aspects 1-97, wherein priming the surface of the first sole component comprises one or more of buffing the surface of the first component, cleaning the surface of the first component, and applying a primer to the surface of the first component.

Aspect 63. The sole structure or portion thereof according to any one of aspects 1-97, wherein the first sole component is a midsole.

Aspect 64. The sole structure or portion thereof according to any one of aspects 1-97, wherein the second sole component is an outsole.

Aspect 65. The sole structure or portion thereof according to any one of aspects 1-97, wherein the second sole component comprises one or more herringbone-shaped lines with rounded profile forming a traction pattern on the surface of the first sole component.

Aspect 66. The sole structure or portion thereof according to any one of aspects 1-97, wherein the surface of the first sole component is a ground facing surface when the sole structure is a component of an article of footwear.

Aspect 67. The sole structure or portion thereof according to any one of aspects 1-97, wherein the first sole component comprises a degree of crosslinking from about 30 percent to about 90 percent.

Aspect 68. The sole structure or portion thereof according to any one of aspects 1-97, wherein the first sole component has a specific density of about 0.08 to about 0.15.

Aspect 69. The sole structure or portion thereof according to any one of aspects 1-97, wherein the first sole component has an energy return from about 60 percent to about 85 percent.

Aspect 70. The sole structure or portion thereof according to any one of aspects 1-97, wherein the first sole component has a split tear of about 1.6 kilograms per centimeter to about 4.0 kilograms per centimeter.

Aspect 71. The sole structure or portion thereof according to any one of aspects 1-97, wherein the first sole component has a split tear of about 2.5 kilograms per centimeter to about 3.5 kilograms per centimeter.

Aspect 72. The sole structure or portion thereof according to any one of aspects 1-97, wherein the first sole component has an Asker C hardness of about 40 to 60 C.

Aspect 73. The sole structure or portion thereof according to any one of claim 1-97, wherein the second sole component is adhered to the surface of the first sole component by a method comprising: (i) applying a chlorinated polyolefin primer to the surface of the first sole component to produce a primed surface; and (ii) contacting the second sole component to the primed surface to adhere the second sole component to the surface of the first sole component.

Aspect 74. The sole structure or portion thereof according to any one of claim 1-97, wherein the second sole component is adhered to the surface of the first sole component by a method comprising: (i) applying a chlorinated polyolefin primer to the surface of the first sole component to produce a primed surface; (ii) applying a first waterborne polyurethane adhesive to the primed surface to produce an adhesive surface; and (iii) contacting the second sole component to the adhesive surface adhere the second sole component to the surface of the first sole component.

Aspect 75. The sole structure or portion thereof according to any one of claim 1-97, wherein the second sole component is adhered to the surface of the first sole component by a method further comprising, in step (ii) applying a second waterborne polyurethane adhesive to the surface of the second sole component prior to the contacting step.

Aspect 76. The sole structure or portion thereof according to any one of aspects 1-97, wherein the contacting the second sole component to the surface comprises pressing the second sole component onto the surface.

Aspect 77. The sole structure or portion thereof according to any one of aspects 1-97, wherein contacting the second sole component to the surface comprises extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

Aspect 78. The sole structure or portion thereof according to any one of aspects 1-97, wherein the second sole component is adhered to the surface of the first sole component by a method further comprising, prior to step (i), cleaning the surface of the first sole component by one or both of (a) treating the surface with a high energy discharge and (b) applying a chemical cleaner to the surface.

Aspect 79. The sole structure or portion thereof according to any one of aspects 1-97, wherein the first waterborne polyurethane adhesive and the second waterborne polyurethane adhesive are different.

Aspect 80. The sole structure or portion thereof according to any one of aspects 1-97, wherein the first waterborne primer and the first waterborne polyurethane adhesive are mixed together and applied contemporaneously, and/or wherein the second waterborne primer and the second waterborne polyurethane adhesive are mixed together and applied contemporaneously.

Aspect 81. The sole structure or portion thereof according to any one of aspects 1-97, wherein the high-energy discharge treatment step comprises flame treatment by exposing the surface of the first sole component to a suitable oxidizing flame for a period of about 0.2 seconds to about 3.0 seconds.

Aspect 82. The sole structure or portion thereof according to any one of aspects 1-97, wherein the high-energy discharge treatment step comprises corona treatment.

Aspect 83. The sole structure or portion thereof according to any one of aspects 1-97, wherein the high-energy discharge treatment comprises plasma treatment.

Aspect 84. The sole structure or portion thereof according to any one of aspects 1-97, wherein in step (i) the chlorinated polyolefin primer is applied to the surface at a thickness of about 0.1 millimeters to about 0.5 millimeters and then dried.

Aspect 85. The sole structure or portion thereof according to any one of aspects 1-97, wherein in step (ii) the first waterborne polyurethane adhesive is applied to the primed surface at a thickness of about 0.1 millimeters to about 0.5 millimeters.

Aspect 86. The sole structure or portion thereof according to any one of aspects 1-97, wherein the method further comprises, in step (i), heating the primed surface.

Aspect 87. The sole structure or portion thereof according to any one of aspects 1-97, wherein the method further comprises, in step (i), treating the primed surface with UV radiation.

Aspect 88. The sole structure or portion thereof according to any one of aspects 1-97, wherein the method further comprises, in step (ii), heating the adhesive surface.

Aspect 89. The sole structure or portion thereof according to any one of aspects 1-97, wherein the method further comprises, in step (ii), heating the primed surface after applying the first waterborne primer.

Aspect 90. The sole structure or portion thereof according to any one of aspects 1-97, wherein the second sole component is adhered to the surface of the first sole component at an interface; wherein the interface comprises (1) a chlorinated polyolefin primer disposed on the surface of the first sole component and (2) a polyurethane adhesive disposed between the chlorinated polyolefin primer and a surface of the second sole component.

Aspect 91. The sole structure or portion thereof according to any one of aspects 1-97, wherein the interface further comprises a polyurethane primer disposed with the polyurethane adhesive.

Aspect 92. The sole structure or portion thereof according to any one of aspects 1-97, wherein an adhesive peel strength between the surface of the textile component and the surface of the second component is about 2.0 kilograms of force per centimeter to about 7.0 kilograms of force per centimeter, preferably about 3.0 kilograms of force per centimeter to about 7.0 kilograms of force per centimeter, more preferably about 3.5 kilograms of force per centimeter to about 7.0 kilograms of force per centimeter when measured according to the Adhesive Peel Strength Test.

Aspect 93. The sole structure or portion thereof according to any one of aspects 1-97, wherein the chlorinated polyolefin primer comprises a modified polypropylene.

Aspect 94. The sole structure or portion thereof according to any one of aspects 1-97, wherein the chlorinated polyolefin primer comprises a polyolefin modified with functional groups comprising chlorine or chlorine and maleic anhydride functional groups.

Aspect 95. The sole structure or portion thereof according to any one of aspects 1-97, wherein the chlorinated polyolefin primer comprises a polyolefin selected from the group consisting of polyethylene, polypropylene, ethylene-propylene copolymer, ethylene-propylene-diene terpolymer, ethylene-propylene hexadiene terpolymer, ethylene-propylene-dicyclopentadiene terpolymer, ethylene-propylene-ethylidenenorbornene terpolymer, and ethylene-vinyl acetate.

Aspect 96. The sole structure or portion thereof according to any one of aspects 1-97, wherein the chlorinated polyolefin primer comprises a polyolefin having a chlorine content of about 50 percent or greater.

Aspect 97. The sole structure or portion thereof according to any one of aspects 1-96, wherein the chlorinated polyolefin primer comprises a polyolefin having a molecular weight of about 500 Daltons or higher.

Aspect 98. An article of footwear comprising an upper and a sole structure or portion thereof according to any one of aspects 1-97.

Aspect 99. A method of making an article of footwear or portion thereof, the method comprising affixing an upper to a sole structure or portion thereof according to any one of aspects 1-97.

Aspect 100. A method of making a sole structure or a portion thereof, the method comprising priming a surface of a first sole component comprising a polyolefin resin to produce a primed surface; and extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

Aspect 101. The method according to any one of aspects 100-174, wherein the first sole component comprises a foam composition according to any one of aspects 175-230.

Aspect 102. The method according to any one of aspects 100-174, wherein the first sole component is made by a by a process comprising injection molding and crosslinking a pre-foam composition according to any one of aspects 175-230.

Aspect 103. The method according to any one of aspects 100-174, wherein the process of making the first sole component further comprises compression molding the crosslinked composition to produce the first sole component.

Aspect 104. The method according to any one of aspects 100-174, wherein the first sole component comprises a foam composition according to any one of aspects 231-282.

Aspect 105. The method according to any one of aspects 100-174, wherein the first sole component comprises a thermoplastic copolyester elastomer.

Aspect 106. The method according to any one of aspects 100-174, wherein the first sole component comprises one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units.

Aspect 107. The method according to any one of aspects 100-174, wherein the first sole component comprises a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units.

Aspect 108. The method according to any one of aspects 100-174, wherein the first sole component comprises an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups.

Aspect 109. The method according to any one of aspects 100-174, wherein the polyolefin resin comprises a polyolefin copolymer and an effective amount of a polymeric resin modifier.

Aspect 110. The method according to any one of aspects 100-174, wherein the polyolefin resin has an abrasion loss of about 0.08 cubic centimeters to about 0.1 cubic centimeters pursuant to ASTM D 5963-97a using the Material Sampling Procedure.

Aspect 111. The method according to any one of aspects 100-174, wherein the effective amount of the polymeric resin modifier is an amount effective to allow the polyolefin resin to pass a flex test pursuant to the Cold Ross Flex Test using the Plaque Sampling Procedure.

Aspect 112. The method according to any one of aspects 100-174, wherein the effective amount of the polymeric resin modifier is an amount effective to allow the polyolefin resin to pass a flex test pursuant to the Cold Ross Flex Test using the Plaque Sampling Procedure without a significant change in an abrasion loss as compared to an abrasion loss of a second resin composition identical to the polyolefin resin except without the polymeric resin modifier when measured pursuant to ASTM D 5963-97a using the Material Sampling Procedure.

Aspect 113. The method according to any one of aspects 100-174, wherein the polyolefin resin comprises a polyolefin copolymer, and an effective amount of a polymeric resin modifier.

Aspect 114. The method according to any one of aspects 100-174, wherein the polyolefin resin has an abrasion loss of about 0.05 cubic centimeters to about 0.1 cubic centimeters or about 0.08 cubic centimeters to about 0.1 cubic centimeters pursuant to ASTM D 5963-97a using the Material Sampling Procedure.

Aspect 115. The method according to any one of aspects 100-174, wherein the effective amount of the polymeric resin modifier is an amount effective to allow the resin composition to pass a flex test pursuant to the Cold Ross Flex Test using the Plaque Sampling Procedure.

Aspect 116. The method according to any one of aspects 100-174, wherein the abrasion loss of the polyolefin resin is about 0.08 cubic centimeters to about 0.1 cubic centimeters.

Aspect 117. The method according to any one of aspects 100-174, wherein the polyolefin copolymer is a random copolymer.

Aspect 118. The method according to any one of aspects 100-174, wherein the polyolefin copolymer comprises a plurality of repeat units, with each of the plurality of repeat units individually derived from an alkene monomer having about 1 to about 6 carbon atoms.

Aspect 119. The method according to any one of aspects 100-174, wherein the polyolefin copolymer comprises a plurality of repeat units, with each of the plurality of repeat units individually derived from a monomer selected from the group consisting of ethylene, propylene, 4-methyl-1-pentene, 1-butene, and a combination thereof.

Aspect 120. The method according to any one of aspects 100-174, wherein the polyolefin copolymer comprises a plurality of repeat units each individually selected from Formula 1A-1D

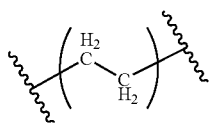

Formula 1A

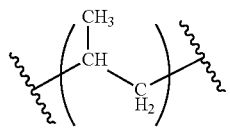

Formula 1B

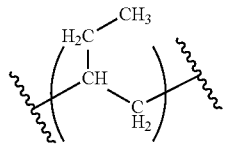

Formula 1C

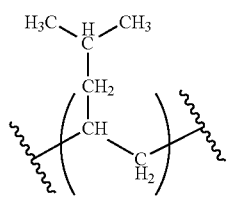

Formula 1D

Aspect 121. The method according to any one of aspects 100-174, wherein the polyolefin copolymer comprises a plurality of repeat units each individually having a structure according to Formula 2

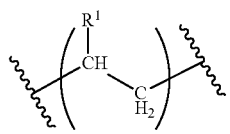

Formula 2 where $R^1$ is a hydrogen or a substituted or unsubstituted, linear or branched, $C_1$-$C_{12}$ alkyl or heteroalkyl.

Aspect 122. The method according to any one of aspects 100-174, wherein polymers in the polyolefin resin consist essentially of polyolefin copolymers.

Aspect 123. The method according to any one of aspects 100-174, wherein the polyolefin copolymer is a random copolymer of a first plurality of repeat units and a second plurality of repeat units, and wherein each repeat unit in the first plurality of repeat units is derived from ethylene and the each repeat unit in the second plurality of repeat units is derived from a second olefin.

Aspect 124. The method according to any one of aspects 100-174, wherein the second olefin is selected from the group consisting of propylene, 4-methyl-1-pentene, 1-butene, and other linear or branched terminal alkenes having about 3 to 12 carbon atoms.

Aspect 125. The method according to any one of aspects 100-174, wherein each of the repeat units in the first plurality of repeat units has a structure according to Formula 1A, and wherein each of the repeat units in the second plurality of repeat units has a structure selected from Formula 1B-1D

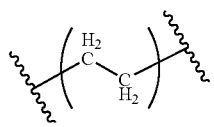

Formula 1A

-continued

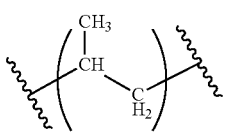
Formula 1B

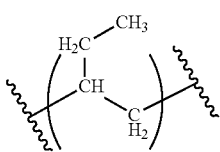
Formula 1C

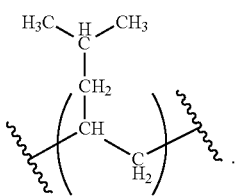
Formula 1D

Aspect 126. The method according to any one of aspects 100-174, wherein each of the repeat units in the first plurality of repeat units has a structure according to Formula 1A, and wherein each of the repeat units in the second plurality of repeat units has a structure according to Formula 2

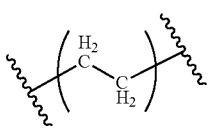
Formula 1A

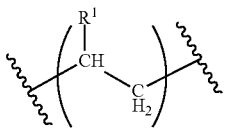
Formula 2 where $R^1$ is a hydrogen or a substituted or unsubstituted, linear or branched, $C_2$-$C_{12}$ alkyl or heteroalkyl.

Aspect 127. The method according to any one of aspects 100-174, wherein the polyolefin copolymer comprises about 80% to about 99%, about 85% to about 99%, about 90% to about 99%, or about 95% to about 99% polyolefin repeat units by weight based upon a total weight of the polyolefin copolymer.

Aspect 128. The method according to any one of aspects 100-174, wherein the polyolefin copolymer comprises about 1% to about 5%, about 1% to about 3%, about 2% to about 3%, or about 2% to about 5% ethylene by weight based upon a total weight of the polyolefin copolymer.

Aspect 129. The method according to any one of aspects 100-174, wherein the polyolefin copolymer is substantially free of polyurethanes.

Aspect 130. The method according to any one of aspects 100-174, wherein polymer chains of the polyolefin copolymer are substantially free of urethane repeat units.

Aspect 131. The method according to any one of aspects 100-174, wherein the resin composition is substantially free of polymer chains including urethane repeat units.

Aspect 132. The method according to any one of aspects 100-174, wherein the polyolefin copolymer is substantially free of polyamide.

Aspect 133. The method according to any one of aspects 100-174, wherein polymer chains of the polyolefin copolymer are substantially free of amide repeat units.

Aspect 134. The method according to any one of aspects 100-174, wherein the polyolefin resin is substantially free of polymer chains including amide repeat units.

Aspect 135. The method according to any one of aspects 100-174, wherein extruding comprises extruding a composition comprising the first component and the second component.

Aspect 136. The method according to any one of aspects 100-174, wherein the composition comprises a thermosetting composition.

Aspect 137. The method according to any one of aspects 100-174, wherein the composition is characterized by a shear storage modulus G' and a shear loss modulus G", wherein, the initial G"/G' ratio is less than 1.5; the initial G' is greater than 2,000 pascals; the G' at 6 minutes is greater than 1,000,000 pascals; and the G" at 6 minutes is greater than 600,000 pascals; wherein, the initial G"/G' ratio and the initial G' refer to values measured within 30 seconds after the first component and the second component are mixed; the G' and G" after 6 minutes refers to the values measured 6 minutes after the first component and the second component are mixed; and the shear storage modulus G' and the shear loss modulus G" are measured using a rheometer with a gap from 1 millimeter to 2 millimeter, with a 25 millimeter-diameter parallel plate spindle, an oscillation frequency of 1 hertz and amplitude of 0.3 percent, and with a rheometer plate temperature of 25 degrees Celsius.

Aspect 138. The method according to any one of aspects 100-174, the first component comprises a polyamine and the second component comprises a polyisocyanate; the first component comprises a Michael addition acceptor and the second component comprises a Michael addition donor; or a combination thereof.

Aspect 139. The method according to any one of aspects 100-174, wherein the composition is characterized by an initial equivalent ratio of the first functional group to the second functional group is from 1.5:1 to 1:1.5.

Aspect 140. The method according to any one of aspects 100-174, wherein the composition is characterized by a viscosity from 5,000 centipoise to 5,000,000 centipoise, measured using a rheometer with a gap from 1 millimeter to 2 millimeter, a shear rate of 0.1 per second at a temperature of 25 degrees Celsius.

Aspect 141. The method according to any one of aspects 100-174, wherein the composition comprises a thermosetting composition.

Aspect 142. The method according to any one of aspects 100-174, wherein the composition is substantially free of solvent.

Aspect 143. The method according to any one of aspects 100-174, wherein the saturated functional group comprises a hydroxyl, a thiol, a primary amine, a secondary amine, an epoxy, or a combination of any of the foregoing.

Aspect 144. The method according to any one of aspects 100-174, wherein each of the first functional group and the second functional group does not comprise an acrylate group or a methacrylate group.

Aspect 145. The method according to any one of aspects 100-174, wherein the first functional group comprises an isocyanate-functional prepolymer; and the second functional group comprises a primary amine, a secondary amine, a hydroxyl, or a combination thereof.

Aspect 146. The method according to any one of aspects 100-174, wherein the extruding comprises extruding a composition comprising the first component and the second component, wherein a ratio (mass/mass) of the first component to the second component is about 0.9 to about 1.1.

Aspect 147. The method according to any one of aspects 100-174, wherein the extruding comprises extruding a composition comprising the first component and the second component onto the primed surface at a rate of about 0.01 milliliters per second to about 0.02 milliliters per second.

Aspect 148. The method according to any one of aspects 100-174, wherein the extruding comprises extruding a composition comprising the first component and the second component at a linear gantry speed of about 6 millimeters per second to about 10 millimeter per second.

Aspect 149. The method according to any one of aspects 100-174, wherein the first component further comprises an isocyanate-functional monomer.

Aspect 150. The method according to any one of aspects 100-174, wherein priming the surface of the first sole component comprises one or more of buffing the surface of the first component, cleaning the surface of the first component, and applying a primer to the surface of the first component.

Aspect 151. The method according to any one of aspects 100-174, wherein the first sole component is a midsole.

Aspect 152. The method according to any one of aspects 100-174, wherein the second sole component is an outsole.

Aspect 153. The method according to any one of aspects 100-174, wherein the second sole component comprises one or more herringbone-shaped lines with rounded profile forming a traction pattern on the surface of the first sole component.

Aspect 154. The method according to any one of aspects 100-174, wherein the surface of the first sole component is a ground facing surface when the sole structure is a component of an article of footwear.

Aspect 155. The method according to any one of aspects 100-174, wherein priming the surface of the first sole component comprises one or more of buffing the surface of the first component, cleaning the surface of the first component, and applying a primer to the surface of the first component.

Aspect 156. The method according to any one of aspects 100-174, wherein the priming the surface of the first component comprises applying a chlorinated polyolefin primer to the surface of the first sole component to produce the primed surface.

Aspect 157. The method according to any one of aspects 100-174, further comprising, prior to extruding the first component and the second component, applying a first waterborne polyurethane adhesive to the primed surface to produce an adhesive surface; wherein the first component and the second component are extruded onto the adhesive surface.

Aspect 158. The method according to any one of aspects 100-174, wherein the second sole component is adhered to the surface of the first sole component by a method further comprising, prior to priming the surface of the first sole component, cleaning the surface of the first sole component by one or both of (a) treating the surface with a high energy discharge and (b) applying a chemical cleaner to the surface.

Aspect 159. The method according to any one of aspects 100-174, wherein the first waterborne polyurethane adhesive and the second waterborne polyurethane adhesive are different.

Aspect 160. The method according to any one of aspects 100-174, wherein the first waterborne primer and the first waterborne polyurethane adhesive are mixed together and applied contemporaneously, and/or wherein the second waterborne primer and the second waterborne polyurethane adhesive are mixed together and applied contemporaneously.

Aspect 161. The method according to any one of aspects 100-174, wherein the high-energy discharge treatment step comprises flame treatment by exposing the surface of the first sole component to a suitable oxidizing flame for a period of about 0.2 seconds to about 3.0 seconds.

Aspect 162. The method according to any one of aspects 100-174, wherein the high-energy discharge treatment step comprises corona treatment.

Aspect 163. The method according to any one of aspects 100-174, wherein the high-energy discharge treatment comprises plasma treatment.

Aspect 164. The method according to any one of aspects 100-174, wherein the chlorinated polyolefin primer is applied to the surface at a thickness of about 0.1 millimeters to about 0.5 millimeters and then dried.

Aspect 165. The method according to any one of aspects 100-174, wherein the first waterborne polyurethane adhesive is applied to the primed surface at a thickness of about 0.1 millimeters to about 0.5 millimeters.

166. The method according to any one of aspects 100-174, wherein the method further comprises heating the primed surface.

Aspect 167. The method according to any one of aspects 100-174, wherein the method further comprises treating the primed surface with UV radiation.

Aspect 168. The method according to any one of aspects 100-174, wherein the method further comprises heating the adhesive surface.

Aspect 169. The method according to any one of aspects 100-174, wherein the method further comprises heating the primed surface after applying the first waterborne primer.

Aspect 170. The method according to any one of aspects 100-174, wherein the chlorinated polyolefin primer comprises a modified polypropylene.

Aspect 171. The method according to any one of aspects 100-174, wherein the chlorinated polyolefin primer comprises a polyolefin modified with functional groups comprising chlorine or chlorine and maleic anhydride functional groups.

Aspect 172. The method according to any one of aspects 100-174, wherein the chlorinated polyolefin primer comprises a polyolefin selected from the group consisting of polyethylene, polypropylene, ethylene-propylene copolymer, ethylene-propylene-diene terpolymer, ethylene-propylene hexadiene terpolymer, ethylene-propylene-dicyclopentadiene terpolymer, ethylene-propylene-ethylidenenorbornene terpolymer, and ethylene-vinyl acetate.

Aspect 173. The method according to any one of aspects 100-174, wherein the chlorinated polyolefin primer comprises a polyolefin having a chlorine content of about 50 percent or greater.

Aspect 174. The method according to any one of aspects 100-173, wherein the chlorinated polyolefin primer comprises a polyolefin having a molecular weight of about 500 Daltons or higher.

Aspect 175. A composition comprising: an A-B-A block copolymer, wherein each of the A blocks comprise repeat units according to the following formula

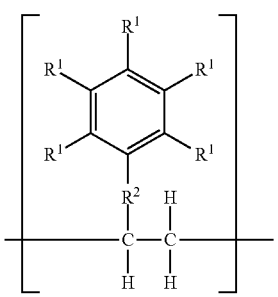

where each occurrence of $R^1$ is independently a hydrogen, halogen, hydroxyl, or a substituted or unsubstituted alkyl group having from 1 to 18 carbon atoms, where each occurrence of $R^2$ is independently none or a substituted or unsubstituted alkyl group having from 1 to 8 carbon atoms, wherein the B block is a random copolymer of ethylene and a first alpha-olefin, wherein the first alpha-olefin has 3 to 8 carbon atoms; and wherein the A-B-A- block copolymer comprises about 10 percent to about 40 percent of the A blocks by weight based upon an entire weight of the A-B-A block copolymer; an olefinic block copolymer, wherein the olefinic block copolymer is a copolymer of ethylene and a second alpha-olefin, wherein the second alpha-olefin has 6 to 12 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin, wherein the third alpha-olefin has 3 to 18 carbon atoms; wherein a ratio II of a total parts by weight of the linking polymer present in the composition to a total parts by weight of the A-B-A block copolymer present in the composition is from about 1.00 to about 5.00.

Aspect 176. The composition according to any one of aspects 175-215, wherein the ratio II is from about 1.50 to about 4.00.

Aspect 177. A composition comprising: an A-B-A block copolymer, wherein each of the A blocks comprise repeat units according to the following formula

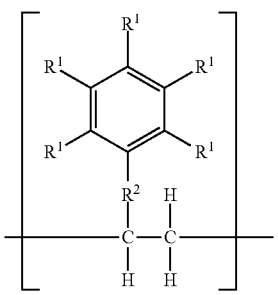

where each occurrence of $R^1$ is independently a hydrogen, halogen, hydroxyl, or a substituted or unsubstituted alkyl group having from 1 to 18 carbon atoms, where each occurrence of $R^2$ is independently none or a substituted or unsubstituted alkyl group having from 1 to 8 carbon atoms, wherein the B block is a random copolymer of ethylene and a first alpha-olefin, wherein the first alpha-olefin has about 3 to 8 carbon atoms; and wherein the A-B-A- block copolymer comprises about 10 percent to about 40 percent of the A blocks by weight based upon an entire weight of the A-B-A block copolymer; an olefinic block copolymer, wherein the olefinic block copolymer is a copolymer of ethylene and a second alpha-olefin, wherein the second alpha-olefin has 6 to 12 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin, wherein the third alpha-olefin has 3 to 18 carbon atoms.

Aspect 178. The composition according to any one of aspects 175-215, wherein each occurrence of $R^1$ is a hydrogen or a substituted or unsubstituted alkyl group having from 1 to 5 carbon atoms.

Aspect 179. The composition according to any one of aspects 175-215, wherein $R^2$ is none.

Aspect 180. A composition comprising: an A-B-A block copolymer, wherein each of the A blocks comprise styrenic repeat units, the B block is a random copolymer of ethylene and a first alpha-olefin, wherein the first alpha-olefin has 3 to 8 carbon atoms, and wherein the A-B-A- block copolymer comprises about 10 percent to about 40 percent of the A blocks by weight based upon an entire weight of the A-B-A block copolymer; an olefinic block copolymer, wherein the olefinic block copolymer is a copolymer of ethylene and a second alpha-olefin, wherein the second alpha-olefin has 6 to 12 carbon atoms, and wherein the olefinic block copolymer has one or more blocks rich in the ethylene and one or more blocks rich in the second alpha-olefin; and an alpha-olefin linking polymer, wherein the alpha-olefin linking polymer is a copolymer of ethylene and a third alpha-olefin, wherein the third alpha-olefin has 3 to 18 carbon atoms, and wherein the alpha-olefin linking polymer has an alpha-olefin monomer content of about 15 percent to about 40 percent by weight based upon an entire weight of the alpha-olefin linking polymer.

Aspect 181. The composition according to any one of aspects 175-215, wherein the alpha-olefin linking polymer has an alpha-olefin monomer content of about 15 percent to about 40 percent by weight based upon an entire weight of the alpha-olefin linking polymer.

Aspect 182. The composition according to any one of aspects 175-215, wherein each of the A blocks consists essentially of polystyrene.

Aspect 183. The composition according to any one of aspects 175-215, wherein the B block consists essentially of a copolymer of ethylene and octene.

Aspect 184. The composition according to any one of aspects 175-215, wherein the B block consists essentially of a copolymer of ethylene and butadiene.

Aspect 185. The composition according to any one of aspects 175-215, wherein the composition comprises a first alpha-olefin linking polymer and a second alpha-olefin linking polymer, wherein the first alpha-olefin linking polymer and the second alpha-olefin linking polymer are copolymers of ethylene and 1-butene, each having a different ratio of ethylene to 1-butene monomer content in the copolymer.

Aspect 186. The composition according to any one of aspects 175-215, wherein the composition comprises about 5 parts by weight to about 15 parts by weight of the A-B-A block copolymer, about 10 parts by weight to about 20 parts by weight of the olefinic block copolymer, and about 25 parts by weight to about 35 parts by weight of the alpha-olefin linking polymers based upon an entire weight of the composition.

Aspect 187. The composition according to any one of aspects 175-215, further comprising an ethylene-vinyl acetate copolymer having a vinyl acetate content of about 10 percent to about 45 percent by weight based upon the weight of the ethylene-vinyl acetate copolymer.

Aspect 188. The composition according to any one of aspects 175-215, wherein the A-B-A block copolymer is at least partially or fully hydrogenated.

Aspect 189. The composition according to any one of aspects 175-215, wherein the A-B-A block copolymer has a degree of hydrogenation of about 50 percent to about 80 percent.

Aspect 190. The composition according to any one of aspects 175-215, wherein the A-B-A block copolymer has a degree of hydrogenation of at least 60 percent to about 80 percent.

Aspect 191. A composition comprising: a partially hydrogenated thermoplastic elastomeric block copolymer, the partially hydrogenated thermoplastic elastomeric block copolymer comprising: one or more A blocks comprising aromatic repeat units, one or more B blocks comprising aliphatic repeat units, and one or more first ethylenically unsaturated groups present on one or both of the aromatic repeat units and the aliphatic repeat units; an olefinic block copolymer, wherein the olefinic block copolymer is a copolymer of a first alpha-olefin and a second alpha-olefin different from the first alpha-olefin, and wherein the olefinic block copolymer comprising one or more second ethylenically unsaturated groups; and an alpha-olefin linking polymer, wherein the alpha-olefin linking polymer comprises one or more aliphatic sidechains.

Aspect 192. A composition comprising: one or more partially hydrogenated thermoplastic elastomeric block copolymers, each of the one or more partially hydrogenated thermoplastic elastomeric block copolymers independently comprising one or more aromatic blocks, one or more aliphatic blocks, and one or more first ethylenically unsaturated units; one or more olefinic block copolymers, each of the one or more olefinic block copolymers comprising second ethylenically unsaturated units; and one or more alpha-olefin linking copolymers Aspect 193. The composition according to any one of aspects 175-215, further comprising one or more ethylene-vinyl acetate copolymers.

Aspect 194. The composition according to any one of aspects 175-215, wherein the partially hydrogenated thermoplastic elastomeric block copolymer comprises an A-B block structure or an A-B-A block structure, wherein each of the A blocks comprise one or more aromatic repeat units, and wherein the B block is an aliphatic polymer block comprising the one or more first ethylenically unsaturated units.

Aspect 195. The composition according to any one of aspects 175-215, wherein the partially hydrogenated thermoplastic elastomeric block copolymer comprises about 10 percent to about 40 percent of the A block by weight based upon an entire weight of the partially hydrogenated thermoplastic elastomeric block copolymer.

Aspect 196. The composition according to any one of aspects 175-215, wherein the aromatic repeat units comprise styrenic repeat units.

Aspect 197. The composition according to any one of aspects 175-215, wherein the aromatic repeat units comprise an aliphatic backbone having a plurality of aromatic side chains.

Aspect 198. The composition according to any one of aspects 175-215, wherein the aliphatic repeat units comprise one or more substituted or unsubstituted alkyl side chains having about 2 to 10 carbon atoms.

Aspect 199. The composition according to any one of aspects 175-215, wherein the olefinic block copolymer is a copolymer of ethylene and the second alpha-olefin.

Aspect 200. The composition according to any one of aspects 175-215, wherein the second alpha-olefin has about 6 to 12 carbon atoms.

Aspect 201. The composition according to any one of aspects 175-215, wherein the olefinic block copolymer has one or more blocks rich in the first alpha-olefin and one or more blocks rich in the second alpha-olefin Aspect 202. The composition according to any one of aspects 175-215, wherein the composition comprises about 5 parts by weight to about 20 parts by weight of the A-B-A block copolymer or partially hydrogenated thermoplastic elastomeric block copolymer based upon an entire weight of the composition.

Aspect 203. The composition according to any one of aspects 175-215, wherein the composition comprises about 5 parts by weight to about 10 parts by weight of the A-B-A block copolymer or partially hydrogenated thermoplastic elastomeric block copolymer based upon an entire weight of the composition.

Aspect 204. The composition according to any one of aspects 175-215, wherein the composition comprises about 5 parts by weight to about 20 parts by weight of the olefinic block copolymer by weight based upon an entire weight of the composition.

Aspect 205. The composition according to any one of aspects 175-215, wherein the composition comprises about 10 parts by weight to about 15 parts by weight of the olefinic block copolymer by weight based upon an entire weight of the composition.

Aspect 206. The composition according to any one of aspects 175-215, wherein the composition comprises about 15 parts by weight to about 35 parts by weight of the alpha-olefin linking polymer based upon an entire weight of the composition.

Aspect 207. The composition according to any one of aspects 175-215, wherein the composition comprises about 20 parts by weight to about 30 parts by weight of the alpha-olefin linking polymer based upon an entire weight of the composition.

Aspect 208. The composition according to any one of aspects 175-215, wherein the composition comprises about 20 parts by weight to about 45 parts by weight of the ethylene-vinyl acetate copolymer based upon an entire weight of the composition.

Aspect 209. The composition according to any one of aspects 175-215, wherein the composition comprises about 30 parts by weight to about 40 parts by weight of the ethylene-vinyl acetate copolymer based upon an entire weight of the composition.

Aspect 210. The composition according to any one of aspects 175-215, further comprising one or both of a free-radical initiator and a chemical blowing agent.

Aspect 211. The composition according to any one of aspects 175-215, wherein the free-radical initiator is selected from the group consisting of dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(tbutylperoxy)hexyne-3; di(2-t-butyl-peroxyisopropyl)benzene; dilauroyl peroxide; dibenzoyl peroxide; t-butyl hydroperoxide; and a combination thereof.

Aspect 212. The composition according to any one of aspects 175-215, wherein the composition comprises a free-radical initiator selected from the group consisting of a peroxide, a diazo compound, and a combination thereof.

Aspect 213. The composition according to any one of aspects 175-215, wherein the composition comprises a chemical blowing agent selected from the group consisting of a carbonate, bicarbonate, carboxylic acid, azo compound, isocyanate, persulfate, peroxide, and a combination thereof.

Aspect 214. The composition according to any one of aspects 175-215, wherein the composition comprises about 5 parts by weight to about 10 parts by weight of the A-B-A block copolymer or partially hydrogenated thermoplastic elastomeric block copolymer based upon an entire weight of the composition.

Aspect 215. The composition according to any one of aspects 175-215, wherein the composition is a pre-foam composition.

Aspect 216. A composition made by a process of partially crosslinking the composition according to any one of aspects 175-215.

Aspect 217. The composition according to claim 216, wherein the partially crosslinked composition has a degree of crosslinking from about 50 percent to about 99 percent.

Aspect 218. A composition comprising a crosslinked reaction product of a composition according to any one of aspects 175-217, wherein the composition is a foamed composition.

Aspect 219. A composition made by a process comprising crosslinking and foaming a composition according to any one of aspects 175-217.

Aspect 220. The composition according to claim 219, wherein the crosslinking and foaming steps occur at about the same time.

Aspect 221. The composition according to claim 219 or claim 220, wherein the process comprises injection molding the pre-foam composition into an injection mold and crosslinking the pre-foam composition in the injection mold.

Aspect 222. The composition according to claim 221, wherein the injection mold is at a temperature from about 150 degrees Celsius to about 190 degrees Celsius during the crosslinking.

Aspect 223. The composition according to any claim 222, wherein the composition is compression molded to produce the foam composition.

Aspect 224. The composition according to claim 223, wherein the process further comprises annealing the foam article and then compression molding the foam article, reducing it in size by at least 10 percent in at least one dimension relative to its initial foamed and molded state prior to the compression molding.

Aspect 225. The composition according to any one of aspects 219-230, wherein the foam composition comprises a degree of crosslinking from about 30 percent to about 90 percent.

Aspect 226. The composition according to any one of aspects 219-230, wherein the foam composition has a specific density of about 0.08 to about 0.15.

Aspect 227. The composition according to any one of aspects 219-230, wherein the foam composition has an energy return from about 60 percent to about 85 percent.

Aspect 228. The composition according to any one of aspects 219-230, wherein the foam composition has a split tear of about 1.6 kilograms per centimeter to about 4.0 kilograms per centimeter.

Aspect 229. The composition according to any one of aspects 219-230, wherein the foam composition has a split tear of about 2.5 kilograms per centimeter to about 3.5 kilograms per centimeter.

Aspect 230. The composition according to any one of aspects 219-230, wherein the foam composition has an Asker C hardness of about 40 to 60 degrees Celsius.

Aspect 231. A composition comprising: a thermoplastic copolyester elastomer comprising, a plurality of first segments, each first segment derived from a dihydroxy-terminated polydiol; a plurality of second segments, each second segment derived from a diol; and a plurality of third segments, each third segment derived from an aromatic dicarboxylic acid.

Aspect 232. The composition according to any one of aspects 231-282, wherein the thermoplastic copolyester elastomer is a block copolymer; a segmented copolymer; a random copolymer; or a condensation copolymer.

Aspect 233. The composition according to any one of aspects 231-282, wherein the thermoplastic copolyester elastomer has a weight average molecular weight of about 50,000 Daltons to about 1,000,000 Daltons.

Aspect 234. The composition according to any one of aspects 231-282, wherein the thermoplastic copolyester elastomer has a weight average molecular weight of about 50,000 Daltons to about 500,000 Daltons; about 75,000 Daltons to about 300,000 Daltons; or about 100,000 Daltons to about 200,000 Daltons.

Aspect 235. The composition according to any one of aspects 231-282, wherein the thermoplastic copolyester elastomer has a ratio of first segments to third segments from about 1:1 to about 1:5 based on the weight of each of the first segments and the third segments.

Aspect 236. The composition according to any one of aspects 231-282, wherein the thermoplastic copolyester elastomer has a ratio of first segments to third segments from about 1:1 to about 1:3 or about 1:1 to about 1:2 based on the weight of each of the first segments and the third segments.

Aspect 237. The composition according to any one of aspects 231-282, wherein the thermoplastic copolyester elastomer has a ratio of second segments to third segments from about 1:1 to about 1:3 based on the weight of each of the first segments and the third segments.

Aspect 238. The composition according to any one of aspects 231-282, wherein the thermoplastic copolyester elastomer has a ratio of second segments to third segments from about 1:1 to about 1:2 or about 1:1 to about 1:1.52 based on the weight of each of the first segments and the third segments.

Aspect 239. The composition according to any one of aspects 231-282, wherein the first segments derived from a dihydroxy-terminated polydiol comprise segments derived from a poly(alkylene oxide)diol having a number-average molecular weight of about 250 Daltons to about 6000 Daltons.

Aspect 240. The composition according to any one of aspects 231-282, wherein the number-average molecular weight is about 400 Daltons to about 6,000 Daltons; about 350 Daltons to about 5,000 Daltons; or about 500 Daltons to about 3,000 Daltons.

Aspect 241. The composition according to any one of aspects 231-282, wherein the poly(alkylene oxide)diol is poly(ethylene ether)diol; poly(propylene ether)diol; poly (tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof.

Aspect 242. The composition according to any one of aspects 231-282, wherein the poly(alkylene oxide)diol is poly(ethylene ether)diol; poly(propylene ether)diol; poly (tetramethylene ether)diol; poly(pentamethylene ether)diol; or poly(hexamethylene ether)diol.

Aspect 243. The composition according to any one of aspects 231-282, wherein the poly(alkylene oxide)diol is poly(tetramethylene ether)diol.

Aspect 244. The composition according to any one of aspects 231-282, wherein the second segments derived from a diol comprise a diol having a molecular weight of less than about 250.

Aspect 245. The composition according to any one of aspects 231-282, wherein the diol is a C2-C8 diol.

Aspect 246. The composition according to any one of aspects 231-282, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 247. The composition according to any one of aspects 231-282, wherein the diol is selected from 1,2-ethanediol, 1,3-propanediol, 1,4-butanediol, 1,6-hexanediol, and mixtures thereof.

Aspect 248. The composition according to any one of aspects 231-282, wherein the third segments derived from an aromatic dicarboxylic acid comprise an aromatic C5-C16 dicarboxylic acid.

Aspect 249. The composition according to any one of aspects 231-282, wherein the aromatic C5-C16 dicarboxylic acid has a molecular weight less than about 300 Daltons or about 120 Daltons to about 200 Daltons.

Aspect 250. The composition according to any one of aspects 231-282, wherein the aromatic C5-C16 dicarboxylic acid is terephthalic acid, phthalic acid, isophthalic acid, or a derivative thereof.

Aspect 251. The composition according to any one of aspects 231-282, wherein the aromatic C5-C16 dicarboxylic acid is terephthalic acid or the dimethyl ester derivative thereof.

Aspect 252. The composition according to any one of aspects 231-282, wherein the thermoplastic copolyester elastomer comprises, a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula:

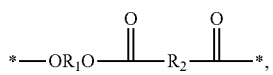

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and a plurality of second copolyester units, each second copolyester unit of the plurality comprising the second segment derived from a diol and the third segment derived from an aromatic dicarboxylic acid, wherein the second copolyester unit has a structure represented by a formula:

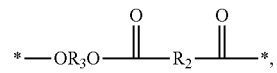

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Aspect 253. The composition according to any one of aspects 231-282, wherein the first copolyester unit has a structure represented by a formula:

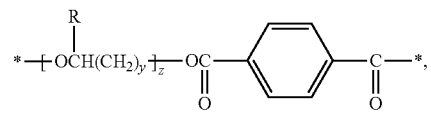

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 254. The composition according to any one of aspects 231-282, wherein y is an integer having a value of 1, 2, 3, 4, or 5.

Aspect 255. The composition according to any one of aspects 231-282, wherein R is hydrogen; wherein R is methyl; wherein R is hydrogen and y is an integer having a value of 1, 2, or 3; or wherein R is methyl and y is an integer having a value of 1.

Aspect 256. The composition according to any one of aspects 231-282, wherein the first copolyester unit has a structure represented by a formula:

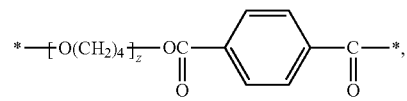

wherein z is an integer having a value from 2 to 60; and wherein a weight average molecular weight of each of the plurality of first copolyester units is from about 300 Daltons to about 7,000 Daltons.

Aspect 257. The composition according to any one of aspects 231-282, wherein z is an integer having a value from 5 to 60; from 5 to 50; from 5 to 40; from 4 to 30; from 4 to 20; or from 2 to 10.

Aspect 258. The composition according to any one of aspects 231-282, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 259. The composition according to any one of aspects 231-282, wherein the second copolyester unit has a structure represented by a formula:

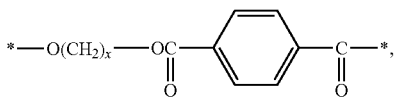

wherein x is an integer having a value from 1 to 20.

Aspect 260. The composition according to any one of aspects 231-282, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 261. The composition according to any one of aspects 231-282, wherein the second copolyester unit has a structure represented by a formula 6:

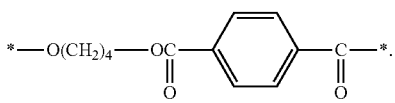

(6)

Aspect 262. The composition according to any one of aspects 231-282, wherein the thermoplastic copolyester elastomer comprises a weight percent of the plurality of first copolyester units based on total weight of the thermoplastic copolyester elastomer of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 263. The composition according to any one of aspects 231-282, wherein the thermoplastic copolyester elastomer comprises a weight percent of the plurality of second copolyester units based on total weight of the thermoplastic copolyester elastomer of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 264. The composition according to any one of aspects 231-282, wherein the thermoplastic copolyester elastomer composition further comprises an additive.

Aspect 265. The composition according to any one of aspects 231-282, wherein the additive is present in an amount from about 0.1 weight percent to about 10 weight percent based on the total weight of the foamed polymeric material.

Aspect 266. The composition according to any one of aspects 231-282, wherein the additive is a wax, an antioxidant, a UV-absorbing agent, a coloring agent, or combinations thereof.

Aspect 267. The composition according to any one of aspects 231-282, wherein the thermoplastic copolyester elastomer composition further comprises a filler.

Aspect 268. The composition according to any one of aspects 231-282, wherein the filler is present in an amount from about 0.05 weight percent to about 20 weight percent or from about 0.1 weight percent to about 10 weight percent based on the total weight of the foamed polymeric material.

Aspect 269. The composition according to any one of aspects 231-282, wherein the filler is a particulate filler; or wherein the filler is a carbonaceous filler.

Aspect 270. The composition according to any one of aspects 231-282, wherein the carbonaceous filler is carbon black, activated carbon, graphite, carbon fibers, carbon fibrils, carbon nanoparticles, or combinations thereof; and wherein the carbonaceous filler is optionally chemically-modified.

Aspect 271. The composition according to any one of aspects 231-282, wherein the filler is an inorganic filler.

Aspect 272. The composition according to any one of aspects 231-282, wherein the inorganic filler is an oxide, a hydroxide, a salt, a silicate, a metal, or combinations thereof; or wherein the inorganic filler comprises glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

Aspect 273. The composition according to any one of aspects 231-282, wherein the thermoplastic copolyester elastomer composition consists essentially of one or more thermoplastic copolyester elastomer.

Aspect 274. The composition according to any one of aspects 231-282, further comprising at least one ionomer.

Aspect 275. The composition according to any one of aspects 231-282, further comprising at least one thermoplastic polyurethane.

Aspect 276. The composition according to any one of aspects 231-282, wherein the thermoplastic copolyester elastomer composition is substantially free of a thermoplastic polyamide polymer, include polyamide copolymers such as polyether block amide copolymers.

Aspect 277. The composition according to any one of aspects 231-282, wherein the thermoplastic copolyester elastomer composition is substantially free of a thermoplastic polyolefin polymers, including polyethylene and polypropylene and/or polyolefin copolymers such as ethylene-vinyl acetate copolymers.

Aspect 278. The composition according to any one of aspects 231-282, wherein the thermoplastic copolyester elastomer has a maximum load when determined using a cyclic tensile test as described herein of about 10 newtons to about 100 newtons; about 15 newtons to about 50 newtons; or about 20 newtons to about 40 N newtons Aspect 279. The composition according to any one of aspects 231-282, wherein the thermoplastic copolyester elastomer has an energy efficiency when determined using a cyclic tensile test as described herein of greater than or equal to about 50 percent; greater than or equal to about 60 percent; or greater than or equal to about 70 percent.

Aspect 280. The composition according to any one of aspects 231-282, wherein the thermoplastic copolyester elastomer has an energy return when determined using a cyclic tensile test as described herein of about 1 joules to 15 joules; about 2 joules to 12 joules; or about 4 joules to 10 joules.

Aspect 281. The composition according to any one of aspects 231-282, wherein the thermoplastic copolyester elastomer has tensile modulus of about 1 megapascals to 15 megapascals when determined using a cyclic tensile test as described herein.

Aspect 282. The composition according to any one of aspects 231-281, wherein the thermoplastic copolyester elastomer has a zero shear viscosity when determined using a cyclic tensile test as described herein of about 10 to about 10,000 pascal-second; about 100 to about 7,000 pascal-second; or about 1,000 to about 5,000 pascal-second.

What is claimed:

1. An article of footwear comprising an upper and a sole structure, the sole structure comprising:
   (i) a first sole component comprising a polyolefin resin, wherein the polyolefin resin comprises a foam composition; and
   (ii) a second sole component adhered to a surface of the first sole component, wherein the second sole component comprises a polyurethane resin,
   wherein the foam composition comprises a crosslinked reaction product of a first composition comprising
   an A-B-A block copolymer, wherein each of the A blocks comprise repeat units according to the following formula

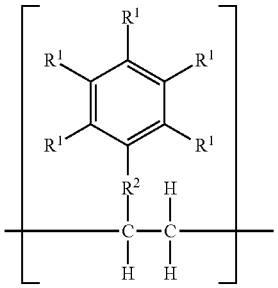

where each occurrence of $R^1$ is independently a hydrogen, halogen, hydroxyl, or a substituted or unsubstituted alkyl group having from 1 to 18 carbon atoms,
   where each occurrence of $R^2$ is independently none or a substituted or unsubstituted alkyl group having from 1 to 8 carbon atoms,
   wherein the B block is a random copolymer of ethylene and a first alpha-olefin, wherein the first alpha-olefin has about 3 to 8 carbon atoms;
   and wherein the A-B-A- block copolymer comprises about 10 percent to about 40 percent of the A blocks by weight based upon an entire weight of the A-B-A block copolymer;
   an olefinic block copolymer, wherein the olefinic block copolymer is a copolymer of ethylene and a second alpha-olefin, wherein the second alpha-olefin has 6 to 12 carbon atoms, and wherein the olefinic block copolymer has one or more blocks rich in the ethylene and one or more blocks rich in the second alpha-olefin;
   an alpha-olefin linking polymer, wherein the alpha-olefin linking polymer is a copolymer of ethylene and a third alpha-olefin, wherein the third alpha-olefin has 3 to 18 carbon atoms; and
   two ethylene-vinyl acetate copolymers comprising a first ethylene-vinyl acetate copolymer having a first vinyl acetate content and a second ethylene-vinyl acetate copolymer having a second vinyl acetate content, wherein the first vinyl acetate content is different from the second vinyl acetate content.

2. The article of footwear according to claim 1, wherein the first composition further comprises an effective amount of a polymeric resin modifier.

3. The article of footwear according to claim 1, wherein the polyurethane resin comprises a reaction product of a first component comprising a first functional group and a second component comprising a second functional group, wherein, the second functional group is reactive with the first functional group; and at least one of the first functional group and the second functional group comprises a saturated functional group.

4. The article of footwear according to claim 3, wherein the first component comprises a polyamine and the second component comprises a polyisocyanate.

5. The article of footwear according to claim 3, wherein the first component comprises a Michael addition acceptor and the second component comprises a Michael addition donor.

6. The article of footwear according to claim 3, wherein the saturated functional group comprises a hydroxyl, a thiol, a primary amine, a secondary amine, an epoxy, or a combination thereof.

7. The article of footwear according to claim 3, wherein each of the first functional group and the second functional group does not comprise an acrylate group or a methacrylate group.

8. The article of footwear according to claim 3, wherein, the first component comprises an isocyanate-functional prepolymer; and the second functional group comprises a primary amine, a secondary amine, a hydroxyl, or a combination thereof.

9. The article of footwear according to claim 3, wherein the polyurethane resin comprises a reaction product of an isocyanate prepolymer with a second prepolymer.

10. The article of footwear according to claim 3, wherein the second prepolymer is selected from the group consisting of a diacid prepolymer, a diol prepolymer, a diamine prepolymer, and a combination thereof.

11. The article of footwear according to claim 10, wherein the diacid prepolymer is multifunctional.

12. The article of footwear according to claim 10, wherein the second prepolymer is multifunctional.

13. The article of footwear according to claim 1, wherein the second sole component is made by a process comprising:
   (a) priming a surface of the first sole component to produce a primed surface; and
   (b) extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

14. The article of footwear according to claim 1, wherein the second sole component is adhered to the surface of the first sole component by a method comprising:
   (i) applying a chlorinated polyolefin primer to the surface of the first sole component to produce a primed surface; and
   (ii) contacting the second sole component to the primed surface to adhere the second sole component to the surface of the first sole component.

15. The article of footwear according to claim 14, wherein contacting the second sole component to the surface comprises extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

16. The article of footwear according to claim 1, wherein the second sole component is adhered to the surface of the first sole component by a method comprising:
(i) applying a chlorinated polyolefin primer to the surface of the first sole component to produce a primed surface; and
(ii) applying a first waterborne polyurethane adhesive to the primed surface to produce an adhesive surface; and
(iii) contacting the second sole component to the adhesive surface adhere the second sole component to the surface of the first sole component.

17. The article of footwear according to claim 16, wherein contacting the second sole component to the surface comprises extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component.

18. A method of making the article of footwear of claim 1, the method comprising:
(a) priming a surface of a first sole component to produce a primed surface, wherein the first sole component comprises a polyolefin resin; and
(b) extruding a first component comprising a first functional group and a second component comprising a second functional group onto the primed surface, wherein, the second functional group is reactive with the first functional group; and at least one of the first functional group and the second functional group comprises a saturated functional group to form the second sole component adhered to the surface of the first sole component,
wherein the polyolefin resin comprises a foam composition; and
wherein the foam composition comprises a crosslinked reaction product of a first composition comprising
an A-B-A block copolymer, wherein each of the A blocks comprise repeat units according to the following formula

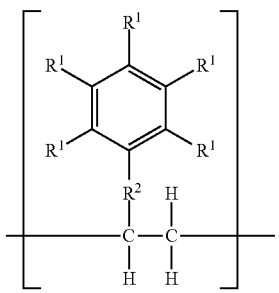

where each occurrence of $R^1$ is independently a hydrogen, halogen, hydroxyl, or a substituted or unsubstituted alkyl group having from 1 to 18 carbon atoms,
where each occurrence of $R^2$ is independently none or a substituted or unsubstituted alkyl group having from 1 to 8 carbon atoms,
wherein the B block is a random copolymer of ethylene and a first alpha-olefin, wherein the first alpha-olefin has about 3 to 8 carbon atoms;
and wherein the A-B-A- block copolymer comprises about 10 percent to about 40 percent of the A blocks by weight based upon an entire weight of the A-B-A block copolymer;
an olefinic block copolymer, wherein the olefinic block copolymer is a copolymer of ethylene and a second alpha-olefin, wherein the second alpha-olefin has 6 to 12 carbon atoms, and wherein the olefinic block copolymer has one or more blocks rich in the ethylene and one or more blocks rich in the second alpha-olefin;
an alpha-olefin linking polymer, wherein the alpha-olefin linking polymer is a copolymer of ethylene and a third alpha-olefin, wherein the third alpha-olefin has 3 to 18 carbon atoms; and
two ethylene-vinyl acetate copolymers comprising a first ethylene-vinyl acetate copolymer having a first vinyl acetate content and a second ethylene-vinyl acetate copolymer having a second vinyl acetate content, wherein the first vinyl acetate content is different from the second vinyl acetate content.

19. The article of footwear according to claim 1, wherein the first vinyl acetate content is different from the second vinyl acetate content, wherein first ethylene-vinyl acetate copolymer is from about 1 weight percent to about 10 weight percent of the foam composition and the second ethylene-vinyl acetate copolymer is from about 5 weight percent to about 50 weight percent of the foam composition.

* * * * *